(12) United States Patent
Takashima

(10) Patent No.: US 7,500,743 B2
(45) Date of Patent: *Mar. 10, 2009

(54) INK JET RECORDING METHOD AND INK JET IMAGE

(75) Inventor: Masanobu Takashima, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 350 days.

This patent is subject to a terminal disclaimer.

(21) Appl. No.: 10/991,474

(22) Filed: Nov. 19, 2004

(65) Prior Publication Data

US 2005/0128268 A1    Jun. 16, 2005

(30) Foreign Application Priority Data

Nov. 19, 2003  (JP)  ............... 2003-389330

(51) Int. Cl.
*G01D 11/00*   (2006.01)

(52) U.S. Cl. ............... 347/100; 347/101; 347/102

(58) Field of Classification Search ............... 347/100, 347/95, 96, 101, 105, 104; 106/31.6, 31.27, 106/31.13; 523/160
See application file for complete search history.

(56) References Cited

U.S. PATENT DOCUMENTS

| | | | |
|---|---|---|---|
| 4,830,911 A | 5/1989 | Kojima et al. | |
| 5,041,328 A | 8/1991 | Akiya et al. | |
| 5,104,730 A | 4/1992 | Misuda et al. | |
| 5,182,175 A | 1/1993 | Sakaki et al. | |
| 5,482,546 A | 1/1996 | Eida | |
| 5,612,281 A | 3/1997 | Kobayashi et al. | |
| 6,093,483 A | 7/2000 | Tanuma | |
| 6,126,280 A * | 10/2000 | Hashimoto et al. ......... | 347/100 |
| 6,165,606 A | 12/2000 | Kasahara et al. | |
| 6,332,679 B1 | 12/2001 | Higuma et al. | |
| 6,500,523 B1 | 12/2002 | Hirose et al. | |
| 6,582,502 B2 | 6/2003 | Fujiwara | |
| 6,620,470 B2 | 9/2003 | Nojima et al. | |
| 6,699,536 B2 | 3/2004 | Katoh et al. | |
| 7,086,726 B2 * | 8/2006 | Takashima et al. ......... | 347/100 |
| 2002/0043175 A1 | 4/2002 | Walker et al. | |
| 2002/0057934 A1 * | 5/2002 | Ishikawa et al. ............ | 399/328 |
| 2002/0096085 A1 | 7/2002 | Gotoh et al. | |
| 2002/0107301 A1 * | 8/2002 | Yamanouchi et al. ....... | 523/160 |
| 2002/0143079 A1 | 10/2002 | Yamanouchi et al. | |
| 2004/0020408 A1 * | 2/2004 | Yabuki ....................... | 347/100 |
| 2004/0024085 A1 | 2/2004 | Ishizuka et al. | |
| 2004/0050291 A1 | 3/2004 | Taguchi et al. | |
| 2004/0091296 A1 * | 5/2004 | Ishizuka et al. ............. | 399/329 |

(Continued)

FOREIGN PATENT DOCUMENTS

EP    0 439 153 A2    7/1991

(Continued)

*Primary Examiner*—Manish S Shah
(74) *Attorney, Agent, or Firm*—Sughrue Mion, PLLC

(57) ABSTRACT

An ink jet recording method that enables the recording of images which have a superior glossiness appropriate for production of photographic images, and which are especially superior in light fastness and ozone resistance. The image is formed on an ink jet recording medium by using an ink set, as the minimum constituent unit, having a yellow ink containing a yellow dye, a magenta ink containing a magenta dye, and a cyan ink containing a cyan dye, the magenta and cyan dyes having an oxidation potential of higher than 0.8 V (vs. SCE). The inkjet recording medium is heated and pressurized.

19 Claims, 1 Drawing Sheet

U.S. PATENT DOCUMENTS

2004/0246321 A1* 12/2004 Takashima et al. .......... 347/100
2005/0062819 A1* 3/2005 Ohya et al. ................... 347/96

FOREIGN PATENT DOCUMENTS

| | | |
|---|---|---|
| EP | 1 081 198 A2 | 3/2001 |
| EP | 1 219 457 A1 | 7/2002 |
| EP | 1 340 796 A1 | 9/2003 |
| EP | 1 352 754 A2 | 10/2003 |
| EP | 1 459 901 A2 | 9/2004 |
| GB | 2 346 618 A | 8/2000 |
| JP | 06-250537 A | 9/1994 |
| JP | 9-70960 A | 3/1997 |
| JP | 10-120958 A | 5/1998 |
| JP | 2908518 B2 | 4/1999 |
| JP | 11-291611 A | 10/1999 |
| JP | 2000-198265 A | 7/2000 |
| JP | 3103429 B2 | 8/2000 |
| JP | 2000-303009 A | 10/2000 |
| JP | 2000-309157 A | 11/2000 |
| JP | 2001-115072 A | 4/2001 |
| JP | 2001-335714 A | 12/2001 |
| JP | 2002-059641 A | 2/2002 |
| JP | 2002-292854 A | 10/2002 |
| JP | 2003-084599 A | 3/2003 |
| JP | 2003-231833 A | 8/2003 |
| JP | 2003-238862 A | 8/2003 |
| JP | 2003-305954 A | 10/2003 |
| WO | WO 95/16561 A1 | 6/1995 |

* cited by examiner

US 7,500,743 B2

INK JET RECORDING METHOD AND INK JET IMAGE

CROSS-REFERENCE TO RELATED APPLICATION

This application claims priority under 35 USC 119 from Japanese Patent Application No. 2003-389330, the disclosure of which is incorporated by reference herein.

BACKGROUND OF THE INVENTION

1. Field of the Invention

The present invention relates to an ink jet recording method and an ink jet image, and in particular to an ink jet recording method that provides images superior in terms of smoothness, glossiness and fastness and to ink jet images obtained thereby.

2. Description of the Related Art

Increasing demands have been made in recent years for an ink jet recording method providing images that are superior not only in terms of image quality (e.g., of high-definition and bright color tones), but also in terms of glossiness and weather resistance.

Various techniques have been proposed for this purpose. For example, an image-forming material has been proposed that is permeable to gas and liquid before recording thus enabling image recording but also forms a surface protective layer, which after recording provides the material with a variety of properties such as weather resistance, light fastness, friction resistance, and water resistance. An ink jet printer has also been proposed that converts a thermoplastic laminate layer on the surface of an ink absorbing layer into a liquid-impermeable transparent layer by heat from its heating means [e.g., Japanese Patent Application Laid-Open (JP-A) No. 9-70960]. In this case, plate heaters are used as the heating means. However, although the liquid-impermeable transparent layer plays a role as a surface protective layer, it cannot provide the entire image-forming material including the surface protective layer with a sufficiently high degree of glossiness.

In addition, some references disclose techniques of heating image carrying recording media after image recording (e.g., Japanese Patent Nos. 2,908,518 and 3,103,429, and JP-A No. 11-291611), claiming that such techniques provide favorable images while suppressing cockle and partial pealing off during recording. Although images can be obtained which have a smoother surface and are free of defects such as cockles, weather resistance, (including ozone resistance and light fastness) of the resultant images is still not satisfactory.

SUMMARY OF THE INVENTION

As described above, a technique has so far yet to be proven for providing images which have both a glossiness favorable for forming photographic images and a weather resistance, especially in terms of both light fastness and ozone resistance, thus preventing image discoloration over an extended period of time established.

An object of the present invention, which has been achieved in view of the above circumstances, is to provide an ink jet recording method that enables recording of images which have a high degree of glossiness appropriate for producing photographic images and which are especially superior in terms of light fastness and ozone resistance, and an ink jet image obtained by such an ink jet recording method.

The present inventors have discovered that, in ink jet recording using an ink jet recording medium, although, as long as the ink used has weather resistance, it is possible to form images with light fastness and ozone resistance, ozone resistance in particular is not of a sufficiently high level to provide worthy of a photograph glossiness, but that a combination of a heat-pressing treatment after recording and a particular ink property (i.e., oxidation potential of the dye used) is effective in securing an improvement. Further, it has been also discovered that in order to provide images with a high degree of glossiness (smoothing), it is effective to cool the recording medium, which has previously been heated and pressurized before releasing (cooling release). The invention has been achieved on the basis of these findings, and specific methods of solving the problem are as follows:

A first aspect of the invention is to provide an ink jet recording method comprising: forming an image on an ink jet recording medium having a support and an ink receiving layer formed on a support by using an ink set comprising, as minimum constituting unit, a yellow ink containing at least one yellow dye, a magenta ink containing at least one magenta dye, and a cyan ink containing at least one cyan dye, the magenta dye and the cyan dye having an oxidation potential of higher than 0.8 V (vs. SCE); and heat pressing the ink jet recording medium.

A second aspect of the invention is to provide a recorded ink jet image formed on the recording material according to the above-described method.

A third aspect of the invention is to provide an ink jet recording device for forming an image on an ink jet recording medium having a support and an ink receiving layer formed thereon, comprising as minimum constituent units: an ink set comprising a yellow ink containing at least one yellow dye, a magenta ink containing at least one magenta dye, and a cyan ink containing at least one cyan dye, the magenta dye and cyan dye having an oxidation potential of higher than 0.8 V (vs. SCE); and a cooling releasing belt-type smoothing device provided with a belt member, a heat-pressing device enable of heating and pressing, a cooling device for cooling at least a pressurized face which has been pressurized by using the belt member, and a cooling releasing device for releasing the pressurized face from the belt member while it is being cooled, wherein an image is formed on the ink receiving layer by using the ink set, and the image formed on the ink jet recording medium is heated and pressurized by means of the belt-type smoothing device, cooled after the heat-pressing treatment, and cooling released from the belt member.

DETAILED DESCRIPTION OF THE INVENTION

Figure 1:
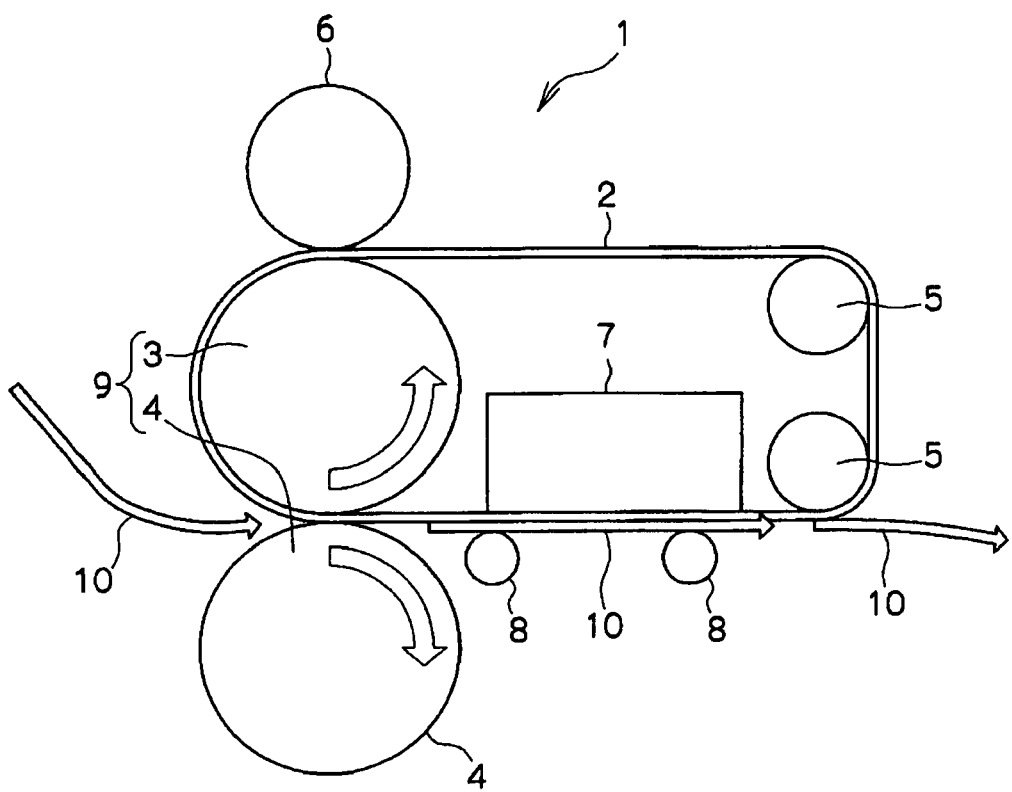
FIG. 1 is a schematic diagram illustrating the heat-pressing treatment and subsequent cooling releasing treatment with the use of a cooling releasing belt-type smoothing device.

In the ink jet recording method according to the present invention, magenta and cyan dyes which are components of the ink set used for image-recording, characteristically have an oxidation potential of higher than 0.8 V, and the images after recording are subjected to the heat-pressing treatment.

Hereinafter, the ink jet recording method, the ink jet image, and the ink jet recording device according to the invention will be described in detail.

The ink jet recording method according to the invention is a method of forming an image on an ink jet recording medium having a support and an ink receiving layer formed thereon, by using an ink set having a yellow ink containing at least one yellow dye, a magenta ink containing at least one magenta dye, and a cyan ink containing at least one cyan dye as the minimum constituents, the magenta and cyan dyes having an oxidation potential of higher than 0.8 V (vs. SCE), and by then heat pressing the ink jet recording medium.

According to the invention, use of the magenta and cyan dyes having an oxidation potential of higher than 0.8 V as the constituents of the ink set improves the light fastness and ozone resistance of images. In addition, the heat-pressing treatment of the recorded images improves the light fastness and ozone resistance of the images particularly efficiently and at the same time provides high-quality images with a glossiness worthy of photographs, while at the same time suppressing the roughness of images.

[Ink Jet Recording Medium]

The structure of an ink jet recording medium for use in the invention will first be described in detail.

The ink jet recording medium according to the invention has a support and at least one ink receiving layer formed thereon, as well as, as and when necessary, other suitably selected non-recording layers such as an intermediate layer, a protective layer, and an undercoat layer. At least one layer among the ink receiving layers preferably contains a thermoplastic resin and/or a layer containing a thermoplastic resin as the non-recording layer such as an intermediate layer or a protective layer.

The ink jet recording medium on which an image is formed provides an image superior in ozone resistance and light fastness and also in surface smoothness and glossiness after it is heat pressed. In particular, if the recording medium contains a thermoplastic resin which will be described below, the ozone resistance of the image can be enhanced effectively. Such thermoplastic resins will be described later.

—Support—

The support is not particularly limited and may be selected arbitrarily depending on the applications. A support having a base material and a polyolefin resin layer formed on one face or both faces of the base material is particularly preferable, from the viewpoint of improving smoothness and glossiness over the entire face of the ink jet recording medium.

<Base Material>

The base material is not particularly limited and may be selected arbitrarily depending on the application intended, as long as it can stand up to the temperature during the heat-pressing treatment and also satisfies the requirements in areas such as surface smoothness, whiteness, lubricity, friction resistance, antistatic property, and resistance to bents after fixing. In general terms, examples of the base material include the photographic supports such as papers and synthetic polymers (films) described in "Basics of Photographic Engineering: Silver Photography", Society of Photographic Science and Technology of Japan Edited by Corona Publishing (1979) pp. 223 to 240.

Specific examples of base materials include paper supports such as synthetic paper (polyolefin-based, polystyrene-based or other synthetic papers), woodfree paper, art paper, (double face) coated paper, (double face) cast-coated paper, mixed-pulp papers prepared from a synthetic resin pulp such as polyethylene and a natural pulp, Yankee paper, baryta paper, wall paper, lining paper, synthetic resin- or emulsion-impregnated paper, synthetic rubber latex-impregnated paper, synthetic resin-containing paper, cardboard, and cellulose fiber paper; various films or sheets of plastic resins such as polyolefins, polyvinyl chloride, polyethylene terephthalate, polystyrene methacrylate, polyethylene naphthalate, polycarbonate, polyvinyl chloride, polystyrene, polypropylene, polyimide, and celluloses (e.g. triacetylcellulose); plastic films or sheets processed to give white reflection (e.g., by adding a pigment such as titanium oxide or the like into the film); fabrics, metals, and various kinds of glasses.

These materials may be used alone or as a laminate in combinations of two or more.

Examples of base materials also include those described in JP-A No. 62-253159, pp. 29 to 31; JP-A No. 1-61236, pp. 14 to 17; JP-A Nos. 63-316848, 2-22651, and 3-56955; and U.S. Pat. No. 5,001,033, and others.

The surface smoothness of the base material is preferably higher, and specifically, the surface roughness (Oken-type smoothness) thereof is preferably 210 seconds or more and more preferably 250 seconds or more. A surface roughness (Oken-type smoothness) of less than 210 seconds may lead to deterioration in the quality of formed images. In the invention, the Oken-type smoothness is a smoothness specified by JAPAN TAPPI No. 5B method, and the Oken-type smoothness of the base material is preferably essentially approximately 600 seconds and more preferably approximately 500 seconds.

The "thickness" of the base material is normally 25 to 300 μm, preferably 50 to 260 μm, and more preferably 75 to 220 μm.

The "stiffness" of the base material is not particularly limited and may be selected arbitrarily depending on the applications, but is preferably similar to those of the base materials for silver-based color photos for use as photographic quality image-recording papers.

The "density" of the base material is preferably 0.7 g/cm$^3$ or more from the viewpoint of fixing properties.

The "thermal conductivity" of the base material is not particularly limited and may be selected arbitrarily depending on the applications, but preferably 0.50 kcal/m·h·° C. or more in an environment of 20° C. and a relative humidity of 65%, particularly from the viewpoint of appropriateness in the heat-pressing treatment. In the invention, the thermal conductivity can be determined by measuring a transfer paper previously conditioned as specified in JIS P8111 by the method described in JP-A No. 53-66279.

Various additives appropriately selected depending on the applications may be added to the base material in an amount in the range that does not impair the advantageous effects of the invention. The additives include, for example, brightening agents, conductive agents, fillers, pigments such as titanium oxide, ultramarine, and carbon black, dyes, and the like.

One face or both faces of the base material may be subjected to various surface or undercoating treatments for improvement in adhesiveness to the layer formed on the base material.

Such surface treatments include, for example, surface modification treatments for providing a glossy surface, a fine surface described in JP-A No. 55-26507, or a matt or non-glossy surface; surface activation treatments such as corona discharge treatment, flame treatment, glow discharge treatment, and plasma treatment; and the like.

The undercoating treatment is, for example, the method described in JP-A No. 61-846443.

These treatments may be carried out alone or in combination of any treatments. For example, an activation treatment may be carried out additionally after a surface modification treatment, or alternatively, an undercoating treatment may be carried out after a surface treatment such as an activation treatment or the like.

A coating solution containing a hydrophilic binder, a semi-conductive metal oxide such as alumina sol or tin oxide, or an anti-static agent such as carbon black or the like may be applied onto the surface of one face (either front or rear face), or on both faces of the base material. Specific examples of base materials include the supports described in JP-A No. 63-220246 and others.

<Polyolefin Resin Layer>

The support described above may favorably have a polyolefin resin layer on one face or both faces of the base material.

Polyolefin resins used for forming the polyolefin resin layer include, for example, polyethylene, polypropylene, and the like. The polyethylene may be any one of high-density polyethylenes (HDPE), low-density polyethylenes (LDPE), linear low-density polyethylenes (L-LDPE), and the like, but alternatively, polypropylene, high-density polyethylenes (HDPE), linear low-density polyethylenes (L-LDPE), or the like is preferably used if the rigidity of the support for photographic printing paper is considered more important. These resins may be used alone or in combinations of two or more.

The polyolefin resin layer is generally prepared with a low-density polyethylene, but polypropylene, a blend of polypropylene and low-density polyethylene, high-density polyethylene, a blend of high-density polyethylene and low-density polyethylene, or the like is preferably used in order to enhance the heat resistance of the support. In particular, use of a blend of high-density polyethylene and low-density polyethylene is most preferable from the viewpoints of both cost and efficiency of lamination.

The blending ratio of the high-density polyethylene to the low-density polyethylene (mass ratio; HDPE/LDPE) is, for example, 1/9 to 9/1. The blending ratio is preferably 2/8 to 8/2 and more preferably 3/7 to 7/3. When thermoplastic resin layers are formed on both faces of the support, the polyolefin resin layer on the rear face of the support is preferably formed, for example, by high-density polyethylene or by a blend of high-density polyethylene and low-density polyethylene. The molecular weight of the polyethylene is not particularly limited, but the high-density polyethylene and the low-density polyethylene both have melt indexes preferably in the range of 1.0 to 40 g per 10 minutes, which are suitable for extrusion.

Although these polyolefin resins have a lower glass transition temperature (Tg), they have a structure which less interactive with other substances and thus are less likely to cause blocking.

The polyolefin resin layer can be formed, for example, by dry lamination of a polyolefin film onto the base material, application of a polyolefin resin-containing solution, application of an aqueous polyolefin emulsion, impregnation of a polyolefin emulsion, or melt-extrusion coating. Among such methods, the melt-extrusion coating is preferable from the viewpoints of productivity and others.

The thickness of the polyolefin resin layer is not particularly limited, but, for example, is preferably 1 to 50 μm and more preferably 5 to 15 μm.

The polyolefin resin layer preferably contains a fluorescent whitening agent or a white pigment, whenever necessary, in addition to the polyolefin resin.

The fluorescent whitening agent is a compound that absorbs near-ultraviolet light and emits fluorescence at 400 to 500 nm, and any one of known fluorescent whitening agents can be used without any particular restriction. Favorable examples of fluorescent whitening agents include compounds described in "The Chemistry of Synthetic Dyes" V, Chapter 8, K. Veen Rataraman edition. Specific examples thereof include stilbene compounds, coumarin compounds, biphenyl compounds, benzoxazoline compounds, naphthalimide compounds, pyrazoline compounds, and carbostyril compounds. More specific examples thereof include White Fulfur PSN, PHR, HCS, PCS, and B (trade name) manufactured by Sumitomo Chemical Co., Ltd.; and UVITEX-OB (trade names) manufactured by Ciba-Geigy Corporation.

The white pigments include, for example, titanium oxide, calcium carbonate, barium sulfate, and zinc white. Among them, titanium oxide is preferable from the point of view of opacifying strength.

The content of the white pigment or fluorescent whitening agent is preferably 0.1 to 8 $g/m^2$ and more preferably 0.5 to 5 $g/m^2$. When the content is less than 0.1 $g/m^2$, the film occasionally becomes too high in light transmission and if it is more than 8 $g/m^2$, it becomes more difficult to handle the film due to factors such as cracking and adhesion resistance.

—Ink Receiving Layer—

The ink receiving layer described above contains at least a fine particle and a water-soluble resin, as well as other components such as a cross-linking agent that can cross-link the water-soluble resin, a mordant, and a surfactant.

(Fine Particles)

The ink receiving layer contains at least one kind of fine particles. The fine particles present in the ink receiving layer make the layer more porous in structure and thus increase ink absorbing capacity.

In particular, if the amount of fine particles is 50% by mass or more, or more preferably more than 60% by mass with respect to the total solid matter in the ink receiving layer, the film can have a more favorable porous structure and hence a more increased ink absorptive capacity. The solid matter content of fine particles in the ink receiving layer is a content calculated with respect to the total content of all components in the composition of the ink receiving layer excepting water.

The above-mentioned ink receiving layer with a porous structure is a layer having a percentage of voids of from 30 to 75% and preferably of from 40 to 70%. If the percentage of voids is less than 30%, ink absorptive capacity may become inadequate, while if it is more than 75%, a problem of pulverization may arise because the presence of a binder is insufficient. In addition, the thickness of the ink receiving layer is preferably 20 to 40 μm, and the 60° glossiness thereof is 30 to 70%, for improvement in quality of the ink jet recording medium.

Either an organic fine particle or an inorganic fine particle may be used as the fine particle. Preferable examples of the organic fine particles include polymer fine particles obtained by emulsion polymerization, microemulsion polymerization, soap-free polymerization, seeding polymerization, dispersion polymerization, suspension polymerization, or others, and specific examples thereof include powders of polyethylene, polypropylene, polystyrene, polyacrylate, polyamide, silicone resin, phenol resin, natural polymer, and others; and polymer fine particles in the latex or emulsion form; and the like.

Examples of inorganic fine particles include silica fine particle, colloidal silica, titanium dioxide, barium sulfate, calcium silicate, zeolite, kaolinite, halloysite, mica, talc, calcium carbonate, magnesium carbonate, calcium sulfate, pseudoboehmite, zinc oxide, zinc hydroxide, alumina, aluminum silicate, calcium silicate, magnesium silicate, zirconium oxide, zirconium hydroxide, cerium oxide, lanthanum oxide, yttrium oxide, and the like.

Among them, inorganic fine particles are preferable from the viewpoints of ink absorptive capacity and image stability, and silica fine particles, colloidal silica, alumina fine particles, and pseudoboehmite are preferable from the viewpoint of securing a favorable porous structure of the resultant film.

Silica fine particles are usually classified grossly into wet-method particles and dry-method (gas-phase) particles according to the manufacturing methods. Mainly in the wet method, hydrated silica is produced by converting a silicate salt by acid decomposition to activated silica, polymerizing the activated silica to a suitable extent, and coagulating or precipitating the polymerized silica. On the other hand, in the gas-phase process, anhydrous silica is mainly produced by gas-phase hydrolysis of a halogenated silicon at high temperature (the flame hydrolysis method) or by heating and reducing quartz sand with coke in an electric furnace by applying arc and then oxidizing the resultant products with air (arc method), and the "gas-phase silica" means an anhydrous silica fine particle produced in the gas-phase process. The gas-phase silica fine particles are particularly preferably as the silica fine particles in the invention.

Gas-phase silica show properties different from hydrated silica's, as they are different in the density of silanol groups and the presence of voids on surface, and are more suited for forming a three-dimensional structure higher in percentage of voids. Although the reason is not clearly understood, it appears that hydrated silica's having silanol groups at a higher density of 5 to 8 groups per $nm^2$ on the fine particle surface tend to aggregate more densely, while gas-phase silica's having silanol groups at a smaller density of 2 to 3 groups per $nm^2$ on the fine particle surface tend to flocculate softly, consequently leading to a structure higher in percentage of voids.

The gas-phase silica have a particularly larger specific surface area, leading to a high efficiency of ink absorption and retention, and a low refractive index, providing the receiving layer with transparency when dispersed well to an appropriate particle diameter, and consequently a high color density and favorable coloring. The transparency of the receiving layer is important not only for the applications demanding transparency such as OHP sheets and the like, but also for the applications of the recording sheets such as photographic glossy paper and the like especially from the viewpoint of obtaining a high color density and a favorable color glossiness.

The average primary particle diameter of the fine particles is preferably 2 μm or less, and more preferably 200 nm or less. Silica fine particles having an average primary particle diameter of 30 nm or less, colloidal silica having an average primary particle diameter of 30 nm or less, alumina fine particles having an average primary particle diameter of 20 nm or less, and pseudoboehmite having an average pore radius of 2 to 15 nm are more preferable, and among them, silica fine particles, alumina fine particles, and pseudoboehmite are particularly preferable.

The average primary particle diameter of a gas-phase silica, if used, is preferably 30 nm or less, more preferably 20 nm or less, particularly preferably 10 nm or less, and most preferably 3 to 10 nm. The gas-phase silica particles tend to adhere to each other by the hydrogen bonds of silanol groups, and when the average primary particle diameter is 30 nm or less, they can form a structure which has a large percentage of voids and can thus be effective in enhancing ink absorbing capacity.

The silica fine particles may be used in combination with the other fine particles described above. When the other fine particles and silica fine particles (especially, gas-phase silica) are used in a combination, the content of the silica fine particles (especially, gas-phase silica) in relation to the total number of fine particles is preferably 30% by mass or more, and more preferably 50% by mass or more.

In addition to the particles described above, alumina fine particles, alumina hydrates, or a mixture or complex thereof may also be used to advantage as the inorganic fine particle. Among them, alumina hydrates are preferable as they absorb and retain ink well, and particularly, pseudoboehmite ($Al_2O_3 \cdot nH_2O$) is preferable. Alumina hydrates are usable in a variety of forms, but boehmite in the sol form is preferable as it facilitates production of a smooth film.

Regarding the micropore structure of pseudoboehmite, the average pore radius is preferably from 1 to 30 nm and more preferably from 2 to 15 nm. In addition, the pore volume is preferably from 0.3 to 2.0 cc/g and more preferably from 0.5 to 1.5 cc/g. The micropore radius and the pore volume are those which can be determined by a nitrogen absorption/desorption method, for example, by using a gas absorption/desorption analyzer (e.g., trade name; Omnisoap 369, manufactured by Beckman Coulter, Inc.).

Among various alumina fine particles, gas-phase alumina fine particles having a larger specific surface area are preferable. The average primary particle diameter of the gas-phase alumina fine particles is preferably 30 nm or less and more preferably 20 nm or less.

The fine particles above may be favorably used in the forms described, for example, in JP-A Nos. 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, and 2001-301314, and others.

(Water-soluble Resin)

The ink receiving layer may have at least one water-soluble resin. Examples of the water-soluble resins include polyvinyl alcohol resins having a hydroxy group as the hydrophilic structural unit (polyvinyl alcohol (PVA), acetoacetyl-modified polyvinyl alcohol, cation-modified polyvinyl alcohol, anion-modified polyvinyl alcohol, silanol-modified polyvinyl alcohol, polyvinylacetal, and the like), cellulosic resins (methylcellulose (MC), ethylcellulose (EC), hydroxyethylcellulose (HEC), carboxymethylcellulose (CMC), hydroxypropylcellulose (HPC), hydroxyethylmethylcellulose, hydroxypropylmethylcellulose, and the like), chitins, chitosans, starch, resins having an ether bond (polyethylene oxide (PEO), polypropylene oxide (PPO), polyethylene glycol (PEG), polyvinylether (PVE), and the like), resins having a carbamoyl group (polyacrylamide (PAAM), polyvinylpyrrolidone (PVP), polyacrylic acid hydrazide, and the like), and the like.

In addition, polyacrylate salts, maleic acid resins, alginate salts, gelatins and the like having a carboxyl group as the dissociative group can also be included.

Among such resins, at least one resin selected from polyvinyl alcohol resins, cellulosic resins, resins having an ether bond, resins having a carbamoyl group, resins having a carboxyl group, and gelatins is particularly preferable, and especially, polyvinyl alcohol (PVA) resins are preferable.

Examples of polyvinyl alcohols include those described in Japanese Patent Application Publications (JP-B) Nos. 4-52786, 5-67432, and 7-29479, Japanese Patent No. 2,537,827, JP-B No. 7-57553, Japanese Patent Nos. 2,502,998 and 3,053,231, JP-A No. 63-176173, Japanese Patent No. 2,604,367, JP-A Nos. 7-276787, 9-207425, 11-58941, 2000-135858, 2001-205924, 2001-287444, 62-278080, and 9-39373, Japanese Patent No. 2,750,433, JP-A Nos. 2000-158801, 2001-213045, 2001-328345, 8-324105, 11-348417, 58-181687, 10-259213, 2001-72711, 2002-103805, 2000-63427, 2002-308928, 2001-205919, and 2002-264489.

In addition, examples of water-soluble resins excluding polyvinyl alcohol resins include the compounds described in JP-A No. 11-165461, Sections [0011] to [0012] and JP-A Nos. 2001-205919 and 2002-264489.

The water-soluble resins may be used alone or in combinations of two or more. The amount of water-soluble resin is preferably from 9 to 40% by mass and more preferably from 12 to 33% by mass in relative to the total solid matter in the ink receiving layer.

Further, other water-soluble resins may be used in combination with the polyvinyl alcohol resins. When another water-soluble resin and a polyvinyl alcohol resin are used in combination, the content of the polyvinyl alcohol resin is preferably 50% by mass or more, and more preferably 70% by mass or more in relative to the total water-soluble resins.

The above-mentioned fine particles and the water-soluble resin which are primary constituents of the ink receiving layer, may be respectively a single material or a mixture of multiple materials. From the view point of retaining transparency, the kind of water-soluble resin used together with the fine particles, in particular the silica fine particles, is important. For example, if gas-phase silicas are used, the water-soluble resin is preferably a polyvinyl alcohol resin, more preferably a polyvinyl alcohol resin having a saponification value of from 70 to 100%, and still more preferably a polyvinyl alcohol resin having a saponification value of from 80 to 99.5%.

The polyvinyl alcohol resin mentioned above has a hydroxyl group in the structural unit, and thus enables easier formation of a three-dimensional network structure having secondary particles of the silica fine particles as the network chain unit due to hydrogen bond formation between the hydroxyl group and the surface silanol groups on the silica fine particles. The formation of this three-dimensional network structure appears to be the reason for the formation of an ink receiving layer with a porous structure that has a high percentage of voids and possesses adequate strength. For this reason, an ink receiving layer with a significantly porous structure absorbs ink rapidly by virtue of a capillary phenomenon and provides completely circular good quality ink dots without bleeding during ink jet recording.

(Ratio of Contents of Fine particles to Water-Soluble Resin)

The mass content ratio [PB ratio (x:y)] of fine particles (x) to water-soluble resin (y) exerts a significant influence on the structure and the strength of ink receiving layer. In other words, when the PB ratio is considerable, the percentage of voids, pore volume, and surface area (per unit mass) increase but the density and strength decrease. The PB ratio (x:y) is preferably 1.5:1 to 10:1 for the purpose of preventing the decrease in film strength and the cracks thereon during drying caused by a too greater PB ratio, and for preventing the decrease in percentage of voids due to the voids being filled with the resin caused by a too smaller PB ratio and the resulting decrease in ink absorptive capacity.

The ink receiving layer should have an adequate film strength, as the ink jet recording medium can be exposed to stress while it is conveyed in an ink jet printer. The ink receiving layer should have adequate film strength also to prevent cracking and exfoliation of the ink receiving layer when the ink jet recording medium is cut into the form of sheet. In view of these factors, the PB ratio (x:y) is preferably 5:1 or less, and to ensure superior ink absorptive properties during high-speed printing in an ink jet printer, more preferably 2:1 or more.

For example, when an aqueous coating dispersion containing a gas-phase silica having an average primary particle diameter of 20 nm or less and a water-soluble resin at a PB ratio (x:y) of 2:1 to 5:1 is applied on a support and dried, a three-dimensional network structure having the secondary particles of silica fine particle as the network chain is formed, thus enabling easier formation of a transparent porous film having an average micropore diameter of 30 nm or less, a percentage of voids of from 50 to 80%, a micropore specific volume of 0.5 ml/g or more, and a specific surface area of 100 $m^2/g$ or more.

(Other Components)

The ink receiving layer may contain in addition to the components above other components such as a cross-linking agent, a mordant, surfactant, and the like.

—Cross-Linking Agent—

In the ink receiving layer according to the invention, the layer containing a fine particle and a water-soluble resin described above preferably contains additionally a cross-linking agent that cross-links the water-soluble resin and accordingly, is a porous layer hardened by the cross-linking reaction between the cross-linking agent and the water-soluble resin.

A boron compound is preferably used for cross-linking the above-mentioned water-soluble resin above, particularly polyvinyl alcohol. Examples of the boron compounds include borax, boric acid, borate salts [e.g., orthoborate salts such as $InBO_3$, $ScBO_3$, $YBO_3$, $LaBO_3$, $Mg_3(BO_3)_2$, and $Co_3(BO_3)_2$], diborate salts (e.g., $Mg_2B_2O_5$, and $Co_2B_2O_5$), metaborate salts (e.g., $LiBO_2$, $Ca(BO_2)_2$, $NaBO_2$, and $KBO_2$), tetraborate salts (e.g. $Na_2B_4O_7 \cdot 10H_2O$), pentaborate salts (e.g., $KB_5O_8 \cdot 4H_2O$, $Ca_2B_6O_{11} \cdot 7H_2O$, and $CsB_5O_5$), and the like. Among them, borax, boric acid, and borate salts are preferable and boric acid is particularly preferable from the viewpoint of the speed of cross-linking reaction.

In addition to the cross-linking agents listed above, the following cross-linking agents may also be used for cross-linking the water-soluble resins. Examples include aldehyde compounds such as formaldehyde, glyoxal, succinaldehyde, glutaric aldehyde, dialdehyde starch, and vegetable gum dialdehyde derivatives; ketone compounds such as diacetyl, 1,2-cyclopentanedione, and 3-hexene-2,5-dione; activated halogen compounds such as bis(2-chloroethyl)urea, bis(2-chloroethyl)sulfone, and 2,4-dichloro-6-hydroxy-s-triazine sodium salt; activated vinyl compounds such as divinylsulfone, 1,3-bis(vinylsulfonyl)-2-propanol, N,N'-ethylene bis (vinylsulfonylacetamide), divinylketone, 1,3-bis(acryloyl) urea, and 1,3,5-triacryloyl-hexahydro-s-triazine; N-methylol compounds such as dimethylol urea and methylol dimethylhydantoin; melamine compounds such as trimethylol melamine, alkylated methylol melamines, melamine, benzoguanamine, and melamine resins; epoxy compounds such as ethylene glycol diglycidylether, propylene glycol diglycidylether, polyethyleneglycol diglycidylether, diglycerin polyglycidylether, spiro-glycol diglycidylether, and phenol resin polyglycidylethers;

isocyanate compounds such as 1,6-hexamethylene diisocyanate and xylylene diisocyanate; aziridine compounds described in, for example, U.S. Pat. Nos. 3,017,280 and 2,983,611; carbodiimide compounds described in, for example, U.S. Pat. No. 3,100,704; ethyleneimino compounds such as 1,6-hexamethylene-N,N'-bisethylene urea; halogenated carboxy aldehyde compounds such as mucochloric acid and mucophenoxychloric acid; dioxane compounds such as 2,3-dihydroxy dioxane and the like; metal-containing compounds such as titanium lactate, aluminum sulfate, chrome alum, potash alum, zirconyl acetate, and chromium acetate; polyamine compounds such as tetraethylenepentamine;

hydrazide compounds such as adipic acid dihydrazide; low-molecular weight compounds or polymers containing two or more oxazoline groups; polyvalent acid anhydrides, acid chlorides, and bissulfonate compounds described in, for example, U.S. Pat. Nos. 2,725,294, 2,725,295, 2,726,162, and 3,834,902; activated ester compounds described in, for example, U.S. Pat. Nos. 3,542,558 and 3,251,972.

These cross-linking agents may be used alone or in combinations of two or more.

The cross-linking agent may with advantage be added, for example, as explained below. Hereinafter, boron compounds will be quoted as examples. When the ink receiving layer is a layer prepared by cross-linking a coated layer on which the coating solution for the ink receiving layer has been applied (first solution), the cross-linking and hardening reaction may be carried out by (1) forming a coated layer by applying the coating solution, and at the same time, (2) applying a basic solution (second solution) at a pH of 7.1 or more onto the coated layer while the coated layer prepared by applying the coating solution is being dried and before the coated layer manifests a reduction in the rate of drying. The pH of the basic solution is preferably 7.5 or more and more preferably 8 or more. A boron compound serving as the cross-linking agent may be contained either in the first or second solution, or both in the first and second solutions.

The amount of the cross-linking agent used is preferably from 1 to 50% by mass and more preferably from 5 to 40% by mass in relation to the weight of the water-soluble resin.

—Mordant—

In the invention, it is preferable to add a mordant into the ink receiving layer, in order to improve further the water resistance of images and to enhance efficiency in preventing ink bleeding over a period of time. The presence of a mordant in the ink receiving layer is effective in enhancing water resistance and preventing the ink bleeding over a period of time, as a result of stabilization caused by the interaction with an ink containing an anionic dye as the colorant.

An organic mordant such as a cationic polymer (cationic mordant), or an inorganic mordant such as a water-soluble metal compound, may be used as the mordant. Between them, an organic mordant is preferable and a cationic mordant is particularly preferable. Organic mordants and inorganic mordants may be used alone, in combinations of two or more, or in combinations of organic and inorganic mordants.

The mordant may be contained either in the coating solution for the ink receiving layer (first solution) or in the basic solution (second solution) for preparing the ink receiving layer, but is preferably contained in the second solution, which is different from the solution containing fine particles (especially, gas-phase silica). When a mordant is added directly into a coating solution for the ink receiving layer, the mordant may on occasions cause coagulation in the presence of gas-phase silica having an anionic charge, but when a solution containing a mordant and the coating solution for the ink receiving layer are prepared separately and the solutions are then applied independently, the question of coagulation of fine particles becomes irrelevant, and consequently, the range of mordants which can be used is expanded.

Preferably, a polymer mordant having a primary to tertiary amino group or a quaternary ammonium salt group as the cationic functional group is used as the cationic mordant, but a cationic non-polymer mordant may also be used.

The polymer mordant is preferably a homopolymer of a monomer having a primary to tertiary amino group or the salt thereof or a quaternary ammonium salt group (hereinafter, referred to "mordant monomer"), or a copolymer or condensation polymer of the mordant monomer and another monomer (hereinafter, referred to as "non-mordant monomer"). In addition, these polymer mordants may be used in the form of a water-soluble polymer or of a water-soluble latex particle.

Examples of mordant monomers include trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride;

trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl)ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl-N-2-(4-vinylphenyl)ethylammonium acetate;

N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-dimethylaminoethyl (meth)acrylamide, N,N-diethylaminoethyl (meth)acrylamide, N,N-dimethylaminopropyl (meth)acrylamide, and quaternary ammonium salts of N,N-diethylaminopropyl (meth)acrylamide prepared by reaction with methyl chloride, ethyl chloride, methyl bromide, ethyl bromide, methyl iodide or ethyl iodide; or the sulfonate salts, alkylsulfonate salts, acetate salts or alkyl carboxylate salts thereof.

Specific examples of the compounds include monomethyldiallylammonium chloride, trimethyl-2-(methacryloyloxy)ethylammonium chloride, triethyl-2-(methacryloyloxy)ethylammonium chloride, trimethyl-2-(acrlyloyloxy)ethylammonium chloride, triethyl-2-(acrlyloyloxy)ethylammonium chloride, trimethyl-3-(methacryloyloxy)propylammonium chloride, triethyl-3-(methacryloyloxy)propylammonium chloride, trimethyl-2-(methacryloylamino)ethylammonium chloride, triethyl-2-(methacryloylamino)ethylammonium chloride, trimethyl-2-(acrlyloylamino)ethylammonium chloride, triethyl-2-(acrlyloylamino)ethylammonium chloride, trimethyl-3-(methacryloylamino)propylammonium chloride, triethyl-3-(methacryloylamino)propylammonium chloride, trimethyl-3-(acrlyloylamino)propylammonium chloride, triethyl-3-(acrlyloylamino)propylammonium chloride;

N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acrlyloylamino)propylammonium chloride, trimethyl-2-(methacryloyloxy)ethylammonium bromide, trimethyl-3-(acrlyloylamino)propylammonium bromide, trimethyl-2-(methacryloyloxy)ethylammonium sulfonate, trimethyl-3-(acrlyloylamino)propylammonium vinyl acetate, and the like.

In addition, the copolymerizable monomers include N-vinylimidazole, N-vinyl-2-methylimidazole.

Further, allylamine, diallylamine, and the derivatives and salts thereof may also be used. Examples of such compounds include allylamine, allylamine hydrochloride salt, allylamine acetate salt, allylamine sulfate salt, diallylamine, diallylamine hydrochloride salt, diallylamine acetate salt, diallylamine sulfate salt, diallylmethylamine and the salts thereof (the salts include, for example, hydrochloride, acetate, sulfate, and other salts), diallylethylamine and the salts thereof (the salts include, for example, hydrochloride, acetate, and sulfate), diallyldimethylammonium salts (the counter anions of the salts include chloride, acetate, sulfate, and other ions), and the like. These allylamines and diallylamine derivatives are less polymerizable in the amine form and are commonly polymerized in the salt form and then desalted as and when necessary.

In addition, N-vinyl acetamide, N-vinyl formamide, or the like may be polymerized as a polymerization unit, and polymers having a vinyl amine unit or salts thereof may also be used after hydrolysis.

The non-mordant monomer described above is a monomer that does not contain a basic or cationic unit such as a primary to tertiary amino group or a salt thereof or a quaternary ammonium salt group and has no or in practical terms only a very minor interaction with dyes in ink jet ink.

Examples of non-mordant monomers include alkyl (meth)acrylate esters; (meth)acrylic acid cycloalkylesters such as cyclohexyl (meth)acrylate; (meth)acrylic acid arylesters such as phenyl (meth)acrylate; aralkylesters such as benzyl (meth)acrylate; aromatic vinyl compounds such as styrene, vinyltoluene, and α-methylstyrene; vinyl esters such as vinyl acetate, vinyl propionate, and vinyl versatate; allyl esters such as allyl acetate; halogen-containing monomers such as vinylidene chloride and vinyl chloride; vinyl cyanides such as (meth)acrylonitrile; and olefins such as ethylene and propylene.

The alkyl (meth)acrylate esters above are preferably alkyl (meth)acrylate esters containing an alkyl group having 1 to 18 carbons, and specific examples thereof include methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, and stearyl (meth)acrylate. Among them, methyl acrylate, ethyl acrylate, methyl methacrylate, ethyl methacrylate, and hydroxyethyl methacrylate are preferable. The non-mordant monomers may also be used alone or in combinations of two or more.

In addition, examples of cationic mordants include cyclic amine resins and the derivatives thereof (including copolymers) such as copolymers of polydiallyldimethylammonium chloride or diallyldimethylammonium chloride with another monomer (mordant or non-mordant monomer), copolymers of diallyldimethylammonium chloride and $SO_2$, polydiallylmethylamine hydrochloride salts, and polydiallyl hydrochloride salts; copolymers of a secondary or tertiary amino- or quaternary ammonium salt-substituted alkyl (meth)acrylate polymer represented by polydiethylmethacryloyloxyethylamine, polytrimethylmethacryloyloxyethylammonium chloride, polydimethylbenzylmethacryloyloxyethylammonium chloride, or polydimethylhydroxyethylacrlyloyloxyethylammonium chloride and another monomer; polyamine resins represented by polyethyleneimine and derivatives thereof, polyallylamine and the derivatives thereof, polyvinyl amine and the derivatives thereof; polyamide resins represented by polyamide-polyamine resins and polyamide epichlorohydrin resins; polysaccharides represented by cationic starch, chitosan, and chitosan derivatives; dicyandiamide derivatives represented by dicyandiamide formaline polycondensates and dicyandiamide diethylenetriamine polycondensates; polyamidines and polyamidine derivatives; dialkylamine epichlorohydrin additional polymers and derivatives thereof represented by dimethylamine epichlorohydrin additional polymers; and copolymers of styrene and other monomers having a quaternary ammonium salt-substituted alkyl group.

Specific examples of the polymer mordants include those described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236, U.S. Pat. Nos. 2,484,430, 2,548,564, 3,148,061, 3,309,690, 4,115,124, 4,124,386, 4,193,800, 4,273,853, 4,282,305, and 4,450,224, JP-A Nos. 1-161236, 10-81064, 10-157277, 10-217601, 2001-138621, 2000-211235, 2001-138627, and 8-174992, JP-B Nos. 5-35162, 5-35163, 5-35164, and 5-88846, and Japanese Pat. Nos. 2,648,847 and 2,661,677.

An inorganic mordant may also be used as the mordant according to the invention, and examples thereof include polyvalent water-soluble metal salts, and hydrophobic metal salt compounds.

Specific examples of the inorganic mordants include the salts of the metals such as magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten, and bismuth, or complexes thereof.

Among them, preferable are aluminum-containing compounds such as aluminum sulfate, aluminum alum, aluminum sulfite, aluminum thiosulfate, polyaluminum chloride, basic aluminum lactate, basic aluminum sulfate, basic aluminum nitrate, basic aluminum sulfamate, basic aluminum formate, basic aluminum acetate, basic aluminum glycinate, aluminum nitrate nonahydrate, and aluminum chloride hexahydrate; titanium-containing compounds such as titanium tetrachloride, tetraisopropyl titanate, titanium acetylacetonate, and titanium lactate; and zirconium-containing compounds such as zirconium acetylacetonate, zirconyl acetate, zirconyl sulfate, zirconium ammonium carbonate, zirconyl stearate, zirconyl octanoate, zirconyl nitrate, zirconyl lactate, zirconyl succinate, zirconyl oxalate, zirconium ammonium acetate, zirconium potassium carbonate, zirconium sodium lactate, basic zirconium glycinate, zirconium oxychloride, and hydroxy zirconium chloride, and in particular, basic zirconium and/or basic aluminum salts are preferable.

Aluminum-containing compounds, titanium-containing compounds, zirconium-containing compounds, and metal compounds of the group IIIB elements in the periodic table (salts or complexes) are preferable as the inorganic mordants.

The content of the mordant in the ink receiving layer is preferably from 0.01 to 20 $g/m^2$, more preferably from 0.1 to 15 $g/m^2$, and particularly preferably from 0.5 to 10 $g/m^2$.

(Thermoplastic Resin)

The ink jet recording medium preferably contains a thermoplastic resin for enhancing ozone resistance. The thermoplastic resin is preferably contained in the ink receiving layer. Alternatively, the resin may be contained in other layers in the vicinity of the ink receiving layer, i.e., non-recording layers (preferably the outermost layer most distant from the support), independent of whether or not the resin is contained in the ink receiving layer. The resin is preferably contained in the ink receiving layer and in the outermost layer most distant from the support among the non-recording layers.

When it is contained in the ink receiving layer, the thermoplastic resin plays a role as a protective layer for protecting the ink receiving layer, by virtue of forming a film during the course of heat-pressing treatment. Alternatively, when a non-recording layer is the outermost layer, a protective layer of thermoplastic resin is formed in the course of the heat-pressing treatment.

The thermoplastic resin is not particularly limited, as long as the resin can form a protective layer higher in ozone resistance and light fastness by the heat-pressing treatment, and examples thereof include (A) resins having an ester bond, (B) polyurethane resins, (C) polyamide resins, (D) polysulfone resins, (E) polyvinyl chloride resins, (F) polyvinyl butyrals, (G) polycaprolactone resins, (H) polyolefin resins, and the like.

Examples of resins having ester bond (A) include polyester resins obtained by condensation of a dicarboxylic acid component such as terephthalic acid, isophthalic acid, maleic acid, fumaric acid, phthalic acid, adipic acid, sebacic acid, azelaic acid, abietic acid, succinic acid, trimellitic acid, and pyromellitic acid (these dicarboxylic acid components may be substituted with a sulfate, carboxyl, or other group) and an alcohol component such as ethylene glycol, diethylene glycol, propylene glycol, bisphenol A, a diether derivative of bisphenol A (e.g., bi-ethylene oxide adduct of bisphenol A, bi-propylene oxide adduct of bisphenol A, and the like), bisphenol S, 2-ethylcyclohexyldimethanol, neopentylglycol, cyclohexyldimethanol, and glycerin (these alcohol components may be substituted with a hydroxyl or other group); polyacrylic or polymethacrylic ester resins such as polymethyl methacrylate, polybutyl methacrylate, polymethyl acrylate, and polybutyl acrylate; polycarbonate resins; polyvinyl acetate resins; styrene acrylate resins; styrene-methacrylic ester copolymer resin; vinyltoluene acrylate resin; and the like, and more specific examples thereof include those described in JP-A Nos. 59-101395, 63-7971, 63-7972, 63-7973, and 60-294862.

Commercially available polyester resins include Vylon 290, Vylon 200, Vylon 280, Vylon 300, Vylon 103, Vylon GK-140, and Vylon GK-130 manufactured by Toyobo Co., Ltd.; Tuftone NE-382, Tuftone U-5, ATR-2009, and ATR-2010 manufactured by Kao Corporation; Elitel UE3500, UE3210, and XA-8153 manufactured by Unitika Ltd.; and Polyestar TP-220 and R-188 manufactured by Nippon Synthetic Chemical Industry Co., Ltd. In addition, commercially available acrylic resins include Dianal SE-5437, SE-5102, SE-5377, SE-5649, SE-5466, SE-5482, HR-169, 124, HR-1127, HR-116, HR-17929 13, HR-148, HR-131, HR-470, HR-634, HR-606, HR-607, LR-1065, 574, 143, 396, 637, 162, 469, and 216, BR-50, BR-52, BR-60, BR-64, BR-73, BR-75, BR-77, BR-79, BR-80, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, and BR-117 manufactured by Mitsubishi Rayon Co., Ltd.; Eslec P SE-0020, SE-0040, SE-0070, SE-0100, SE-1010, and SE-1035 manufactured by Sekisui Chemical Co., Ltd.; Himer ST95 and ST120 manufactured by Sanyo Chemical Industries, Ltd.; and FM601 manufactured by Mitsui Chemicals, Inc.

Examples of the polyvinyl chloride resins (E) include polyvinylidene chloride resins, vinyl chloride-vinyl acetate copolymer resins, and vinyl chloride-vinyl propionate copolymer resins.

Examples of the polyvinyl butyrals (F) include polyol resins and cellulose resins such as ethylcellulose resins and cellulose acetate resins. Commercially available products thereof include those manufactured by Denki Kagaku Kogyo Kabushiki Kaisha, and by Sekisui Chemical Co., Ltd. Co., Ltd. The polyvinyl butyral preferably has a polyvinyl butyral content of 70% by mass or more and an average polymerization degree of 500 or more, more preferably an average polymerization degree of 1,000 or more, and commercially available products thereof include Denka Butyral 3000-1, 4000-2, 5000A, and 6000C manufactured by Denki Kagaku Kogyo Kabushiki Kaisha; and Eslec BL-1, BL-2, BL-3, BL-S, BX-L, BM-1, BM-2, BM-5, BM-S, BH-3, BX-1, and BX-7, manufactured by Sekisui Chemical Co., Ltd.

Examples of the polycaprolactone resins (G) include styrene-maleic anhydride resins, polyacrylonitrile resins, polyether resins, epoxy resins, and phenol resins.

Examples of the polyolefin resins (H) include polyethylene resins, polypropylene resins, copolymer resins from an olefin such as ethylene, propylene, or the like and another vinyl monomer, and acrylic resins.

When a non-recording layer containing a thermoplastic resin is formed in addition to the ink receiving layer, the non-recording layer preferably may contain a plasticizer, releasing agent, a surfactant, or the like if necessary in addition to the thermoplastic resin.

The non-recording layer can be formed, for example, by dry lamination of a thermoplastic resin layer, application of a thermoplastic resin solution, application of an aqueous thermoplastic resin emulsion, impregnation of a thermoplastic resin emulsion, and melt-extrusion coating of a thermoplastic resin layer. In these cases, the non-recording layer forms a protective layer by virtue of the thermoplastic resin forming a film during heat-pressing treatment. When a non-recording layer is formed, the thickness of the layer is normally from 0.1 to 10 μm and more preferably from 0.5 to 3 μm.

(Other Aspects)

The ink receiving layer may as and when contain other various known additives such as acid, ultraviolet absorbent, antioxidant, fluorescent whitening agent, surfactant, monomer, polymerization initiator, polymerization inhibitor, anti-bleeding agent, antiseptic agent, viscosity-stabilizing agent, antiform agent, anti-static agent, matting agent, anti-curl agent, water-resistance agent, and the like.

—Surfactants—

The ink receiving layer preferably contains a surfactant. Any one of cationic, anionic, nonionic, ampholytic, fluorine-based, and silicone surfactants may be selected suitably as the surfactant. The surfactants may be used alone or in combinations of two or more.

Examples of nonionic surfactants include polyoxyalkylene alkylether and polyoxyalkylene alkylphenylethers (e.g., diethylene glycol monoethylether, diethylene glycol diethylether, polyoxyethylene laurylether, polyoxyethylene stearylether, polyoxyethylene nonylphenylether, and the like), oxyethylene-oxypropylene block copolymer, sorbitan fatty esters (e.g., sorbitan monolaurate, sorbitan monooleate, sorbitan trioleate, and the like), polyoxyethylene sorbitan fatty esters (e.g., polyoxyethylene sorbitan monolaurate, polyoxyethylene sorbitan monooleate, polyoxyethylene sorbitan trioleate, and the like), polyoxyethylene sorbitol fatty esters (e.g., polyoxyethylene sorbitol tetraoleate, and the like), glycerin fatty esters (e.g., glycerol monooleate, and the like), polyoxyethylene glycerin fatty esters (polyoxyethylene glycerin monostearate, polyoxyethylene glycerin monooleate, and the like), polyoxyethylene fatty esters (polyethyleneglycol monolaurate, polyethyleneglycol monooleate, and the like), polyoxyethylene alkylamines, acetylene glycols (e.g., 2,4,7,9-tetramethyl-5-decyne-4,7-diol, and the ethylene and propylene oxide adducts of the diols, and the like), and the like, and polyoxyalkylene alkylethers are preferable. The nonionic surfactants may be contained in the coating solution for the ink receiving layer (first solution) or in the basic solution (second solution), and may be used alone or in combination of two or more.

Amphoteric surfactants are those in the forms of amino acid, carboxy ammonium betaine, sulfone ammonium betaine, ammonium sulfuric acid ester betaine, imidazolium betaine, and the like. Examples which can be used to advantage include those described in U.S. Pat. No. 3,843,368, JP-A Nos. 59-49535, 63-236546, 5-303205, 8-262742, and 10-282619, and others. The amphoteric surfactants are preferably amphoteric surfactants in the form of amino acid. Examples of amino acid amphoteric surfactants, include N-acylamino acids having a long-chain acyl group prepared from amino acids (glycine, glutamic acid, histidine acid, etc.) and the salts thereof as described in JP-A No. 5-303205.These amphoteric surfactants may be used alone or in combinations of two or more.

Examples of anionic surfactants include fatty acid salts (e.g. sodium stearate, potassium oleate), alkylsulfate ester salts (e.g. sodium laurylsulfate, lauryl sulfuric acid triethanolamine), sulfonate salts (e.g. sodium dodecylbenzenesulfonate), alkylsulfosuccinate salts (e.g. sodium dioctylsulfosuccinate), alkyldiphenylether disulfonate salts, alkyl phosphate salts and the like.

Examples of cationic surfactants include alkylamine salts, quaternary ammonium salts, pyridinium salts, imidazolium salts, and the like.

Examples of fluorochemical surfactants described above include compounds prepared via intermediates having a perfluoroalkyl group by the methods such as electrolytic fluorination, telomerization, oligomerization, or the like. Specific examples thereof include perfluoroalkylsulfonate salts, perfluoroalkylcarboxylate salts, perfluoroalkyl ethylene oxide adducts, perfluoroalkyltrialkylammonium salts, perfluoroalkyl group-containing oligomers, perfluoroalkylphosphoric acid esters, and the like.

The silicone surfactant is preferably an organic group-modified silicone oil having a structure wherein the side chains or at least one of the terminals in the siloxane structure are modified with an organic group. Organic group modifications include amino modification, polyether modification, epoxy modification, carboxyl modification, carbinol modification, alkyl modification, aralkyl modification, phenol modification, fluorine modification, and the like.

The content of the surfactant in the coating solution for the ink receiving layer is preferably from 0.001 to 2.0% and more preferably from 0.01 to 1.0%. If two or more coating solutions are to be applied to the ink receiving layer, a surfactant is preferably added to each of the coating solutions.

The ink jet recording medium can be prepared, for example, by adding a cross-linking agent to at least one of a coating solution for forming an ink receiving layer containing at least a fine particle and a water-soluble resin (coating solution for the ink receiving layer; first solution) and the basic solution (second solution); and by forming an ink receiving layer of the medium by applying the coating solution (first solution) onto a support forming a coated layer and further, cross-linking and hardening the coated layer by applying a basic solution (second solution) at a pH of 7.1 or more, onto the coated layer either (1) simultaneously with application of the coating solution, or (2) while the coated layer prepared by applying the coating solution is dried and before the coated layer shows a falling-rate drying.

The term "before the coated layer manifests a reduction in the rate of drying" normally indicates a period of several minutes immediately after application of the coating solution on the ink receiving layer, during which the content of the solvent in the coated layer decrease linearly with time, i.e., the phenomenon of "constant-rate drying". The period of this "constant-rate drying" is described, for example, in the Chemical Engineering Handbook (pp. 707 to 712, Maruzen, Oct. 25, 1980).

The first solution may be applied by means of any application device known in the art, for example, with an extrusion die coater, an air doctor coater, a blade coater, a rod coater, a knife coater, a squeeze coater, a reverse roll coater, a bar coater, or the like.

[Ink Set]

The ink set according to the invention has a yellow ink containing at least one yellow dye, a magenta ink containing at least one magenta dye, and a cyan ink containing at least one cyan dye, as the minimum constituents.

Various dyes described below may be used as the dyes contained in each ink. In particular, in the ink set according to the recording method, a magenta dye and a cyan dye having an oxidation potential of higher than 0.8 V (vs. SCE) are used respectively in the magenta and cyan inks of the ink set. The higher the oxidation potential is the better, and thus the oxidation potential is more preferably higher than 1.0 V (vs. SCE), still more preferably higher than 1.1 V (vs. SCE), even more preferably, higher than 1.15 V (vs. SCE), and most preferably higher than 1.2 V (vs. SCE). In particular, it is preferable to combine the use of a magenta dye and a cyan dye respectively having an oxidation potential of higher than 0.8 V (vs. SCE) in order to obtain more balanced properties such as gray balance.

The oxidation potential is a value indicating the ease with which an electron can be transferred from a sample, and the higher the value (higher oxidation potential) the more the sample is resistant to electrode transfer, i.e., less easily oxidized. With regard to the structure of the compound, introduction of an electron-withdrawing group leads to increase in oxidation potential, while introduction of an electron-donating group results in a decrease in oxidation potential.

As will be described later, the value of oxidation potential of a compound means the potential at which an electron is withdrawn from the compound at the anode of a voltammeter, and this is considered to approximately correspond to the HOMO energy level in the ground state of the compound.

Moreover, the results of a study on the ozone fastness of color images suggests that there is a relationship between the oxidation potential of a compound used in color images and the ozone fastness of the images and that it is possible to enhance ozone fastness by using a compound which has a higher oxidation potential in relation to the saturated calomel electrode (SCE). The improvement in ozone fastness can be explained from the relationships between the HOMO (highest occupied molecular orbitals) and LUMO (lowest unoccupied molecular orbitals) of the compound and of the ozone gas. As it seems that the ozone fastness of color images is deteriorated by the reaction of the HOMO of the coloring agent and the LUMO of ozone gas, it is preferable to decrease the HOMO of the coloring agent and thus to put a break on reactivity with the ozone gas, in order to enhance ozone fastness.

The value of oxidation potential ($E_{ox}$) can be determined easily by persons skilled in the art. Methods of measurement are described in detail, for example, in "New Instrumental Methods in Electrochemistry" (P. Delahay, 1954, Interscience Publishers), "Electrochemical Methods" (A. J. Bard et al., 1980, John Wiley & Sons), and "Electrochemical Measurement Methods" (Akira Fujishima et al., 1984, Gihodo Shuppan).

Hereinafter, the method of measuring oxidation potential will be described more specifically.

Oxidation potential is determined in relation to SCE (saturated calomel electrode) by dissolving a test sample at a concentration of $1\times10^{-4}$ to $1\times10^{-6}$ mol·dm$^{-3}$ in a solvent such as dimethylformamide or acetonitrile, containing supporting electrolytes such as sodium perchlorate and tetrapropylammonium perchlorate, and by then analyzing the solution by cyclic voltammetry, or by direct-current polarography.

Appropriate supporting electrolytes and the solvent for use may be selected according to the oxidation potential and the solubility of the test sample. Examples of the suitable supporting electrolytes and solvents are described in "Electrochemical Measurement Methods" (Akira Fujishima et al., 1984, Gihodo Shuppan, pp. 101 to 118) described above.

Oxidation potential may occasionally deviate as a result of the effects of liquid junction potential and solution resistance on the part of the sample solution by up to several tens of milivolts. However, reproducibility of the measured potential can be assured by calibration with a standard sample (e.g. hydroquinone).

The oxidation potential used in the present specification is a value determined in N,N-dimethylformamide containing 0.1 mol·dm$^{-3}$ tetrapropylammonium perchlorate as the supporting electrolyte (concentration of the compound is $1\times10^{-3}$ mol·dm$^{-3}$) by direct current polarography, by using an SCE (saturated calomel electrode) as the reference electrode, a graphite electrode as the working electrode, and a platinum electrode as the counter electrode.

Any dye in any structure may be used as the dye according to the invention as long as such a dye satisfies the oxidation potential described above. In particular, yellow dyes, which intrinsically have a higher oxidation potential (and thus a lower HOMO) are subjected to fewer restrictions structurally.

Hereinafter, the structure of dyes satisfying requirements in respect of oxidation potential will be described in detail.

In the invention, it is preferable to introduce an electron-withdrawing group into a dye skeleton for raising the oxidation potential and thus for reducing the reactivity with an electrophilic agent, ozone. In terms of Hammett's substituent constant $\sigma_p$, an indicator of the electron withdrawing or donating potential of a substituent, it is possible to enhance oxidation potential by introducing a substituent having a higher $\sigma_p$ value such as a nitro, cyano, sulfinyl, sulfonyl, sulfamoyl, or other group.

Hammett's substituent constant $\sigma_p$ will be described hereinafter. The Hammett equation is an empirical equation proposed by L. P. Hammett in 1935 for discussing more quantitatively the effects of substituents on the reaction and equilibrium of benzene derivatives, and is still regarded as authoritative. A set of substituent constants $\sigma_p$ and $\sigma_m$ used in the Hammett equation are found in many general textbooks and described in detail, for example, in "Lange's Handbook of Chemistry" 12th Ed., J. A. Dean Ed., 1979 (McGraw-Hill) and "Kagaku no Ryoiki" Special Issue No. 122, pp. 96 to 103, 1979 (Nankodo).

In addition to substituents above, compounds containing many atoms higher in electronegativity as the constituent atoms of the chromophore generally have a higher oxidation potential. Therefore, compounds having, for example, an unsaturated heterocyclic ring as a constituent of chromophore have a higher oxidation potential than those having an aryl group. A heteroatom high in electronegativity includes nitrogen, oxygen, and sulfur atoms, and a nitrogen atom is particularly preferable. Therefore, the dye according to the invention is preferably a dye having a chromophore containing a heteroatom, an unsaturated heterocyclic ring, or an electron-withdrawing group. Preferable examples of chromophores containing a heteroatom include azo dyes, azomethine dyes, phthalocyanine dyes, and the like, and azo dyes are particularly preferable.

The unsaturated heterocyclic ring is preferably a five- or six-membered unsaturated heterocyclic ring Examples thereof include a thiophene ring, a furan ring, a pyrrole ring, a thiazole ring, an oxazole ring, an imidazole ring, an isothiazole ring, an isoxazole ring, a pyrazole ring, a thiadiazole ring, an oxadiazole ring, a triazole ring, a pyridine ring, a pyridazine ring, a pyrimidine ring, and a pyrazine ring. The unsaturated heterocyclic ring may form a fused ring with another hydrocarbon ring or heterocyclic ring. When a nitrogen-containing heterocyclic ring is used, the nitrogen atom may be converted to a quaternary salt. Futher, when the heterocyclic ring is a tautomeric mixture, a description about a tautomer would also apply to the other tautomer. Preferable among the heterocyclic rings listed above are the thiazole ring, the isothiazole ring, the pyrazole ring, the thiadiazole ring, the pyridine ring, the pyrimidine ring, and the pyrazine ring. Particularly preferable are the isothiazole ring, the pyrazole ring, a 1,2,4-thiadiazole ring, a 1,3,4-thiadiazole ring, and the pyridine ring.

Preferable electron-withdrawing substituents are those having a Hammett's $\sigma_p$ of 0.40 or more, more preferably 0.45 or more, and still more preferably 0.50 or more. In addition, if the chromophore has multiple electron-withdrawing groups as substituents, the total amount of substituent constants $\sigma_p$'s is preferably 0.50 or more, more preferably 0.60 or more, and particularly preferably 0.70 or more. Specific examples of electron-withdrawing groups having a $\sigma_p$ of 0.40 or more are those described in "Lange's Handbook of Chemistry" 12th Ed. (J. A. Dean ed., 1979, McGraw-Hill) and "Kagaku no Ryoiki" Special Issue No. 122 (pp. 96 to 103, 1979, Nankodo) described above.

Appropriate dyes include dyes represented by the following Formula (i). In the Formula (i), Ch represents a chromophore containing an unsaturated heterocyclic ring, and EWG represents an electron-withdrawing substituent having a $\sigma_p$ of 0.40 or more as will be described below. n is an integer of 1 to 8.

(Ch)-(EWG)$_n$                                      Formula (i)

Examples of the Ch's include chromophores of azo dyes, phthalocyanine dyes, azomethine dyes, quinone dyes (anthraquinone dye, anthrapyridone dye, etc.), carbonium dyes (triphenylmethane dye, xanthene dye, acridine dye, etc.), and azine dyes (oxazine, thiazine, etc.), all of which have an unsaturated heterocyclic ring as the chromophore. Preferable are azo dyes, phthalocyanine dyes, azomethine dyes, and anthrapyridone dyes having an unsaturated heterocyclic ring as the chromophore, and particularly preferable are azo dyes and phthalocyanine dyes having an unsaturated heterocyclic ring as the chromophore.

Azo dyes favorably used as the magenta and yellow dyes include dyes represented by the following Formula (ii). In the Formula (ii), Het(A) and Het(B) each represents independently a five-membered or six-membered unsaturated heterocyclic ring.

Het(A)-N=N-Het(B)                                   Formula (ii)

Examples of the unsaturated heterocyclic ring represented by Het(A) or Het(B) include a thiophene ring, a furan ring, a pyrrole ring, a thiazole ring, an oxazole ring, an imidazole ring, an isothiazole ring, an isoxazole ring, a pyrazole ring, a thiadiazole ring, an oxadiazole ring, a triazole ring, a pyridine ring, a pyridazine ring, a pyrimidine ring, a pyrazine ring, and the like. These unsaturated heterocyclic rings may have one or more substituents. Substituents on the unsaturated heterocyclic ring may bind to each other forming a fused ring with another hydrocarbon or unsaturated heterocyclic ring. Further, the fused ring may have a substituent. When a nitrogen-containing unsaturated heterocyclic ring is used, the nitrogen atom may be converted to a quaternary salt. If the unsaturated heterocyclic ring is a tautomeric mixture, any description concerning a tautomer also applies to other tautomers.

If the dye is a water-soluble dye, the dye preferably has in addition an ionic hydrophilic group as the substituent. Ionic hydrophilic substituent groups include sulfo, carboxyl, phosphono and quaternary ammonium groups, and the like.

Preferable examples of heterocyclic rings represented by Het(A) or Het(B) include a thiazole ring, an isothiazole ring, a pyrazole ring, a thiadiazole ring, a pyridine ring, a pyrazine ring, and the like. Still more preferable examples thereof include the isothiazole ring, the pyrazole ring, the thiadiazole ring, and the pyridine ring. Particularly preferable are the pyrazole ring, a 1,2,4-thiadiazole ring and the pyridine ring.

The groups Het(A) and Het(B) may each have one or more substituents. Examples of substituents include halogen atoms, alkyl groups (including cycloalkyl groups), alkenyl groups (including cycloaklenyl groups), alkynyl groups, aryl groups, heterocyclic groups, a cyano group, a hydroxyl group, a nitro group, a carboxyl group, alkoxy groups, aryloxy groups, silyloxy groups, heterocyclic oxy groups, acyloxy groups, carbamoyloxy groups, alkoxycarbonyloxy groups, aryloxycarbonyloxy groups, amino groups (including anilino groups), acylamino groups, aminocarbonylamino groups, alkoxycarbonylamino groups, aryloxycarbonylamino groups, sulfamoylamino groups, alkyl- and aryl-sulfonylamino groups, a mercapto group, alkylthio groups, arylthio groups, heterocyclic thio groups, sulfamoyl groups, sulfo groups, alkyl- and aryl-sulfinyl groups, alkyl- and aryl-sulfonyl groups, acyl groups, aryloxycarbonyl groups, alkoxycarbonyl groups, carbamoyl groups, aryl- and heterocyclic-azo groups, imido groups, phosphino groups, phosphoryl groups, phosphono groups, phosphinyl groups, phosphonyl groups, phosphinyloxy groups, phosphinylamino groups, silyl groups, and the like.

Among substituents listed above, halogen atoms, alkyl groups, alkenyl groups, heterocyclic groups, a cyano group, a nitro group, a carboxyl group, acyloxy groups, carbamoyloxy groups, alkoxycarbonyloxy groups, aryloxycarbonyloxy groups, sulfamoyl groups, sulfo groups, alkyl- and aryl-sulfinyl groups, alkyl- and aryl-sulfonyl groups, acyl groups, aryloxycarbonyl groups, alkoxycarbonyl groups, carbamoyl groups, imido groups, phosphoryl groups, phosphono groups, phosphinyl groups, phosphonyl groups, phosphinyloxy groups, and phosphinylamino groups are favorable; among them, electron-withdrawing groups are preferably; and in particular, substituents having a $\sigma_p$ of 0.40 or more are preferable.

Examples of substituents having a $\sigma_p$ of 0.40 or more include a cyano group, a nitro group, a carboxyl group, sulfamoyl groups, alkyl- or aryl-sulfinyl groups, alkyl- or aryl-sulfonyl groups, acyl groups, aryloxycarbonyl groups, alkoxycarbonyl groups, carbamoyl groups, imido groups, phosphono groups, phosphoryl groups, and alkyl group substituted with an electron-withdrawing group (e.g., a trihalomethyl group, a perfluoroalkyl group, a dicyanomethyl group, an iminomethyl group, or the like), alkenyl groups substituted with an electron-withdrawing group (e.g., a tricyanovinyl group or the like), and quaternary salt substituents (e.g., a sulfonium group, an ammonium group, a phosphonium group, etc.). Among the groups listed above, groups having a hydrogen atom may be substituted with the above group replacing the hydrogen. Examples of such substituents include alkylcarbonylaminosulfonyl groups, arylcarbonylaminosulfonyl groups, alkylsulfonylaminocarbonyl groups, arylsulfonylaminocarbonyl groups, and the like.

In addition, substituents on the heterocyclic ring may bind to each other forming a fused ring with the heterocyclic ring, and the fused ring may have additionally a substituent.

Preferable magenta dyes are those represented by the following Formula (M-I).

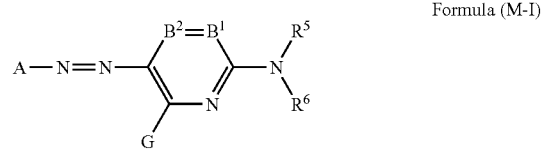

Formula (M-I)

In the Formula (M-I), A represents the residue of a five-membered heterocyclic diazo component (A-NH$_2$); B$^1$ represents =CR$^1$— and B$^2$ represents —CR$^2$=, or alternatively one of B$^1$ and B$^2$ is a nitrogen atom and the other represents =CR$^1$— or —CR$^2$=.

R$^5$ and R$^6$ in the Formula (M-I) each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, a sulfamoyl group or another group. Each group may have additionally one or more substituents.

G, R$^1$, and R$^2$ in the Formula (M-I) each independently represents a hydrogen atom, a halogen atom, an aliphatic group, an aromatic group, a heterocyclic group, an cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (heterocyclic amino group, including anilino groups), an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, an alkylsulfonyl group, an arylsulfonyl group, a heterocyclic sulfonyl group, an alkylsulfinyl group an arylsulfinyl group, a heterocyclic sulfinyl group, a sulfamoyl group, a sulfo group, or a heterocyclic thio group. Each group may in addition have one or more substituents. In addition, R$^1$ and R$^5$ or R$^5$ and R$^6$ may bind to each other forming a five- or six-membered ring.

The compound represented by Formula (M-I) will be described in more detail below.

Examples of hetero atoms of the five-membered heterocyclic ring in "the residue of a five-membered heterocyclic diazo component (A-NH$_2$)" represented by A in Formula (M-I) include N, O, and S. The five-membered heterocyclic ring is preferably a nitrogen-containing five-membered heterocyclic ring, which may have an aliphatic, aromatic, or other heterocyclic ring fused to the heterocyclic ring. Preferable examples of the heterocyclic ring represented by A include a pyrazole ring, an imidazole ring, a thiazole ring, an isothiazole ring, a thiadiazole ring, a benzothiazole ring, a benzoxazole ring, and a benzoisothiazole ring. Each heterocyclic group may in addition have one or more substituents.

Among them, an pyrazole ring, an imidazole ring, an isothiazole ring, a thiadiazole ring, and a benzothiazole ring represented by the following Formulae (M-a) to (M-f) are preferable.

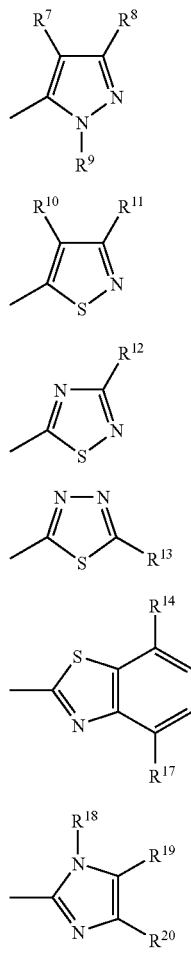

(M-a)
(M-b)
(M-c)
(M-d)
(M-e)
(M-f)

$R^7$ to $R^{20}$ in the Formulae (M-a) to (M-f) are the same as G, $R^1$ and $R^2$ in the Formulae (M-I) as will be described later.

Among the rings represented by Formulae (M-a) to (M-f), the pyrazole and isothiazole rings represented by Formula (M-a) or Formula (M-b) are preferable, and the pyrazole rings represented by Formula (M-a) are most preferable.

With regard to the $B^1$ and $B^2$ in the Formula (M-I), $B^1$ represents =CR$^1$— and $B^2$ represents —CR$^2$=, one of $B^1$ and $B^2$ is a nitrogen atom and the other represents =CR$^1$— or —CR$^2$=; and a ring wherein $B^1$ represents =CR$^1$— and $B^2$ represents —CR$^2$= is more preferable.

Among the groups represented by $R^5$ or $R^6$, a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group is preferably, and a hydrogen atom, an aliphatic group, an aromatic group, a heterocyclic group, an acyl group, an alkylsulfonyl group, or an arylsulfonyl group is more preferable. The most preferable is a hydrogen atom, an aryl group, or a heterocyclic group.

Each group may have additionally one or more substituents. However, $R^5$ and $R^6$ are not hydrogen atoms at the same time.

G, $R^1$ and $R^2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including anilino and heterocyclic amino groups), an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group, and each group may have additionally one or more substituents.

A group for G in the Formula (M-I) is preferably a hydrogen atom, a halogen atom, an aliphatic group, an aromatic group, a hydroxy group, an alkoxy group, an aryloxy group, an acyloxy group, a heterocyclic oxy group, an amino group (including anilino and heterocyclic amino groups), an acylamino group, an ureido group, a sulfamoylamino group, an alkoxycarbonylamino group, an aryloxycarbonylamino group, an alkylthio group, an arylthio group, and a heterocyclic thio group; more preferably, a hydrogen atom, a halogen atom, an alkyl group, a hydroxy group, an alkoxy group, an aryloxy group, an acyloxy group, an amino group (including anilino and heterocyclic amino groups), or an acylamino group; and still more preferably a hydrogen atom, an anilino group, or an acylamino group. Each group may in addition have one or more substituents.

Preferable examples of the groups $R^1$ and $R^2$ of the $B^1$ and $B^2$ in the Formula (M-I) include a hydrogen atom and alkyl, halogen, alkoxycarbonyl, carboxyl, carbamoyl, hydroxy, and cyano groups. Each group may have additionally one or more substituents.

$R^1$ and $R^5$ or $R^5$ and $R^6$ in the Formula (M-I) may bind to each other forming a five- to six-membered ring. In addition, when each group represented by A, $R^1$, $R^2$, $R^5$, $R^6$, and G in the Formula (M-I) has additionally a substituent, substituents include the groups described above for G, $R^1$, and $R^2$.

If the dye according to the invention is a water-soluble dye, the dye preferably has additionally an ionic hydrophilic group as a substituent at a position either of A, $R^1$, $R^2$, $R^5$, $R^6$, or G. Examples of substituents, which are ionic hydrophilic groups, include a sulfo group, a carboxyl group, a phosphono group, a quaternary ammonium group, and the like. The ionic hydrophilic group is preferably a carboxyl group, a phosphono group, or a sulfo group, and more preferably a carboxyl or a sulfo group. The carboxyl, phosphono, and sulfo groups may be in the form of salt, and examples of the counter ions forming the salts include an ammonium ion, an alkali metal ions (e.g., lithium ion, sodium ion, and potassium ion) and an organic cations (e.g., tetramethylammonium ion, tetramethylguanidium ion, and tetramethylphosphonium).

Hereinafter, each group represented by G, $R^1$ or $R^2$ will be described in more detail.

The halogen atoms represented by G, $R^1$ or $R^2$ in the Formula (M-I) include fluorine, chlorine, and bromine atoms.

The aliphatic groups represented by G, $R^1$ or $R^2$ in the Formula (M-I) mean alkyl groups, substituted alkyl groups, alkenyl groups, substituted alkenyl groups, alkynyl groups, substituted alkynyl groups, aralkyl groups, and substituted aralkyl groups. The aliphatic groups may be branched or may have a ring structure. The number of carbons in the aliphatic group is preferably from 1 to 20 and more preferably from 1 to 16. The aryl portion of the aralkyl and substituted aralkyl groups is preferably phenyl or naphthyl and more preferably phenyl. Examples of the aliphatic groups include methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl, and allyl groups.

In the present specification, an aromatic moiety means an aryl group or a substituted aryl group. The aryl group is preferably a phenyl or naphthyl group and more preferably a phenyl group. The number of carbons of the aromatic groups represented by G, $R^1$ or $R^2$ in the Formula (M-I) is preferably from 6 to 20 and more preferably from 6 to 16. Examples of the aromatic groups include phenyl, p-toluyl, p-methoxy phenyl, o-chlorophenyl, and m-(3-sulfopropylamino)phenyl groups.

The heterocyclic groups represented by G, $R^1$ or $R^2$ in the Formula (M-I) include both heterocyclic groups having a substituent and unsubstituted heterocyclic groups. The heterocyclic ring may be fused with an aliphatic ring, an aromatic ring, or other heterocyclic ring. The heterocyclic groups are preferably heterocyclic groups of five-membered or six-membered ring. Examples of substituents thereof include aliphatic groups, halogen atoms, alkylsulfonyl groups, arylsulfonyl groups,. acyl groups, acylamino groups, sulfamoyl groups, carbamoyl groups, and ionic hydrophilic groups, and the like. Examples of the heterocyclic groups include 2-pyridyl, 2-thienyl, 2-thiazolyl, 2-benzothiazolyl, 2-benzoxazolyl, and 2-furyl groups.

Examples of alkylsulfonyl and arylsulfonyl groups represented by G, $R^1$ or $R^2$ in the Formula (M-I) include respectively methylsulfonyl and phenylsulfonyl groups.

Examples of alkylsulfinyl and arylsulfinyl groups represented by G, $R^1$ or $R^2$ in the Formula (M-I) include respectively methylsulfinyl and phenylsulfinyl groups.

The acyl groups represented by G, $R^1$ or $R^2$ in the Formula (M-I) include substituted and unsubstituted acyl groups. The number of carbons in the acyl group is preferably from 1 to 20. Examples of substituents include ionic hydrophilic groups. Examples of acyl groups include acetyl and benzoyl groups.

The amino groups represented by G, $R^1$ or $R^2$ in the Formula (M-I) include amino groups substituted with an alkyl group, an aryl group, or a heterocyclic group, and the alkyl groups, aryl groups, and heterocyclic groups may be further substituted. An unsubstituted amino group is not included.

The alkylamino group is preferably an alkylamino group having from 1 to 20 carbons. Examples of substituents include ionic hydrophilic groups additionally. Examples of the alkylamino groups include methylamino and diethyl amino groups.

The arylamino groups include substituted and unsubstituted arylamino groups. The arylamino group is preferably an arylamino group having from 6 to 20 carbons. Examples of the other substituents include halogen atoms and ionic hydrophilic groups. Examples of the arylamino groups include anilino and 2-chloroanilino groups.

The heterocyclic amino groups represented by G, $R^1$ or $R^2$ in the Formula (M-I) include substituted and unsubstituted heterocyclic amino groups. The heterocyclic amino group is preferably a heterocyclic amino group having from 2 to 20 carbons. Examples of substituents thereof include alkyl groups, halogen atoms, and ionic hydrophilic groups.

The alkoxy groups represented by G, $R^1$ or $R^2$ in the Formula (M-I) include substituted and unsubstituted alkoxy groups. The alkoxy group is preferably an alkoxy group having from 1 to 20 carbons. Examples of substituents when the alkoxy group is substituted include alkoxy groups, a hydroxyl group, and ionic hydrophilic groups. Examples of the alkoxy groups include methoxy, ethoxy, isopropoxy, methoxyethoxy, hydroxyethoxy, and 3-carboxypropoxy groups.

The aryloxy groups represented by G, $R^1$ or $R^2$ in the Formula (M-I) include substituted and unsubstituted aryloxy groups, and the aryloxy group is preferably an aryloxy group having from 6 to 20 carbons. Examples of substituents when the aryloxy group is substituted include alkoxy groups and ionic hydrophilic groups. Examples of the aryloxy groups include phenoxy, p-methoxyphenoxy, and o-methoxyphenoxy groups.

The silyloxy group represented by G, $R^1$ or $R^2$ in the Formula (M-I) is a silyloxy group substituted with an aliphatic group having from 1 to 20 carbons or an aromatic group. Examples of the silyloxy groups include trimethylsilyloxy and diphenylmethylsilyloxy groups.

The heterocyclic oxy groups represented by G, $R^1$ or $R^2$ in the Formula (M-I) include substituted and unsubstituted heterocyclic oxy groups. The heterocyclic oxy group is preferably a heterocyclic oxy group having from 2 to 20 carbons. Examples of substituents include alkyl groups, alkoxy groups, and ionic hydrophilic groups. Examples of the heterocyclic oxy groups include 3-pyridyloxy, and 3-thienyloxy groups.

The alkoxycarbonyloxy groups represented by G, $R^1$ or $R^2$ in the Formula (M-I) include substituted and unsubstituted alkoxycarbonyloxy groups. The alkoxycarbonyloxy group is preferably an alkoxycarbonyloxy group having from 2 to 20 carbons. Examples of the alkoxycarbonyloxy groups include methoxycarbonyloxy and isopropoxycarbonyloxy groups.

The aryloxycarbonyloxy groups represented by G, $R^1$ or $R^2$ in the Formula (M-I) include substituted and unsubstituted aryloxycarbonyloxy groups. The aryloxycarbonyloxy group is preferably an aryloxycarbonyloxy group having from 7 to 20 carbons. Examples of the aryloxycarbonyloxy groups include a phenoxycarbonyloxy group.

The acylamino groups represented by G, $R^1$ or $R^2$ in the Formula (M-I) include substituted acylamino groups. The acylamino group is preferably an acylamino group having from 2 to 20 carbons. Examples of substituents when the acylamino group is substituted include ionic hydrophilic groups. Examples of the acylamino groups include acetylamino, propionylamino, benzoylamino, N-phenylacetylamino, and 3,5-disulfobenzoylamino groups.

The ureido groups represented by G, $R^1$ or $R^2$ in the Formula (M-I) include substituted and unsubstituted ureido groups. The ureido group is preferably an ureido group having from 1 to 20 carbons. Examples of substituents when the ureido group is substituted include alkyl groups and aryl groups. Examples of the ureido groups include 3-methylureide, 3,3-dimethylureide, and 3-phenylureido groups.

The sulfamoylamino groups represented by G, $R^1$ or $R^2$ in the Formula (M-I) include substituted and unsubstituted sulfamoylamino groups. Examples of substituents when the sufamoylamino group is substituted include alkyl groups. Examples of the sulfamoylamino groups include an N,N-dipropyl sulfamoylamino group.

The alkoxycarbonylamino groups represented by G, $R^1$ or $R^2$ in the Formula (M-I) include substituted and unsubstituted alkoxycarbonylamino groups. The alkoxycarbonylamino group is preferably an alkoxycarbonylamino group having from 2 to 20 carbons. Examples of substituents when the group is substituted include ionic hydrophilic groups. Examples of the alkoxycarbonylamino groups include an ethoxycarbonylamino group.

The alkylsulfonylamino groups and the arylsulfonylamino groups represented by G, $R^1$ or $R^2$ in the Formula (M-I) include substituted and unsubstituted alkyl- and aryl-sulfonylamino groups. The alkyl- or aryl-sulfonylamino group is preferably an alkyl- or aryl-sulfonylamino group having from 1 to 20 carbons. Examples of substituents when the group is substituted include ionic hydrophilic groups. Examples of the alkyl- and aryl-sulfonylamino groups include methylsulfonylamino, N-phenylmethanesulfonylamino, benzenesulfonylamino, and 3-carboxybenzenesulfonylamino groups.

The carbamoyl groups represented by G, $R^1$ or $R^2$ in the Formula (M-I) include substituted and unsubstituted carbamoyl groups. Examples of substituents when the group is substituted include alkyl groups. Examples of the carbamoyl groups include methylcarbamoyl and dimethylcarbamoyl groups.

The sulfamoyl groups represented by G, $R^1$ or $R^2$ in the Formula (M-I) include substituted and unsubstituted sulfamoyl groups. Examples of substituents when the group is substituted include alkyl groups. Examples of the sulfamoyl groups include dimethylsulfamoyl and di-(2-hydroxyethyl) sulfamoyl groups.

The alkoxycarbonyl groups represented by G, $R^1$ or $R^2$ in the Formula (M-I) include substituted and unsubstituted alkoxycarbonyl groups. The alkoxycarbonyl group is preferably an alkoxycarbonyl group having 2 to 20 carbons. Examples of substituents when the group is substituted include ionic hydrophilic groups. Examples of the alkoxycarbonyl groups include methoxycarbonyl and ethoxycarbonyl groups.

The acyloxy groups represented by G, $R^1$ or $R^2$ in the Formula (M-I) include substituted and unsubstituted acyloxy groups. The acyloxy group is preferably an acyloxy group having from 1 to 20 carbons. Examples of substituents when the group is substituted include ionic hydrophilic groups. Examples of the acyloxy groups include acetoxy and benzoyloxy groups.

The carbamoyloxy groups represented by G, $R^1$ or $R^2$ in the Formula (M-I) include substituted and unsubstituted carbamoyloxy groups. Examples of substituents when the group is substituted include alkyl groups. Examples of the carbamoyloxy groups include an N-methylcarbamoyloxy group.

The aryloxycarbonyl groups represented by G, $R^1$ or $R^2$ in the Formula (M-I) include substituted and unsubstituted aryloxycarbonyl groups. The aryloxycarbonyl group is preferably an aryloxycarbonyl group having from 7 to 20 carbons. Examples of substituents when the group is substituted include ionic hydrophilic groups. Examples of the aryloxycarbonyl groups include a phenoxycarbonyl group.

The aryloxycarbonylamino groups represented by G, $R^1$ or $R^2$ in the Formula (M-I) include substituted and unsubstituted aryloxycarbonylamino groups. The aryloxycarbonylamino group is preferably an aryloxycarbonylamino group having from 7 to 20 carbons. Examples of substituents when the group is substituted include ionic hydrophilic groups. Examples of the aryloxycarbonylamino groups include a phenoxycarbonyl amino group.

The alkylthio, arylthio, and heterocyclic thio groups represented by G, $R^1$ or $R^2$ in the Formula (M-I) include substituted and unsubstituted alkyl, aryl and heterocyclic thio groups. The alkyl, aryl and heterocyclic thio groups are preferably those having from 1 to 20 carbons. Examples of substituents when the group is substituted include ionic hydrophilic groups. Examples of the alkyl, aryl and heterocyclic thio groups include methylthio, phenylthio, and 2-pyridylthio groups.

The heterocyclic oxycarbonyl groups represented by G, $R^1$ or $R^2$ in the Formula (M-I) include substituted and unsubstituted heterocyclic oxycarbonyl groups. The heterocyclic oxycarbonyl group is preferably a heterocyclic oxycarbonyl group having from 2 to 20 carbons. Examples of substituents thereof include ionic hydrophilic groups. Examples of the heterocyclic oxycarbonyl groups include a 2-pyridyloxycarbonyl group.

The heterocyclic sulfonylamino groups represented by G, $R^1$ or $R^2$ in the Formula (M-I) include substituted and unsubstituted heterocyclic sulfonylamino groups. The heterocyclic sulfonylamino group is preferably a heterocyclic sulfonylamino group having 1 to 12 carbons. Examples of substituents thereof include ionic hydrophilic groups. Examples of the heterocyclic sulfonylamino groups include 2-thiophenesulfonylamino and 3-pyridinesulfonylamino groups.

The heterocyclic sulfonyl groups represented by G, $R^1$ or $R^2$ in the Formula (M-I) include substituted and unsubstituted heterocyclic sulfonyl groups. The heterocyclic sulfonyl group is preferably a heterocyclic sulfonyl group having from 1 to 20 carbons. Examples of substituents thereof include ionic hydrophilic groups. Examples of the heterocyclic sulfonyl groups include 2-thiophenesulfonyl and 3-pyridinesulfonyl groups.

The heterocyclic sulfinyl groups represented by G, $R^1$ or $R^2$ in the Formula (M-I) include substituted and unsubstituted heterocyclic sulfinyl groups. The heterocyclic sulfinyl group is preferably a heterocyclic sulfinyl group having from 1 to 20 carbons. Examples of substituents thereof include ionic hydrophilic groups. Examples of the heterocyclic sulfinyl groups include a 4-pyridinesulfinyl group.

Among the dyes represented by Formula (M-I) above, dyes represented by the following Formula (M-II) are preferable.

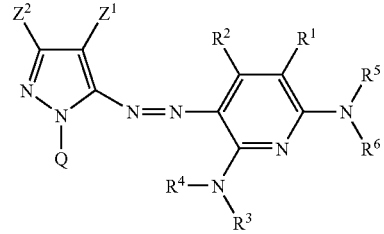

Formula (M-II)

In the Formula (M-II), $Z^1$ represents an electron-withdrawing group having a Hammett's substituent constant $\sigma_p$ of 0.20 or more. $Z^1$ is more preferably an electron-withdrawing group having a $\sigma_p$ of from 0.30 to 1.0. It is more preferably an electron-withdrawing group having a $\sigma_p$ of from 0.45 to 1.0, and still more preferably an electron-withdrawing group of from 0.60 to 1.0.

Typical advantageous examples of an electron-withdrawing group include the electron-withdrawing substituent described below; and among them, acyl groups having from 2 to 20 carbons, alkyloxycarbonyl groups having from 2 to 20 carbons, a nitro group, a cyano group, alkylsulfonyl groups having from 1 to 20 carbons, arylsulfonyl groups having from 6 to 20 carbons, carbamoyl groups having from 1 to 20 carbons, and halogenated alkyl groups having from 1 to 20 carbons are preferable. Particularly preferable are a cyano group, alkylsulfonyl groups having from 1 to 20 carbons, and arylsulfonyl groups having from 6 to 20 carbons, and most preferable is a cyano group.

$R^1$, $R^2$, $R^5$, and $R^6$ in the Formula (M-II) are respectively the same as $R^1$, $R^2$, $R^5$ and $R^6$ in the Formula (M-I).

$R^3$ and $R^4$ in the Formula (M-II) each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Among them, a hydrogen atom, a aromatic group, a heterocyclic group, an acyl group, an alkylsulfonyl group, or an arylsulfonyl group is preferable, and a hydrogen atom, an aromatic group, or a heterocyclic group is particularly preferable.

$Z^2$ in the Formula (M-II) above represents a hydrogen atom, an aliphatic group, an aromatic group, or a heterocyclic group.

Q in the Formula (M-II) above represents a hydrogen atom, an aliphatic group, an aromatic group, or a heterocyclic group. Among them, Q is preferably a group selected from nonmetal atoms that are required for forming a five- to eight-membered ring. The five- to eight-membered ring may be additionally substituted, and may be a saturated ring or a ring containing unsaturated bonds. Among them, aromatic and heterocyclic groups are preferable. Preferable nonmetal atoms include nitrogen, oxygen, sulfur, and carbon atoms. Specific examples of the five- to eight-membered rings include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring, a thiane ring, and the like.

Each group in the Formula (M-II) described above may have additionally one or more substituents. Substituents of each group when substituted include substituents described in the Formula (M-I), the groups exemplified as substituents for G, $R^1$ and $R^2$, and ionic hydrophilic groups.

Examples of the electron-withdrawing groups having a Hammett substituent constant $\sigma_p$ of 0.60 or more include a cyano group, a nitro group, alkylsulfonyl groups (e.g. a methane sulfonyl group), and arylsulfonyl groups (e.g. a benzene sulfonyl group).

Examples of the electron-withdrawing groups having a Hammett $\sigma_p$ of 0.45 or more include in addition to the groups described above, acyl groups (e.g. acetyl group), alkoxycarbonyl groups (e.g. a dodecyl oxycarbonyl group), aryloxycarbonyl groups (e.g., m-chlorophenoxycarbonyl), alkylsulfinyl groups (e.g., n-propyl sulfinyl), arylsulfinyl groups (e.g. phenylsulfinyl), sulfamoyl groups (e.g., N-ethyl sulfamoyl and N,N-dimethylsulfamoyl), and halogenated alkyl groups (e.g., trifluoromethyl).

Examples of electron-withdrawing groups having a Hammett substituent constant $\sigma_p$ of 0.30 or more include, in addition to the groups described above, acyloxy groups (e.g., acetoxy), carbamoyl groups (e.g., N-ethyl carbamoyl and N,N-dibutylcarbamoyl), halogenated alkoxy groups (e.g., trifluoromethyl oxy), halogenated aryloxy groups (e.g., pentafluorophenyloxy), sulfonyloxy groups (e.g. a methylsulfonyloxy group), halogenated alkylthio groups (e.g., difluoromethylthio), aryl groups substituted with two or more electron-withdrawing groups having a $\sigma_p$ of 0.15 or more (e.g., 2,4-dinitrophenyl and pentachlorophenyl), and heterocyclic rings (e.g., 2-benzoxazolyl, 2-benzothiazolyl, and 1-phenyl-2-benzimidazolyl).

Specific examples of electron-withdrawing groups having a Hammett substituent constant $\sigma_p$ of 0.20 or more further include halogen atoms in addition to the groups described above.

Combinations of $R^5$, $R^6$, A, $B^1$, $B^2$ and G which are particularly preferable as the compound represented by Formula (M-I) are as follows:

(A) $R^5$ and $R^6$ each is preferably a hydrogen atom, an alkyl group, an aryl group, a heterocyclic group, a sulfonyl group, or an acyl group, more preferably a hydrogen atom, an aryl group, a heterocyclic group, or a sulfonyl group, and most preferably a hydrogen atom, an aryl group, or a heterocyclic group. However, $R^5$ and $R^6$ are not hydrogen atoms at the same time.

(B) G is preferably a hydrogen atom, halogen atom, alkyl group, hydroxyl group, amino group, or amido group, more preferably a hydrogen atom, halogen atom, amino group, or amido group, and still more preferably a hydrogen atom, amino group, or amido group.

(C) A is preferably a pyrazole ring, an imidazole ring, an isothiazole ring, a thiadiazole ring, or a benzothiazole ring, more preferably a pyrazole ring or an isothiazole ring, and still more preferably a pyrazole ring.

(D) $B^1$ and $B^2$ each are =$CR^1$— or —$CR^2$=, and $R^1$ and $R^2$ each are preferably a hydrogen atom, a halogen atom, a cyano group, a carbamoyl group, a carboxyl group, an alkyl group, a hydroxyl group, or an alkoxy group, more preferably a hydrogen atom, a cyano group, a carbamoyl group, or an alkoxy group.

Among preferable combinations of $R^5$, $R^6$, A, $B^1$, $B^2$ and G in the compound represented by Formula (M-I), compounds wherein at least one of $R^5$, $R^6$, A, $B^1$, $B^2$ and G is the preferable group described in (A) to (D) are preferable; compounds wherein two or more thereof are the preferable groups described in (A) to (D) are more preferable; and compounds wherein all groups are the preferable groups described in (A) to (D) are most preferable.

Preferable cyan dyes are phthalocyanine dyes represented by the following Formula (C-I):

Formula (C-I)

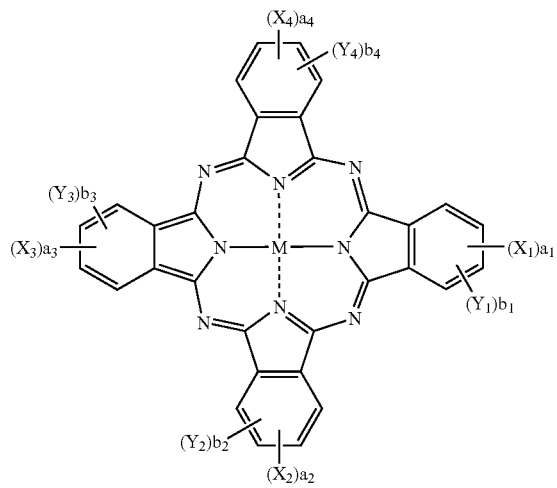

In the Formula (C-I) above, $X_1$, $X_2$, $X_3$ and $X_4$ each independently represents an electron-withdrawing group having a $\sigma_p$ of 0.40 or more. $Y_1$, $Y_2$, $Y_3$ and $Y_4$ each independently represent a monovalent substituent. M is a hydrogen atom, a metal element or an oxide, hydroxide or halide. $a_1$ to $a_4$ each represents the number of substituents connected respectively to $X_1$ to $X_4$, and are independently an integer of 0 to 4. $b_1$ to $b_4$ each represent the number of substituents connected respectively to $Y_1$ to $Y_4$, and are independently an integer of 0 to 4. However, the total of $a_1$ to $a_4$ is 2 or more and preferably 3 or more, and the case where $a_1=a_2=a_3=a_4=1$ is most preferable. If the dye is a water-soluble dye, the dye preferably has additionally an ionic hydrophilic group as the substituent at any position of $X_1$, $X_2$, $X_3$, $X_4$, $Y_1$, $Y_2$, $Y_3$, or $Y_4$. The ionic hydrophilic substituent groups include sulfo, carboxyl, phosphono, and quaternary ammonium groups, and the like.

Among the phthalocyanine dyes represented by Formula (C-I) above, phthalocyanine dyes represented by the following Formula (C-II) are more preferable. Hereinafter, the phthalocyanine dyes represented by Formula (C-II) will be described in detail.

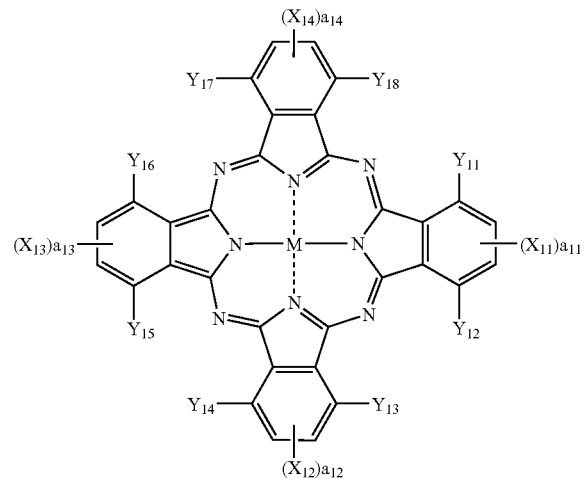

Formula (C-II)

In the Formula (C-II) above, $X_{11}$ to $X_{14}$ each independently represents —SO-Z, —SO$_2$-Z, —SO$_2$NR$^1$R$^2$, a sulfo group, —CONR$^1$R$^2$, or —CO$_2$R$^1$; and $Y_{11}$ to $Y_{18}$ each independently represents a monovalent substituent. M represents a hydrogen atom, a metal atom or the oxide thereof, hydroxide or halide. $a_{11}$ to $a_{14}$ each represent the number of substituents connected respectively $X_{11}$ to $X_{14}$ and are independently an integer of 1 or 2. Further, Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. R$^1$ and R$^2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group.

In the Formula (C-II) above, $a_{11}$ to $a_{14}$ preferably satisfy the condition of $4 \leq a_{11}+a_{12}+a_{13}+a_{14} \leq 6$, and in particular, the condition of $a_{11}=a_{12}=a_{13}=a_{14}=1$.

$X_{11}$, $X_{12}$, $X_{13}$ and $X_{14}$ each may have the same substituent; $X_{11}$, $X_{12}$, $X_{13}$ and $X_{14}$ each may be a similar but slightly different substituent from each other. For example, when they are all the groups represented by —SO$_2$-Z and each Z is different from each other; or $X_{11}$, $X_{12}$, $X_{13}$ and $X_{14}$ each may be different from each other, for example, when they are the groups substituted with different —SO$_2$-Z's and —SO$_2$NR$^1$R$^2$'s.

Among the phthalocyanine dyes represented by Formula (C-II) above, particularly preferable structures (substituents) are as follows:

Preferably, $X_{11}$ to $X_{14}$ each independently represent —SO-Z, —SO$_2$-Z, —SO$_2$NR$^1$R$^2$, or CONR$^1$R$^2$, more preferably —SO$_2$-Z or SO$_2$NR$^1$R$^2$, and still more preferably —SO$_2$-Z.

Preferably, Z's in these groups each independently represents a substituted or unsubstituted alkyl group, a substituted or unsubstituted aryl group, or a substituted or unsubstituted heterocyclic group, and more preferably a substituted alkyl or aryl group, or a substituted heterocyclic group. In particular for improving dye solubility and ink stability, it is preferable to use a substituent containing an asymmetric carbon (use as a racemic compound). It is also preferable to use a substituent having a hydroxyl, an ether, an ester, a cyano, an amido, or a suflonamido group therein from the viewpoints of improving the association of dyes and the fastness of images.

Preferably, R$^1$ and R$^2$ each independently represents a hydrogen atom, a substituted or unsubstituted alkyl group, a substituted or unsubstituted aryl group, a substituted or unsubstituted heterocyclic group, and among them, a hydrogen atom, a substituted alkyl or aryl group or a substituted heterocyclic group is more preferable. However, it is unfavorable that R$^1$ and R$^2$ are both hydrogen atoms at the same time. In particular, for improving dye solubility and ink stability, it is preferable to use a substituent containing an asymmetric carbon (used as a racemic mixture). It is also preferable to use a substituent having a hydroxyl group, an ether group, an ester group, a cyano group, an amido group, or a suflonamido group therein from the viewpoints of improving the association of dyes and the fastness of images.

Preferably, $Y_{11}$ to $Y_{18}$ each independently represents a hydrogen atom, a halogen atom, an alkyl group, ann aryl group, a cyano group, an alkoxy group, an amido group, an ureido group, a suflonamido group, a carbamoyl group, a sulfamoyl group, an alkoxycarbonyl group, a carboxyl group, or a sulfo group; more preferably a hydrogen atom, a halogen atom, a cyano group, a carboxyl group, or a sulfo group; and most preferably a hydrogen atom.

Preferably, each of $a_{11}$ to $a_{14}$ is independently 1 or 2, and most preferably, each of $a_{11}$ to $a_{14}$ is 1.

M is preferably a hydrogen atom, a metal element or an oxide, hydroxide, or halide thereof, more preferably, Cu, Ni, Zn, or Al, and most preferably Cu.

If the phthalocyanine dye represented by (C-I) or (C-II) as described above is soluble in water, the dye preferably has an ionic hydrophilic group. Examples of the ionic hydrophilic groups include sulfo, carboxyl, phosphono, and quaternary ammonium groups, and the like. Among these ionic hydrophilic groups, carboxyl, phosphono, and sulfo groups are preferable, and carboxyl and sulfo groups are particularly preferable. The carboxyl, phosphono, and sulfo groups may be in the form of salt, and examples of the counter ions forming the salts include ammonium ions, alkali metal ions (e.g., lithium ions, sodium ions, and potassium ions), organic cations (e.g., tetramethylammonium ions, tetramethylguanidium ions, and tetramethylphosphonium). Among these counter ions, alkali metal salts are preferable, and a lithium salt is particularly preferable, as it enhances both the solubility of dyes and ink stability.

The number of ionic hydrophilic groups in a molecule of phthalocyanine dye is preferably at least two or more, and it is particularly preferable to introduce at least two or more sulfo and/or carboxyl groups into the dye.

As for preferable combinations of substituents of phthalocyanine dyes represented by Formula (C-II), preferable is a structure wherein at least one of substituents is a preferable group described above; more preferable is a structure wherein more substituents are from among preferable groups described above; and most preferable is a structure wherein all substituents are from the preferable groups described above.

Preferable chemical structure of the phthalocyanine dyes mentnioned above is a structure wherein each of the four benzene rings of phthalocyanine respectively has at least one electron-withdrawing groups such as the sulfinyl, sulfonyl, and sulfamoyl groups, and wherein the total of $\sigma_p$ values of substituents introduced into the phthalocyanine skeleton is 1.6 or more.

It is normal for the phthalocyanine dye represented by Formula (C-I) above to be a mixture of analogues different in the site and the number of substituents Xn (n=1 to 4) and Ym (m=1 to 4) inevitably due to the production method, and the dye represented by the Formula is often a statistic average of the analogue mixture. In the invention, it was found that when these analogue mixtures are classified into the following three groups, a particular mixture is particularly preferable. In other word, the phthalocyanine dye analogue mixtures represented by Formulae (C-I) and (C-II) above are classified into the following three groups based on the point of substitution:

(1) Dyes substituted at β positions: phthalocyanine dyes having particular substituents at the 2 and/or 3, 6 and/or 7, 10 and/or 11, and 14 and/or 15 positions;
(2) Dyes substituted at α positions: phthalocyanine dyes having particular substituents at the 1 and/or 4, 5 and/or 8, 9 and/or 12, and 13 and/or 16 positions; and
(3) Dyes substituted at both α and β positions: phthalocyanine dyes having particular substituents randomly positions between 1 and 16.

When phthalocyanine dyes different in structure (especially, at the point of substitution) are described in the present specification, the dyes substituted at β positions, at α positions, and at both α and β positions are used.

The phthalocyanine dyes for use in the invention can be prepared alone by or in combination of the methods described or referred in "Phthalocyanine, -Chemistry and Function-" (ed., Shirai and Kobayashi, pp. 1 to 62, IPC), in "Phthalocyanines; Properties and Applications" [C. C. Leznoff and A. B. P. Lever, published by VCH (pp. 1 to 54)], and in other publications.

The phthalocyanine dyes represented by Formula (C-I) above can be prepared, for example, by sulfonylation, chlorosulfonylation or amidation of the unsubstituted phthalocyanine compounds, as described in publications such as WO Nos. 00/17275, 00/08103, 00/08101, and 98/41853, JP-A No. 10-36471, and others. In such cases, the sulfonation may occur at any rings of the phthalocyanine and it is difficult to control the number of suflonations. Accordingly, if sulfo groups are introduced in such a condition, the positions and numbers of sulfo groups introduced into the product cannot be specified, and a mixture of isomers varying in numbers and at the points of substitution of substituents is obtained. For this reason, when the compound according to the invention is prepared from the phthalocyanine above, the numbers and the substitution sites of the sulfamoyl groups connected to the heterocyclic ring cannot be regulated, and the phthalocyanine dye is obtained as a mixture of dyes which has been substituted both at α and β positions and which contains several compounds varying in both numbers and at points of substitution of substituents.

As described above, dyes which have many electron-withdrawing groups such as a sulfamoyl group and which are connected to the phthalocyanine nucleus are sperior in terms of oxidation potential and in ozone resistance. Inevitably, with the preparative methods described above it is not possible to prevent contamination of phthalocyanine dyes which are inferior in terms of numbers of the electron-withdrawing groups introduced, i.e., are inferior in terms of oxidation potential. Accordingly, it is preferable to use a preparative method that can suppress generation of the compounds having a smaller oxidation potential for improvement in ozone resistance.

On the other hand, the phthalocyanine dyes represented by Formula (C-II) can be obtained, for example, by reacting a phthalonitrile derivative (compound P) and/or a diiminoisoindolinone derivative (compound Q) represented by the following formulae, with a metal derivative represented by Formula (C-III). Alternatively, the phthalocyanine dyes can be prepared by modifying a tetrasulfophthalocyanine compounds prepared in the course of a reaction of a 4-sulfophthalic acid derivative represented by the following formula (compound R) and a metal derivative represented by Formula (C-III).

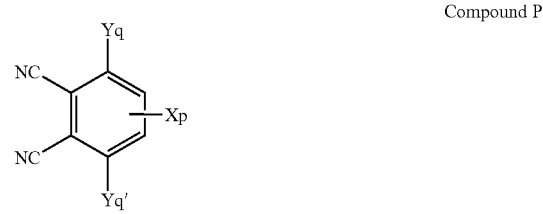

Compound P

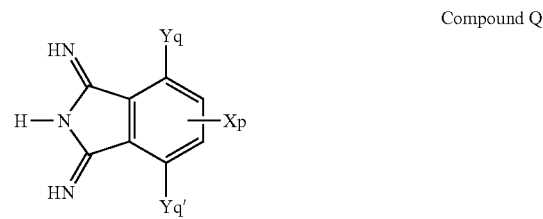

Compound Q

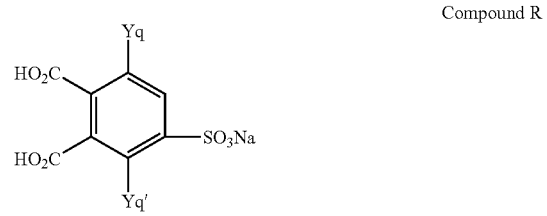

Compound R

In the respective formulae, Xp is the same group as that of $X_1$, $X_2$, $X_3$, or $X_4$ in the Formula (C-II), and each of Yq and Yq' is the same group as that of the $Y_{11}$, $Y_{12}$, $Y_{13}$, $Y_{14}$, $Y_{15}$, $Y_{16}$, $Y_{17}$, or $Y_{18}$ in the Formula (C-II).

$$M\text{-}(Y)_d \qquad \text{Formula (C-III)}$$

In the Formula (C-III) above, M is the same as M in the Formula (C-II) above; Y represents a monovalent or bivalent ligand such as a halogen atom, an acetic acid anion, acetylacetonate, oxygen, or the like; and d is an integer of 1 to 4.

In other words, it is possible to introduce a particular number of desired substituents according to the preparative method. The preparative method is far superior to the preparative method for the compounds represented by Formula (C-I), especially when the number of the electron-withdrawing groups introduced is increased to as many as possible for raising the oxidation potential as in the invention.

The phthalocyanine dyes represented by Formula (C-II) are commonly a mixture of the compounds represented by the following Formulae (a)-1 to (a)-4, isomers at points of substitution of Xp, i.e., dyes substituted at β positions.

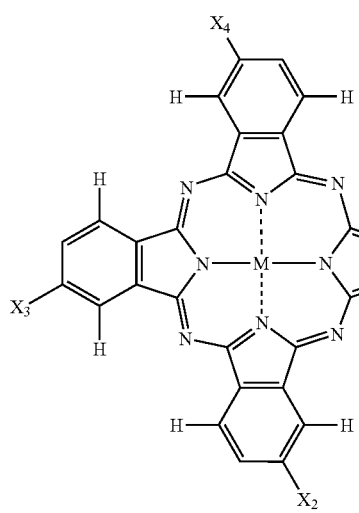

Formula (a)-1

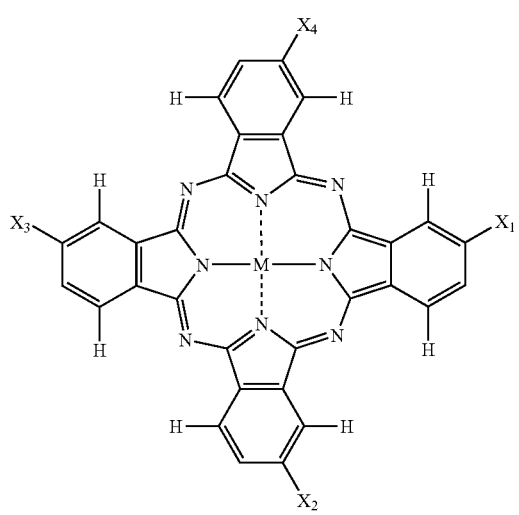

Formula (a)-2

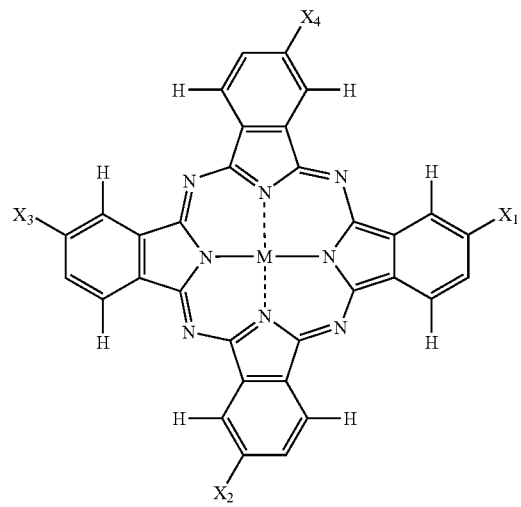

Formula (a)-3

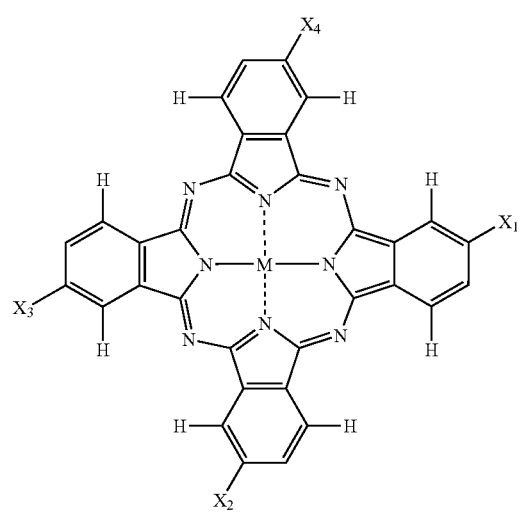

Formula (a)-4

By means of the preparative method described above, it is possible to obtain phthalocyanine dyes substituted at β positions by the same substituent as $X_{11}$, $X_{12}$, $X_{13}$ and $X_{14}$, when an identical group is used as Xps. On the other hand, if different groups are used as Xps, it is possible to obtain phthalocyanine dyes with similar but in parts slightly different substituents, or alternatively phthalocyanine dyes having mutually different substituents. Among dyes represented by Formula (C-II) above, dyes having mutually different electron-withdrawing substituents are preferable insofar that factors such as solubility, association, ink storability, and the like thereof can be easily controlled.

In any of the substituted dyes described above, an oxidation potential of higher than 0.8 V (vs. SCE) is extremely important in terms of enhancing fastness, and among such dyes, the dyes substituted at β positions are somewhat superior in hue, light fastness, ozone gas-resistance, and the like to the dyes substituted at α and β positions.

The phthalocyanine dyes represented by Formula (C-I) or (C-II) above can be prepared, for example, by the methods described in JP-A Nos. 2002-302623, 2002-294097, 2002-

249677, and 2003-012952. However, starting materials, dye intermediates, and preparative procedures are not particularly limited thereto.

The magenta and cyan dyes according to the invention have an oxidation potential of higher than 0.8 V (vs. SCE). The phthalocyanine dyes used as cyan dyes, which form an association complex, can compensate the fastness of images even if the oxidation potential is slightly reduced, while the magenta dyes, which do not form such a complex, preferably have a higher oxidation potential than the cyan dyes for improvement of the fastness.

Hereinafter, favorable dyes for use in the invention will be described. However, the invention is not particularly restricted to these examples. Values in parentheses are oxidation potentials.

Specific examples of yellow dyes are as follows (Y-1 to Y-35).

Y-1 (1.17)

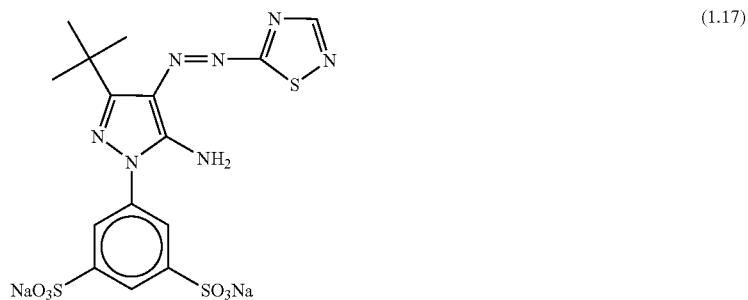

Y-2 (1.28)

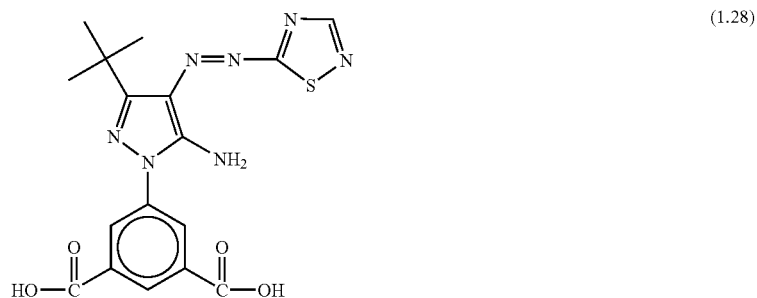

Y-3 (1.20)

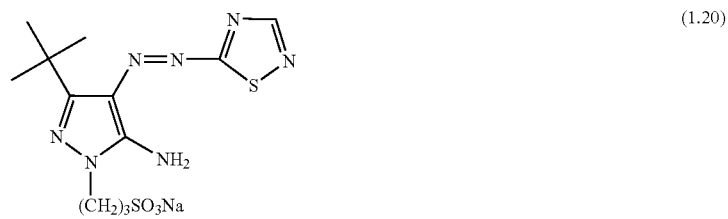

Y-4 (1.27)

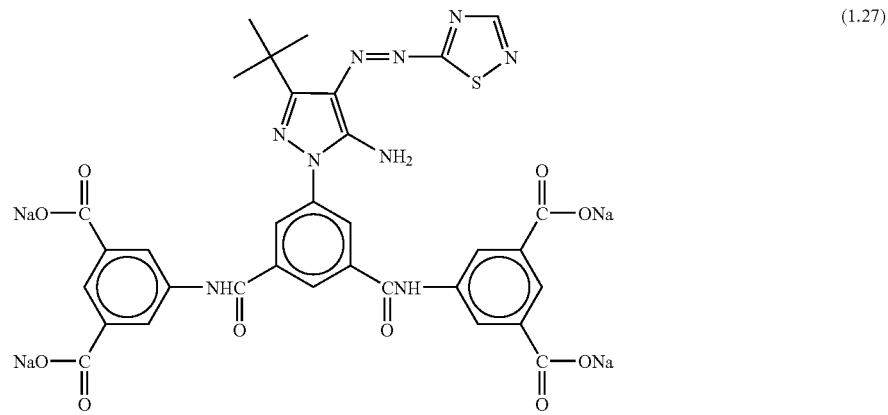

-continued
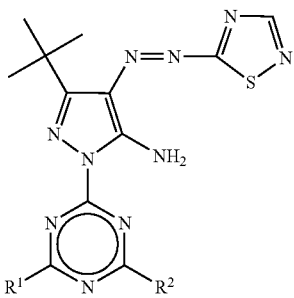
| Compound No. | R¹ | R² | Oxidation Potential (V) |
|---|---|---|---|
| Y-5 | 3,5-bis(COOK)phenyl-NH– | 3,5-bis(COOK)phenyl-NH– | 1.37 |
| Y-6 | —NH(CH$_2$)$_2$SO$_3$Li | —NH(CH$_2$)$_2$SO$_3$Li | 1.34 |
| Y-7 | 2-SO$_3$K,5-SO$_3$K-phenyl-NH– | 2-SO$_3$K,5-SO$_3$K-phenyl-NH– | 1.35 |
| Y-8 | 4-SO$_3$Na-phenyl-NH– | 3,5-bis(CONa)phenyl-NH– | 1.36 |
| Y-9 | —NH(CH$_2$)$_2$SO$_3$Li | 3,5-bis(COLi)phenyl-NH– | 1.35 |
| Y-10 | 3-tert-butyl-4-(1,3,4-thiadiazol-2-ylazo)-5-amino-1-methylpyrazole | 2-SO$_3$K,5-SO$_3$K-phenyl-NH– | 1.39 |

-continued

|  |  |  |
|---|---|---|
| Y-11 | R = —S(CH$_2$)$_2$SO$_3$Na | (1.20) |
| Y-12 | R = —Me | (1.19) |
| Y-13 | R = —H | (1.20) |
| Y-14 | R = —Ph | (1.18) |

| Y-15 | R = —Ph | (1.16) |
|---|---|---|
| Y-16 | R = —OC$_2$H$_5$ | (1.16) |

| Y-17 | Ar = [1,3,4-thiadiazol-2-yl, 5-CH$_3$] | (1.14) |
| Y-18 | Ar = [1,3,4-thiadiazol-2-yl, 5-H] | (1.20) |
| Y-19 | Ar = [thiazol-2-yl] | (1.05) |
| Y-20 | Ar = [isothiazol-5-yl, 3-CH$_3$] | (1.09) |

-continued
Y-21 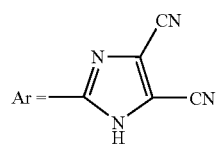 (1.00)
Y-22 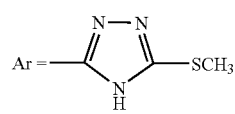 (1.14)
Y-23 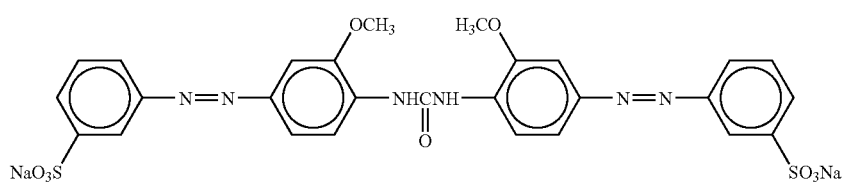 (1.16)
Y-24 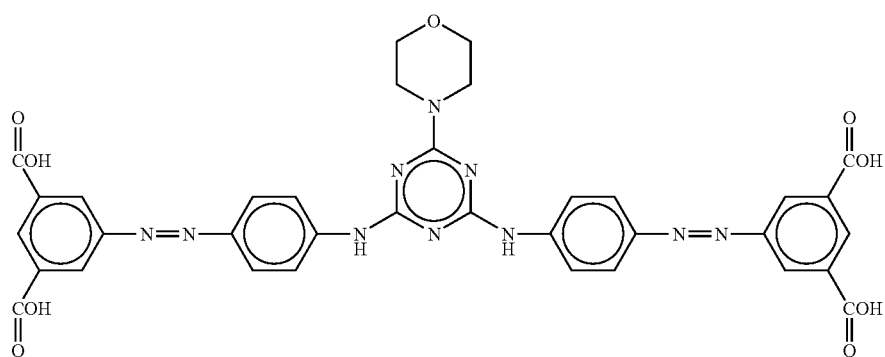 (1.28)
Y-25 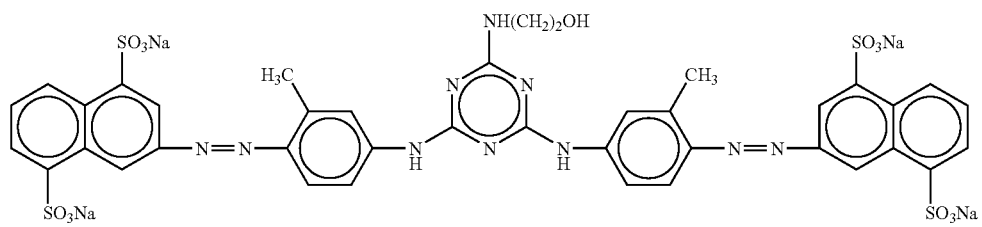 (1.00)
Y-26 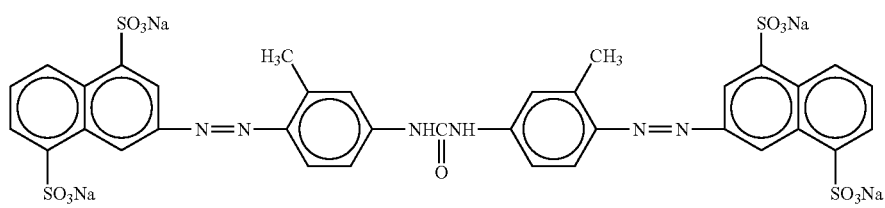 (1.10)

-continued
Y-27 (1.01)
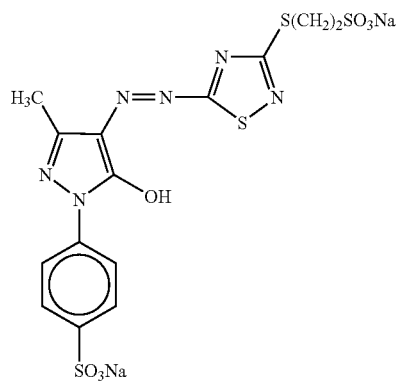
Y-28 (1.32)
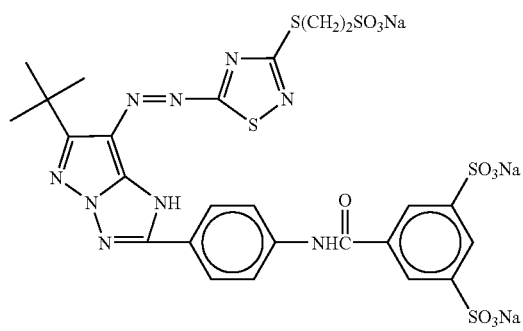
Y-29 (1.01)
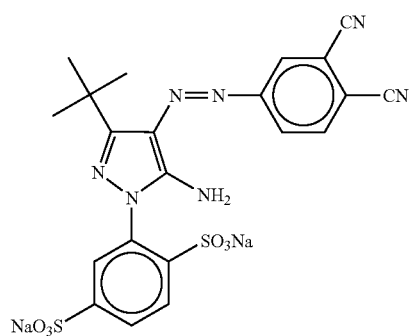
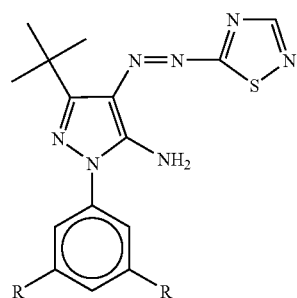
| | | |
|---|---|---|
| Y-30 | R = —CON(C₄H₉)₂ | (1.20) |
| Y-31 | R = —CO₂C₈H₁₇ | (1.21) |

-continued
Y-32 (1.21)
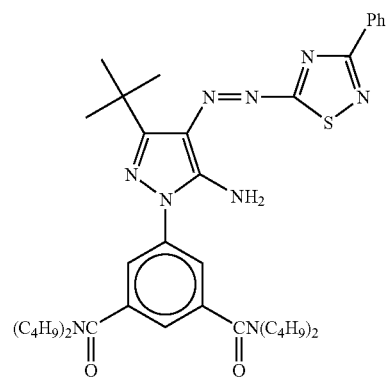
Y-33 (1.19)
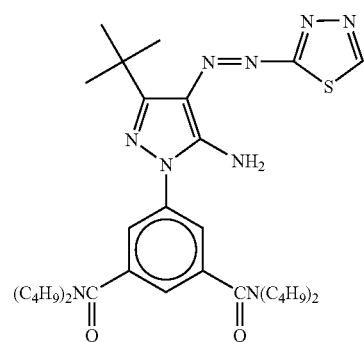
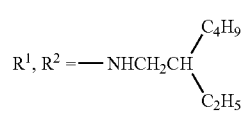
Y-34 (1.37)
$R^1, R^2 = $ —NHCH$_2$CH$\begin{smallmatrix}C_4H_9\\C_2H_5\end{smallmatrix}$
Y-35 (1.39)
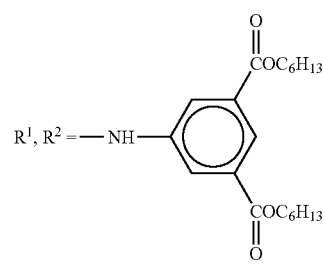

Next, specific examples of magenta dyes are listed below (M-1 to M-26).
M-1 (1.15)
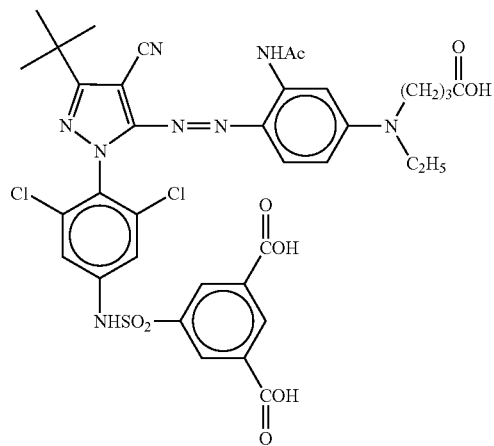
M-2 (1.15)
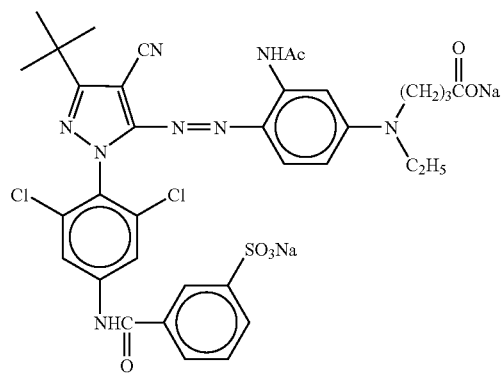
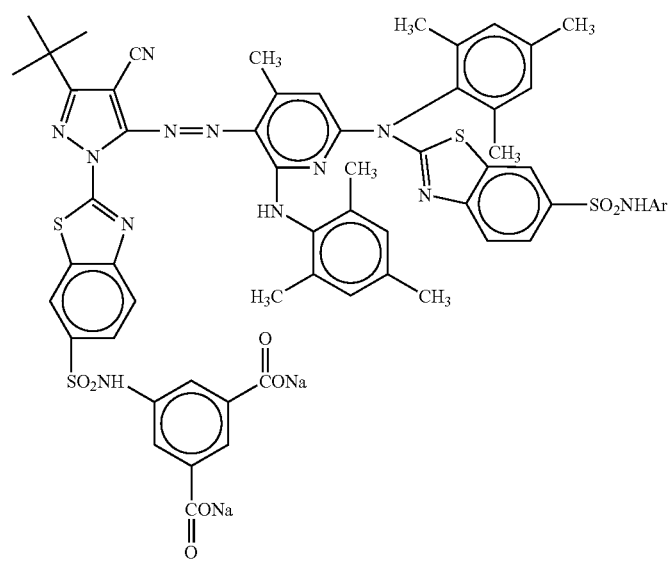

-continued
M-3 (1.36)
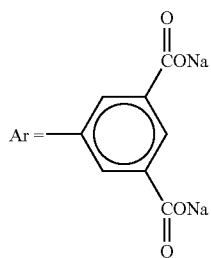
M-4 (1.37)
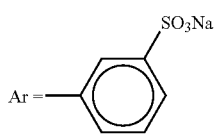
M-5 (1.35)
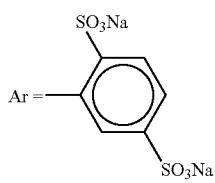
M-6 (1.37)
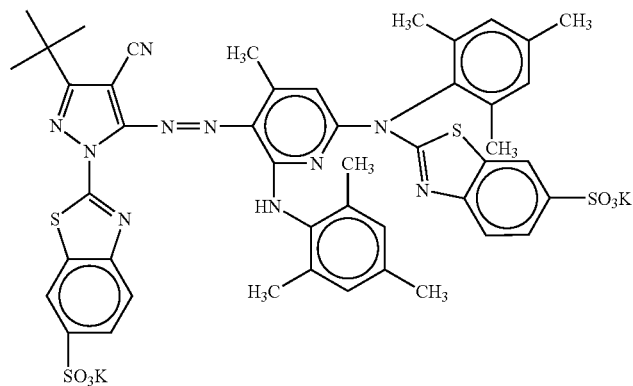
M-7 (1.32)
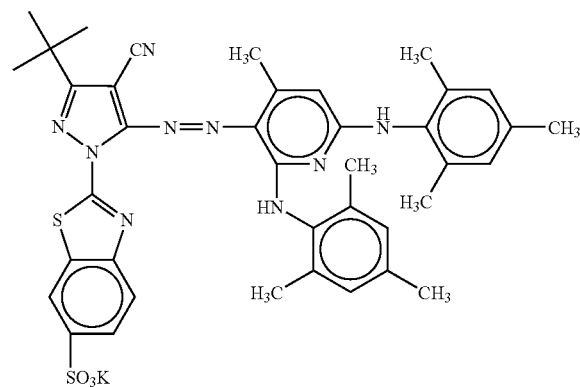

-continued
M-8 (1.27)
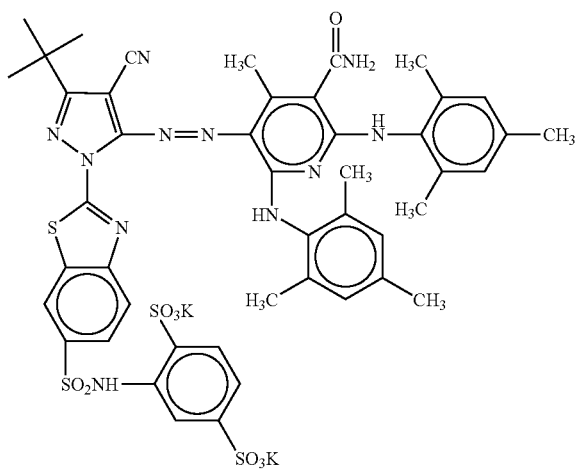
M-9 (1.38)
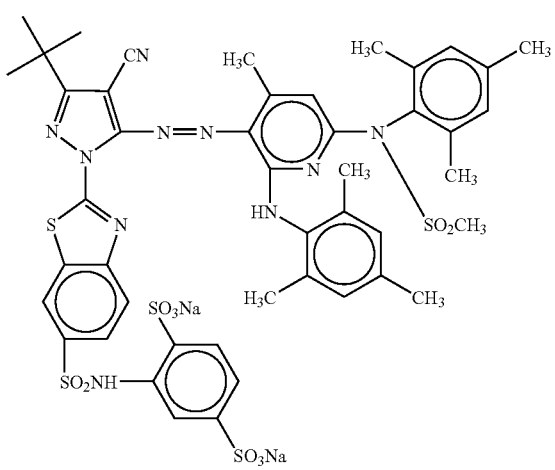
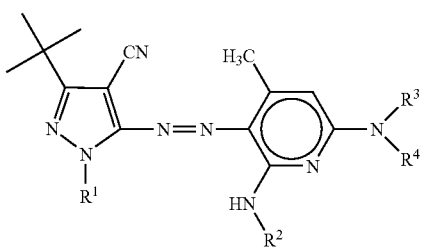
| Compound No. | R¹ | R² | R³ | R⁴ | Oxidation Potential (V) |
|---|---|---|---|---|---|
| M-10 | ![benzothiazole-SO3K] | ![trimethyl-SO3K phenyl] | ![benzothiazole-SO3K] | ![trimethyl-SO3K phenyl] | 1.38 |
| M-11 | ![benzothiazole-SO3Na] | ![dimethyl-SO3Na phenyl] | ![benzothiazole-SO3Na] | ![dimethyl-SO3Na phenyl] | 1.39 |

-continued

| Compound No. | R¹ | R² | R³ | R⁴ | Oxidation Potential (V) |
|---|---|---|---|---|---|
| M-12 | 2-methylbenzothiazole | 3,4,5-trimethylphenyl-SO₃K | 2-methylbenzothiazole | 3,4,5-trimethylphenyl-SO₃K | 1.40 |
| M-13 | 6-chloro-2-methylbenzothiazole | 2-methoxy-5-methylphenyl-SO₃K | 2-methyl-6-SO₃K-benzothiazole | 2-methoxy-5-methylphenyl-SO₃K | 1.39 |
| M-14 | 6-nitro-2-methylbenzothiazole | 3-methylphenyl-SO₃K | 2-methyl-6-SO₃K-benzothiazole | 2-methoxy-5-methylphenyl-SO₃K | 1.40 |
| M-15 | 2-methylbenzothiazole | 2,4,5-trimethyl-6-SO₃K-phenyl | 2-methylbenzothiazole | 2,4,5-trimethyl-6-SO₃K-phenyl | 1.37 |
| M-16 | 2-methylbenzothiazole | 2,4,5-trimethyl-6-SO₃Na-phenyl | 2-methyl-6-SO₃Na-benzothiazole | 2,4,5-trimethyl-6-SO₃Na-phenyl | 1.36 |
| M-17 | 2-methylbenzothiazole | 3-methyl-4-SO₃Li-phenyl | 2-methylbenzothiazole | 3-methyl-4-SO₃Li-phenyl | 1.38 |

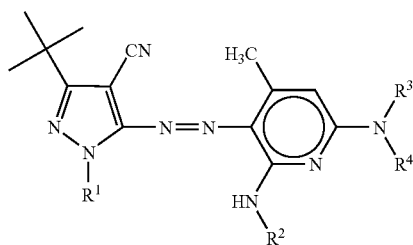

| Compound No. | R¹ | R² | R³ | R⁴ | |
|---|---|---|---|---|---|
| M-18 | 2-methylbenzoxazole | 2,4,5-trimethyl-6-SO₃Li-phenyl | 2-methylbenzoxazole | 2,4,5-trimethyl-6-SO₃Li-phenyl | 1.35 |

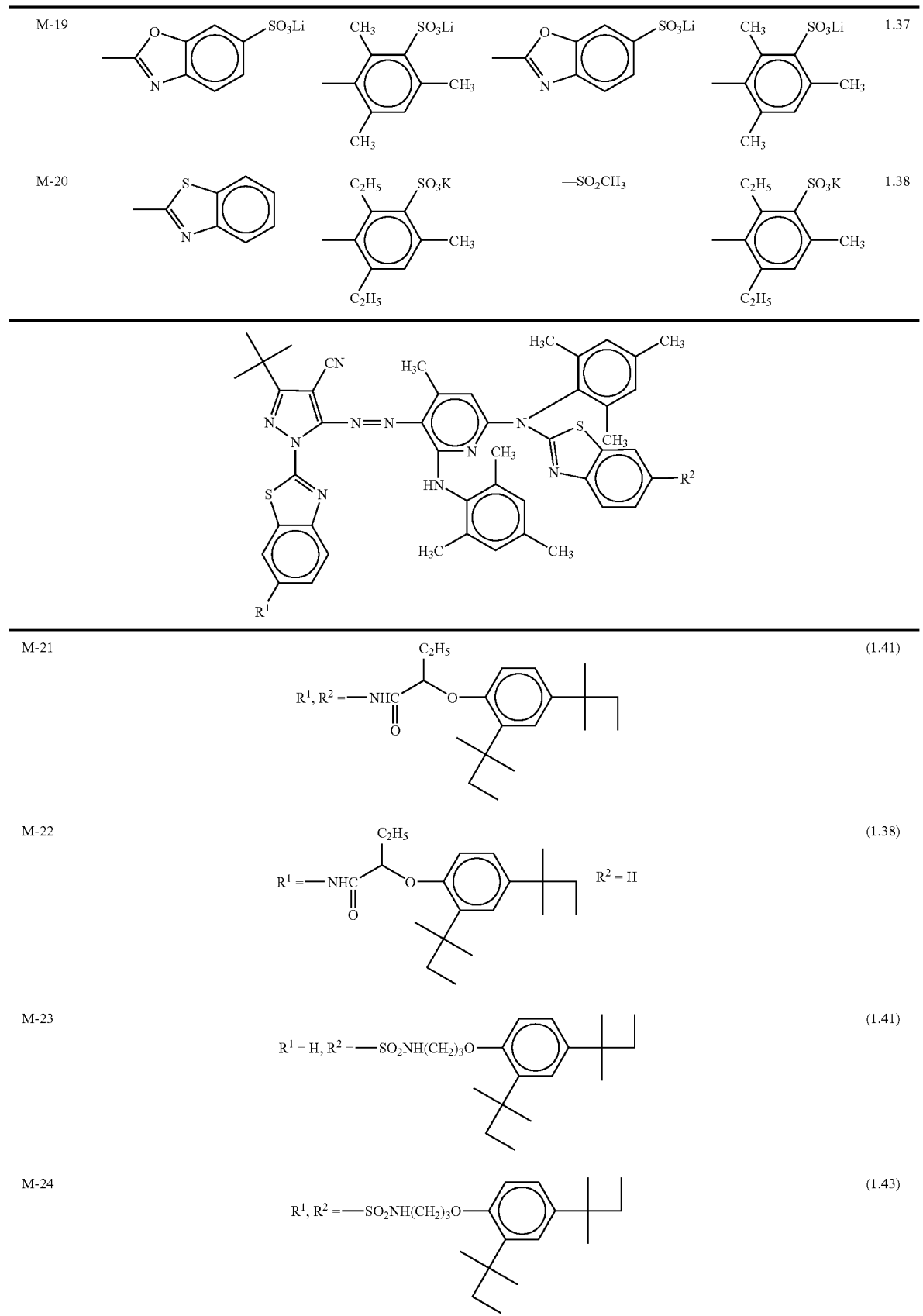

-continued
M-25 (1.35)
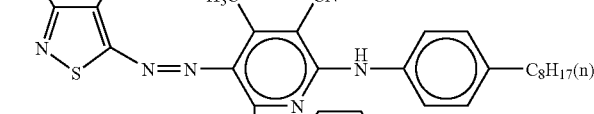
M-26 (1.39)
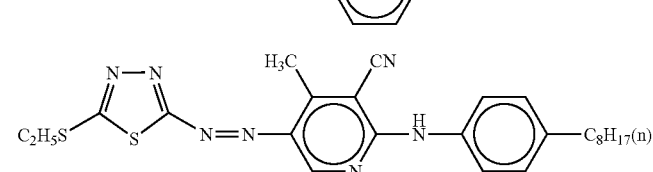
Next, specific examples of cyan dyes are listed below (C-1 to C-50).
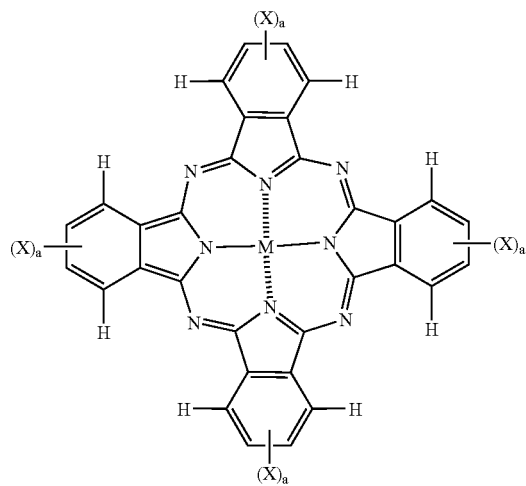
| Compound No. | M | X ($\sigma_p$) | a | Oxidation Potential (V) |
|---|---|---|---|---|
| C-1 | Cu | —SO$_2$NH—⟨phenyl-NHCO—⟨phenyl-SO$_3$Na⟩⟩ (0.65) | 1 | 1.24 |
| C-2 | Cu | —SO$_2$N(CH$_3$)—⟨phenyl-SO$_3$Na⟩ (0.65) | 1 | 1.19 |
| C-3 | Cu | —SO$_2$NH—CH$_2$CH$_2$—SO$_3$K (0.65) | 1 | 1.18 |

-continued

| | | | | |
|---|---|---|---|---|
| C-4 | Cu | —SO$_2$NH-propyl-N(CH$_2$CH$_2$OH)$_2$ · HCl (0.65) | 1 | 1.29 |
| C-5 | Cu | —SO$_2$NH-CH$_2$CH$_2$-OC$_2$H$_5$ (0.65) | 1 | 1.23 |
| C-6 | Cu | —SO$_2$NH-(3,5-bis(CO$_2$Na)phenyl) (0.65) | 1 | 1.21 |
| C-7 | Cu | —SO$_2$NH-CH$_2$CH$_2$-CO$_2$K (0.65) | 1 | 1.19 |
| C-8 | Cu | —SO$_2$(CH$_2$)$_3$SO$_2$NH-C$_6$H$_4$-SO$_3$K (0.77) | 1 | 1.35 |
| C-9 | Cu | —SO$_2$-(6-SO$_3$K-benzothiazol-2-yl) (—) | 1 | 1.36 |
| C-10 | Cu | —SO$_2$-(CH$_2$)$_3$-SO$_3$Na (0.77) | 2 | 1.39 |
| C-11 | Cu | —SO$_2$-(CH$_2$)$_3$-SO$_3$Li | 1 | 1.29 |
| C-12 | Cu | —SO$_2$-(CH$_2$)$_3$-SO$_3$K | 1 | 1.29 |
| C-13 | Cu | —SO$_2$-C$_6$H$_4$-O-(CH$_2$)$_4$-SO$_3$K (0.68) | 1 | 1.29 |
| C-14 | Cu | —SO$_2$-(2-CO$_2$Na-phenyl) (0.68) | 1 | 1.27 |

-continued
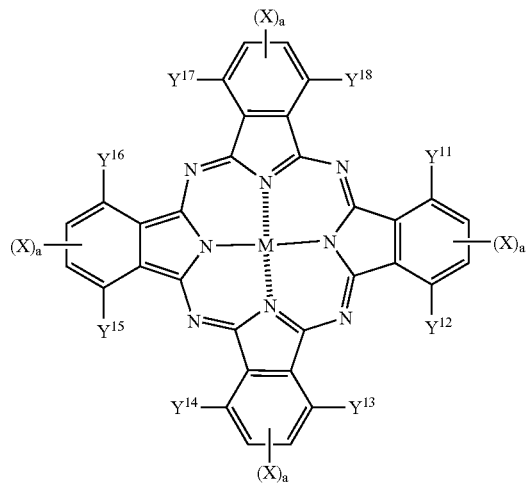
In the table, H and Cl are not in order in each combination of $(Y^{11}, Y^{12})$, $(Y^{13}, Y^{14})$, $(Y^{15}, Y^{16})$, and $(Y^{17}, Y^{18})$.
| Compound No. | M | X ($\sigma_p$) | $Y^{11}, Y^{12}$ | $Y^{13}, Y^{14}$ | $Y^{15}, Y^{16}$ | $Y^{17}, Y^{18}$ | a | Oxidation Potential (V) |
|---|---|---|---|---|---|---|---|---|
| C-15 | Cu | —SO₂NH—C₆H₄—NHSO₂—C₆H₄—SO₃K (0.65) | H, Cl | H, Cl | H, Cl | H, Cl | 1 | 1.24 |
| C-16 | Cu | —SO₂—(CH₂)₃—SO₃K (0.77) | H, Cl | H, Cl | H, Cl | H, Cl | 1 | 1.38 |
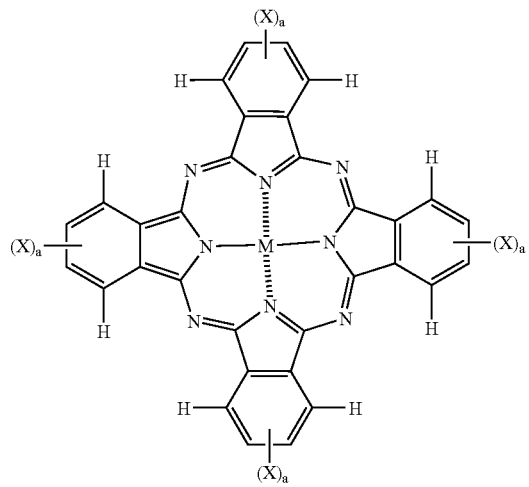
| Compound No. | M | X ($\sigma_p$) | a | Oxidation Potential (V) |
|---|---|---|---|---|
| C-17 | Cu | —SO₂NH—C₆H₄—C₈H₁₇-n (0.65) | 1 | 1.23 |

-continued

| Compound No. | | Substituent | | Oxidation Potential (V) |
|---|---|---|---|---|
| C-18 | Cu | —SO$_2$NH—⟨phenyl with CO$_2$C$_6$H$_{13}$-n (×2)⟩ (0.65) | 1 | 1.25 |
| C-19 | Cu | —SO$_2$NH—C(CH$_3$)$_2$—CH$_2$—C(CH$_3$)$_3$ (0.65) | 1 | 1.22 |
| C-20 | Cu | —SO$_2$N(C$_4$H$_9$-n)(phenyl) (0.65) | 1 | 1.21 |
| C-21 | Cu | —SO$_2$NH—⟨pyrazole with Br and t-C$_4$H$_9$⟩ (0.65) | 1 | 1.25 |
| C-22 | Cu | —SO$_2$(CH$_2$)$_3$SO$_2$NH(CH$_2$)$_3$OCH(CH$_3$)$_2$ | 1 | 1.27 |
| C-23 | Cu | —SO$_2$—⟨phenyl with OC$_4$H$_9$ and C$_8$H$_{17}$-t⟩ (0.68) | 1 | 1.28 |
| C-24 | Cu | —SO$_2$(CH$_2$)$_3$CO$_2$CH(CH$_3$)CH$_2$OCH$_3$ | 1 | 1.29 |
| C-25 | Cu | —SO$_2$—C$_{12}$H$_{25}$-n (0.77) | 1 | 1.28 |
| C-26 | Cu | —SO$_2$—(CH$_2$)NHCCH(C$_2$H$_5$)(C$_4$H$_9$) (0.77) | 1 | 1.28 |
| C-27 | Cu | —SO$_2$—(CH$_2$)$_2$CO$_2$C$_6$H$_{13}$-n | 1 | 1.31 |
| C-28 | Cu | —SO$_2$—C$_8$H$_{17}$-n | 2 | 1.36 |

Cu—Pc—(SO$_2$R$^1$)$_m$(SO$_2$R$^2$)$_n$

| Compound No. | R$^1$ ($\sigma_p$) | R$^2$ ($\sigma_p$) | m:n | Oxidation Potential (V) |
|---|---|---|---|---|
| C-29 | —C$_{12}$H$_{25}$(n) (0.77) | —C$_8$H$_{17}$(n) | 1:3 | 1.28 |
| C-30 | —C$_8$H$_{17}$(n) (0.77) | ⟨phenyl with OC$_4$H$_9$ and CH$_3$⟩ (0.68) | 2:2 | 1.29 |

-continued
| Compound No. | | | m:n | Oxidation Potential (V) |
|---|---|---|---|---|
| C-31 | —(CH$_2$)$_2$CO$_2$C$_6$H$_{13}$(n) (0.77) | 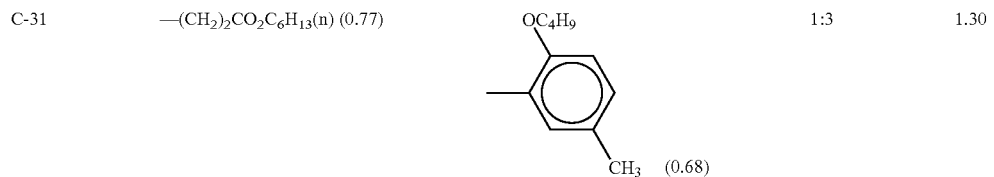 (0.68) | 1:3 | 1.30 |
| C-32 | 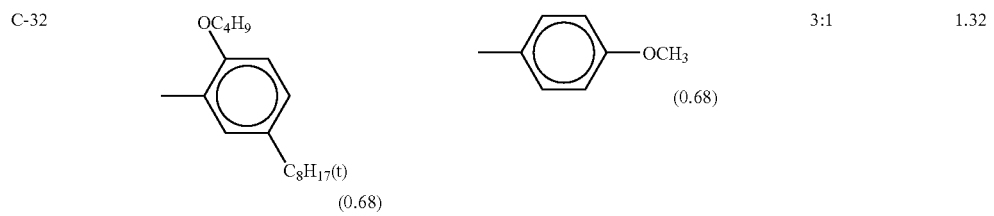 (0.68) | (0.68) | 3:1 | 1.32 |
| C-33 |  (0.68) | —C$_4$H$_9$(n) (0.77) | 2:2 | 1.30 |
| C-34 |  | —C$_4$H$_9$(n) | 1:3 | 1.30 |
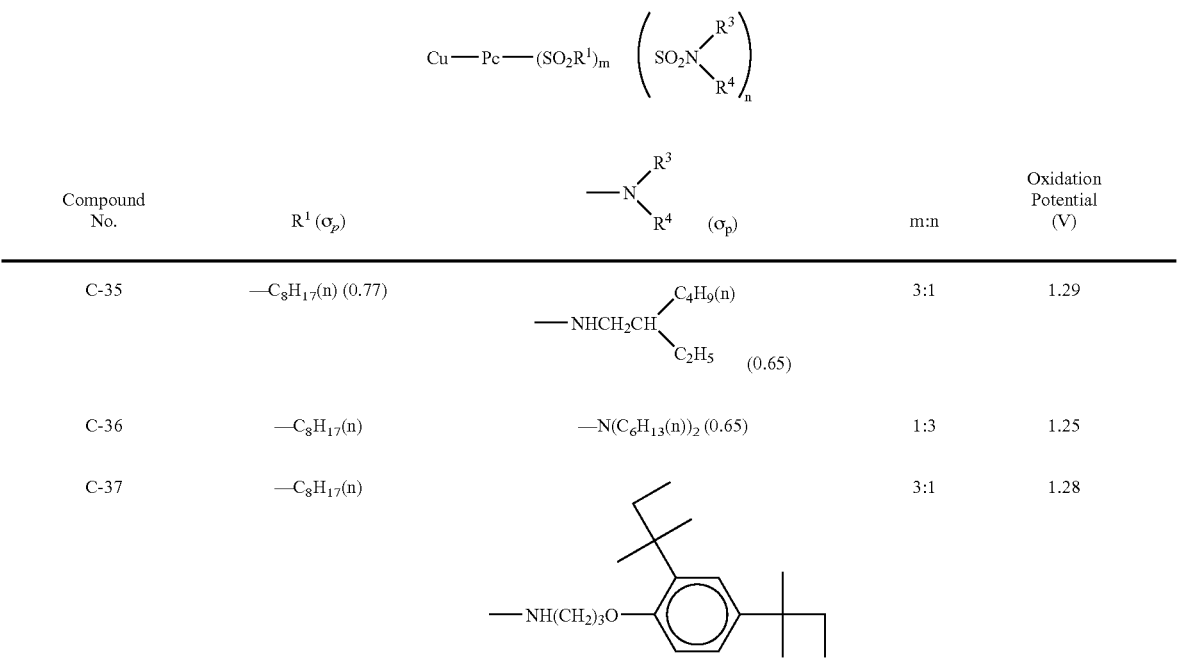
| Compound No. | R$^1$ ($\sigma_p$) | $-N\begin{smallmatrix}R^3\\R^4\end{smallmatrix}$ ($\sigma_p$) | m:n | Oxidation Potential (V) |
|---|---|---|---|---|
| C-35 | —C$_8$H$_{17}$(n) (0.77) | —NHCH$_2$CH(C$_4$H$_9$(n))(C$_2$H$_5$) (0.65) | 3:1 | 1.29 |
| C-36 | —C$_8$H$_{17}$(n) | —N(C$_6$H$_{13}$(n))$_2$ (0.65) | 1:3 | 1.25 |
| C-37 | —C$_8$H$_{17}$(n) | —NH(CH$_2$)$_3$O-[aryl] (0.65) | 3:1 | 1.28 |
| C-38 | 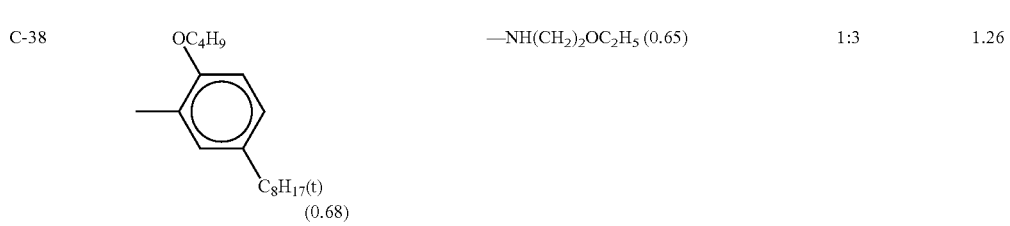 (0.68) | —NH(CH$_2$)$_2$OC$_2$H$_5$ (0.65) | 1:3 | 1.26 |

-continued

| C-39 | OC₄H₉ benzene ring with CH₃ and C₈H₁₇(t) substituents | —NHCH₂CO₂C₈H₁₇(n) (0.65) | 2:2 | 1.28 |

$$\text{Cu}\text{—}\text{Pc}\text{—}(SO_2R^1)_m(SO_2R^2)_n$$

| Compound No. | $R^1$ ($\sigma_p$) | $R^2$ ($\sigma_p$) | m:n | Oxidation Potential (V) |
|---|---|---|---|---|
| C-40 | —(CH₂)₃SO₃Li | —(CH₂)₃SO₂NHCH₂CH(OH)CH₃ | 3:1 | 1.31 |
| C-41 | —(CH₂)₃SO₃Li | —(CH₂)₃SO₂NHCH₂CH(OH)CH₃ | 2:2 | 1.31 |
| C-42 | —(CH₂)₃SO₃Li | —(CH₂)₃SO₂NH(CH₂)₂O(CH₂)₂OH | 2:2 | 1.30 |
| C-43 | —(CH₂)₃SO₃K | —C₆H₃(CH₃)(CO₂K)— | 1:3 | 1.32 |
| C-44 | —(CH₂)₃SO₃K | —C₆H₃(CH₃)(CO₂K)— | 3.5:0.5 | 1.30 |
| C-45 | —(CH₂)₂NHCO(CH₂)₂CO₂Na (0.77) | —(CH₂)₃SO₃Na (0.77) | 2:2 | 1.30 |
| C-46 | —(CH₂)₂NHCO(CH₂)₂CO₂Na | —(CH₂)₃SO₃Na | 1:3 | 1.30 |
| C-47 | —(CH₂)₂NHSO₂—C₆H₃(CO₂Na)— (0.77) | —(CH₂)₃SO₃Na | 1:3 | 1.31 |
| C-48 | —(CH₂)₂N(CH₂CO₂Na)₂ | —(CH₂)₃SO₃Na | 2:2 | 1.32 |

$$\text{Cu}\text{—}\text{Pc}\text{—}(SO_2R^1)_m\left(SO_2N\begin{smallmatrix}R^3\\R^4\end{smallmatrix}\right)_n$$

| Compound No. | $R^1$ | —N(R³)(R⁴) ($\sigma_p$) | m:n | Oxidation Potential (V) |
|---|---|---|---|---|
| C-49 | —(CH₂)₃SO₃K | —NH(CH₂)₂SO₃K (0.65) | 3:1 | 1.29 |
| C-50 | —(CH₂)₃SO₃K | —NH(CH₂)₂SO₃K | 2:2 | 1.28 |

In addition to the dyes described above, the compounds described in JP-A Nos. 2002-294097, 2002-249677, 2002-256167, 2002-275386, 2003-012952, 2001-279145, and 2002-309116 can also be specified, but the dyes are not limited thereto. Further, the compounds above can be prepared easily by the methods described above.

Each ink constituting an ink set can be normally prepared by dissolving and/or dispersing a dye in an oleophilic or aqueous medium. Aqueous inks using an aqueous medium are in general terms preferable, from the viewpoints of working environment and energy conservation.

In addition to the dyes described above, various other additives may be added to the ink as and when necessary, to a degree that does not impair the advantageous effects of the invention. Examples of additives include additives known in the art such as an anti-drying agent (wetting agent), an anti-fading agent, an emulsion stabilizer, a penetration-accelerating agent, an ultraviolet absorbent, an antiseptic, a fungicide, a pH adjusting agent, a surface tension adjuster, an antiform agent, a viscosity adjuster, a dispersant, a dispersion stabilizer, an antirust agent, an chelating agent, and the like. These various additives can be added directly to an ink if it is a water-soluble ink, and are commonly added to a dye dispersion soon after preparation if the dye dispersion is used as a dispersion of oil-soluble dyes, but the additive may also be added into the aqueous or oil phase during preparation thereof.

The anti-drying agent can be used to advantage for purposes of suppressing drying of the ink jet ink and thus preventing clogging at the ink-ejecting outlets of the nozzles used in accordance with the ink jet recording method.

The anti-drying agent is preferably a water-soluble organic solvent having a vapor pressure of lower than that of water. Specific examples thereof include polyvalent alcohols represented by ethylene glycol, propylene glycol, diethylene glycol, polyethyleneglycol, thiodiglycol, dithiodiglycol, 2-methyl-1,3-propanediol, 1,2,6-hexanetriol, acetylene glycol derivatives, glycerin, and trimethylol propane; polyvalent alcohol lower-alkylethers such as ethylene glycol monomethyl-(or ethyl-)ether, diethylene glycol monomethyl-(or ethyl-)ether, and triethylene glycol monoethyl-(or butyl-)ether; heterocyclic rings such as 2-pyrrolidone, N-methyl-2-pyrrolidone, 1,3-dimethyl-2-imidazolidinone, and N-ethyl-morpholine; sulfur-containing compounds such as sulfolane, dimethylsulfoxide, and 3-sulfolene; multifunctional compounds such as diacetonealcohol and diethanolamine; and urea derivatives.

Polyvalent alcohols such as glycerin and diethylene glycol are preferable among them. The anti-drying agents may be used alone or in combinations of two or more. These anti-drying agents are preferably contained in an amount of 10 to 50% by mass in the ink.

The penetration-accelerating agent is used favorable for accelerating penetration of the ink into paper. Examples of the penetration-accelerating agents include alcohols such as ethanol, isopropanol, butanol, di-(or tri-)ethylene glycol monobutylether, and 1,2-hexanediol; sodium laurylsulfate, sodium oleate, nonionic surfactants, and the like. These agents are usually sufficiently effective at a content of from 5 to 30% by mass in ink, and preferably used in an amount within the range that does not cause ink bleeding or print-through.

The ultraviolet absorbent is used for improving the fastness of images. Examples of ultraviolet absorbents include benzotriazole compounds described in JP-A Nos. 58-185677, 61-190537, 2-782, 5-197075, and 9-34057, and others; benzophenone compounds described in JP-A Nos. 46-2784 and 5-194483, U.S. Pat. No. 3,214,463, and others; cinnamic acid compounds described in JP-B Nos. 48-30492 and 56-21141, JP-A No. 10-88106, and others; triazine compounds described in JP-A Nos. 4-298503, 8-53427, 8-239368, 10-182621, and 8-501291, and others; compounds described in Research Disclosure No. 24239; and compounds that absorb light and emit fluorescence, so-called fluorescent whitening agents, represented by stilbene and benzoxazole compounds.

The anti-fading agent is used for improving the fastness of images. Various organic and metal complex-based anti-fading agents may be used as the anti-fading agent. Examples of the organic anti-fading agents include hydroquinones, alkoxyphenols, dialkoxyphenols, phenols, anilines, amines, indanes, chromanes, alkoxyanilines, thioethers, thioureas, heterocyclic rings (e.g., those described in JP-A Nos. 2002-36717 and 2002-86904), and the like, while examples of metal complexes include nickel complexes, zinc complexes, and the like. Specific examples thereof include compounds described in the patents referred to in sections I or J of chapter VII, Research Disclosure No. 17643, ibid., No. 15162, in the left-hand column of p. 650 of ibid., No. 18716, on p. 527 of ibid No. 36544, on p. 872 of ibid., No. 307105, and in ibid., No. 15162; and compounds included among the typical compounds represented by the Formula described in pp. 127 to 137 of JP-A No. 62-215272 and in the Examples of the compounds.

Examples of fungicides include sodium dehydroacetate, sodium benzoate, sodium pyridinethione-1-oxide, p-hydroxybenzoic acid ethyl ester, 1,2-benzisothazoline-3-one and the salts thereof, and the like. These fungicides are preferably used in an amount of from 0.02 to 1.00% by mass in the ink.

Neutralizing agents (organic bases and inorganic alkalis) may be used as the pH-adjusting agent. The pH-adjusting agent is added to make the ink at a pH of from 6 to 10, more preferably from 7 to 10, for improvement in ink storage stability.

Examples of the surface tension adjusters include nonionic, cationic and anionic surfactants. The surface tension of the ink according to the invention is preferably from 25 to 70 mPa·s and more preferably from 25 to 60 mN/m. In addition, the viscosity of the ink is preferably 30 mPa·s or less and more preferably 20 mPa·s or less.

Preferable examples of surfactants include anionic surfactants such as fatty acid salts, alkylsulfuric acid ester salts, alkylbenzenesulfonate salts, alkylnaphthalenesulfonate salts, dialkyl sulfosuccinate salts, alkylphosphoric acid ester salts, naphthalenesulfonic acid formaline condensates, and polyoxyethylene alkylsulfuric acid ester salts; nonionic surfactants such as polyoxyethylene alkylethers, polyoxyethylene alkylallylethers, polyoxyethylene fatty esters, sorbitan fatty esters, polyoxyethylene sorbitan fatty esters, polyoxyethylene alkylamines, glycerin fatty esters, and oxyethylene oxypropylene block co-polymers; and the like. In addition, SURFYNOLS (trade name, manufactured by Air Products & Chemicals), acetylene-based polyoxyethylene oxide surfactants, are also used to advantage. Further, amphoteric surfactants including amine oxide surfactants such as N,N-dimethyl-N-alkylamine oxide, quaternary ammonium salt-containing betaine surfactants such as N,N-dimethyl-N-lauryl-carbomethylammonium, and the like are also favorably. Further, the surfactants described on pp. 37 to 38 of JP-A No. 59-157636 and in Research Disclosure No. 308119 (1989) may also be used.

Fluorocarbons, silicone compounds, chelating agents represented by EDTA, and the like may also be used as the antifoam agent as and when necessary.

For dispersion of an oil-soluble dye according to the invention into an aqueous medium, it is preferable to disperse a colored fine particle containing the dye and an oil-soluble polymer into the aqueous medium as described in JP-A Nos. 11-286637, 2001-240763, 2001-262039, and 2001-247788, or to disperse the dye dissolved in a high-boiling organic solvent in the aqueous medium as described in JP-A Nos. 2001-262018, 2001-240763, 2001-335734, and 2002-080772. Typical methods of dispersing the dye in an aqueous medium, the oil-soluble polymer, high-boiling organic solvent, and additives to be used, and the amounts thereof used in the invention may be decided as appropriate with reference to the methods described in the patent applications listed above. Alternatively, the dye may be dispersed into fine particles while it is solid. A dispersant and a surfactant may be used additionally during the dispersion. Examples of the apparatuses for dispersion include simple stirrers, stirring impellers, in-line mixers, mills (e.g., colloid mills, ball mills, sand mills, attriters, roll mills, agitator mills, and the like), and ultrasonic mixers, high-pressure emulsification and dispersion apparatuses (high-pressure homogenizers; typical commercial apparatuses: Gaulin homogenizers, microfluidizers, DeBEE2000, etc.). In addition to the patent applications mentioned above, methods of preparing the ink jet recording ink are described in detail in JP-A Nos. 5-148436, 5-295312, 7-97541, 7-82515, 7-118584, 11-286637, and 2001-271003, which may be used as methods of preparing the ink jet recording ink according to the invention.

The aqueous medium mentioned above contains water as the primary component and additionally a water-miscible organic solvent if necessary. Examples of the water-miscible organic solvents include alcohols (e.g., methanol, ethanol, propanol, isopropanol, butanol, isobutanol, sec-butanol, t-butanol, pentanol, hexanol, cyclohexanol, benzyl alcohol), polyvalent alcohols (e.g., ethylene glycol, diethylene glycol, triethylene glycol, polyethyleneglycol, propylene glycol, dipropylene glycol, polypropylene glycol, butylene glycol, hexanediol, pentanediol, glycerin, hexanetriol, thiodiglycol), glycol derivatives (e.g., ethylene glycol monomethylether, ethylene glycol monoethylether, ethylene glycol monobutylether, diethylene glycol monomethylether, diethylene glycol monobutylether, propylene glycol monomethylether, propylene glycol monobutylether, dipropylene glycol monomethylether, triethylene glycol monomethylether, ethylene glycol diacetate, ethylene glycol monomethyester acetate, triethylene glycol monomethylether, triethylene glycol monomethylether, ethylene glycol monophenylether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine), and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). The water-miscible organic solvent may be used as a mixture of two or more solvents.

The ink which is a component of the ink set according to the invention, preferably contains a dye in an amount of 0.1 part by weight or more and 20 parts by mass or less with respect to 100 parts by mass of the ink. Each yellow ink or cyan ink may contains two or more dyes. The magenta ink may contain two or more dyes if they have an oxidation potential of higher than 0.8 V. If two or more dyes are used as aa combination, the total content of the dyes is preferably within the above range.

In recent years, each yellow, magenta, or cyan ink has frequently been constituted by two or more inks different in dye concentration in order to enhance image quality, and in such cases, both of the dyes used respectively in concentrated and dilute inks preferably have an oxidation potential of higher than 0.8 V in the invention.

If two or more different inks are used for the same color in the invention, the concentration of one ink is preferably from 0.05 to 0.5 times of the concentration of another ink.

The ink set according to the invention is used for full color image recording, but in addition a black ink may also be used for purposes of fine-tuning the color tone. Black colorants which can be used are, for example, disazo, trisazo, and tetrazo dyes, as well as dispersions of carbon black.

[Heat Pressing Treatment Related Matters]

In the ink jet recording method according to the invention, the ink jet recording medium is heated and pressed after image recording. The ink jet recording medium is preferably cooled and released after the heat-pressing treatment. The process may also include other treatments as well.

The heat-pressing treatment is not particularly limited, as long as the ink jet recording medium can be heated to a desired temperature [a temperature at which a layer, i.e., preferably an ink receiving layer and/or a non-recording layer (particularly preferably, the outermost layer most remote from the support) containing a thermoplastic resin become softened and deformed] and pressurized, and thus can be performed in an appropriate manner. For example, the treatment can be performed by using a fixing device used in known electrophotographic systems, hot plate, or the like. Specific examples thereof include the systems provided with members such as a pair of rollers for heating and pressing, or two hot plates positioned opposite each other for purpose of heating and pressing, and the like. The members such as the pair of rollers and the hot plates are not particularly limited; any members arbitrarily selected depending on the applications, for example, heating pair of rollerss in contact with each other used in known electrophotographic systems, commercially available plate heaters, and the like, may be used; and the members that enable adjustment of factors such as nip pressure, and heating temperature are preferable.

The heat-pressing treatment may be performed at a desired temperature decided according to the kind of ink jet recording medium used and is usually carried out approximately at from 50° C. to 120° C. In particular, if the medium contains a thermoplastic resin, it is preferably heat-pressed at a temperature of not less than the softening point of the thermoplastic resin, and specifically, the temperature may be selected suitably according to the kind of the thermoplastic resin used but is preferably from 80° C. to 110° C., and preferably from 95° C. to 105° C. when polyethylene is used as the thermoplastic resin.

In the heat-pressing treatment, the surface of the medium to be treated, i.e., the recording surface of the ink jet recording medium, is preferably brought into contact with the surface of the member whereon a fluorocarbon siloxane rubber-containing layer is formed or a second layer surface of the member whereon a laminate of a first silicone rubber-containing layer and a second fluorocarbon siloxane rubber-containing layer is formed. For example, the treatment is carried out by forming a fluorocarbon siloxane rubber-containing layer or a laminate described above on the heat-pressing face of the device used for the heat-pressing treatment (e.g. the pair of rollers) of the recording medium (e.g. on the surface of the roller in contact with the recording surface).

Hereinafter, a cooling releasing belt-type smoothing device will be described in detail as a preferable embodiment.

—Heat-Pressing Treatment by Means of a Cooling/Releasing Belt-Type Smoothing Device—

The heat-pressing treatment according to the invention can be performed favorably by using a cooling releasing belt-type smoothing device, which has a belt member and additionally, heat-pressing device for heating an pressurizing the ink jet recording medium, cooling device for cooling at least the pressurized face of ink jet recording medium which is pressurized by using the belt member (e.g. ink receiving layer), and cooling releasing device for releasing the ink jet recording medium from the belt member in cold state. In the device, the ink jet recording medium after image recording (in particular, the ink receiving layer) is heated to a desired temperature, in particular to a temperature of not less than the softening temperature of the thermoplastic resin if the medium contains a thermoplastic resin, by the heat-pressing device and pressed by the belt surface of the belt member at the same time; and then cooled until the pressed face of the medium (e.g. ink receiving layer) reaches a temperature of 80° C. or less by the cooling device; then, further cooling released by the cooling releasing device from the pressing face (i.e., belt face) of the heat-pressing device.

The heat-pressing device is not particularly limited, and is, for example, a combination of a pair of press rollers capable of heating and pressing (a pair of a heating roller and a press roller) and an endless belt member positioned so as to be able to rotate and convey the ink jet recording medium.

The method of pressing in the heat-pressing treatment is not particularly limited, but at least a nip pressure is preferably applied. The nip pressure is preferably from 1 to 100 kg/cm$^2$ and more preferably 5 to 30 kg/cm$^2$ from the viewpoints of smoothness and high glossiness. Heating in the heat-pressing treatment is effective in providing images superior in smoothness and high-glossiness, especially effective when the medium contains a thermoplastic resin; and the temperature is preferably not less than the softening temperature of the thermoplastic resin and usually from 80 to 200° C. although the temperature may vary according to the kind of the thermoplastic resin used.

In the heat-pressing treatment, the heating surface in contact with the ink jet recording medium (e.g., the surface of endless belt member in contact with the medium, in a system consisting of a pair of press rollers for heat pressing and an endless belt member traveling together with an ink jet recording medium in contact with the recording surface which is supported and rotated by one of the pair of press rollers and another roller) preferably has a layer of at least one resin selected from the groups consisting of a silicone rubber, fluorine rubber, silicone resin, and fluorine resin. Among them, a structure wherein a fluorocarbon siloxane rubber-containing layer having a uniform thickness is formed on the surface of the endless belt member, and a structure wherein a first silicone rubber-containing layer having a uniform thickness and additionally a seconds fluorocarbon siloxane rubber-containing layer on the surface of the first layer are laminated on the surface of the endless belt member are particularly preferable.

The fluorocarbon siloxane rubber is preferably a rubber containing perfluoroalkylether group and/or a perfluoroalkyl group in the main chain. Advantageous examples of the fluorocarbon siloxane rubbers include (A) fluorocarbon polymers having a fluorocarbon siloxane represented by the following Formula (1) as the primary component and additionally an aliphatic unsaturated group; (B) organopolysiloxanes and/or fluorocarbon siloxanes containing two or more =SiH groups in a molecule in an amount that the content of =SiH groups is 1 to 4 times higher in mole number than the total amount of aliphatic unsaturated groups in the entire fluorocarbon siloxane rubber composition; and hardened fluorocarbon siloxane rubber composition containing (C) a filler and (D) an effective amount of catalyst.

The fluorocarbon polymer (A) has a fluorocarbon siloxane having a recurring unit represented by the following Formula (1) as the primary component and additionally contains an aliphatic unsaturated group.

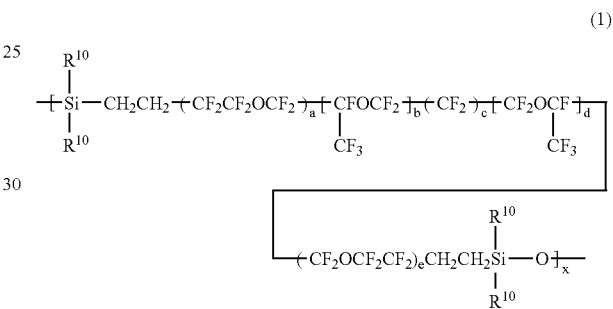

(1)

In the Formula (1), $R^{10}$ is an unsubstituted or substituted monovalent hydrocarbon group preferably having 1 to 8 carbons, preferably an alkyl groups having 1 to 8 carbons or an alkenyl group having 2 to 3 carbons, and particularly preferably a methyl group. a and e each independently are 0 or 1; and b and d each independently are an integer of 1 to 4; and c is an integer of 0 to 8. x is an integer of 1 or more and preferably 10 to 30.

Useful examples of the fluorocarbon polymers (A) include the compounds represented by the following Formula (2).

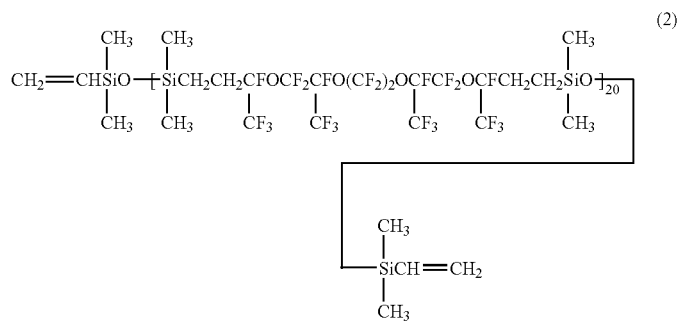

(2)

With regard to the organopolysiloxanes and/or fluorocarbon siloxanes (B), the organopolysiloxanes having ≡SiH groups include organohydrogen polysiloxanes having at least 2 hydrogen atoms connected to the silicon atoms in the molecules.

When the fluorocarbon polymer (A) contains an aliphatic unsaturated group in the fluorocarbon siloxane rubber composition, an organohydrogen polysiloxane may be used as a hardener in the fluorocarbon siloxane rubber composition. In such cases, a hardened product is formed by the addition reaction between the aliphatic unsaturated groups in fluorocarbon siloxane and the silicon atom-bound hydrogen atoms in organohydrogen polysiloxane.

Examples of organohydrogen polysiloxanes include various organohydrogen polysiloxanes commonly used for addition-hardening silicone rubber compositions.

The organohydrogen polysiloxane is favorably added in an amount that the number of the ≡SiH groups is generally at least 1, more preferably from 1 to 5, with respect to an aliphatic unsaturated hydrocarbon group in the fluorocarbon siloxane (A).

Also, the fluorocarbon having ≡SiH groups preferably is preferably a compound having a dialkyl hydrogen siloxy group and as $R^{10}$ and a SiH group such as a dialkyl hydrogen siloxy group or a silyl group at the terminal in the recurring unit represented by Formula (1), and useful examples thereof include those represented by the following Formula (3).

When the heat-pressing treatment is carried out with the endless belt member described above, the belt member can be prepared by coating the surface of a heat-resistant resin, or of the metal endless belt, or of a silicone rubber-coated surface of the belt with a fluorocarbon siloxane rubber composition, and then heating and curing the resultant belt. For example, the fluorocarbon siloxane rubber composition may be coated thereon by preparing a coating solution by adding a solvent such as m-xylene hexafluoride, benxotrifluoride (benzylidene trifluoride), or the like to the composition if necessary for dilution and applying the resulting solution by any one of the known coating methods such as spray coating, dip coating, knife coating, and the like. The temperature and the period of the heat curing may be decided arbitrarily, and selected usually according to the kind and the production method of the belt in the ranges of a temperature of from 100 to 500° C. and a period of from 5 seconds to 5 hours.

The thickness of the fluorocarbon siloxane rubber-containing layer when formed on the surface of the endless belt member is not particularly limited, but usually from 20 to 500 μm and more preferably from 40 to 200 μm.

The surface roughness (arithmetical mean roughness Ra) of the face of the endless belt member in contact with the ink jet recording medium is preferably 20 μm or less, more preferably 5 μm or less, and still more preferably 1 μm or less, particularly from the viewpoint of forming images superior in surface smoothness and glossiness. The arithmetical mean

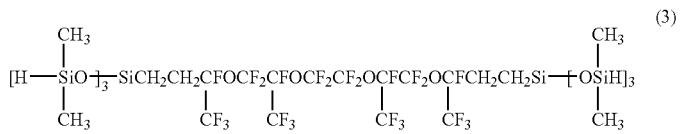

(3)

roughness Ra can be determined according to methods specified in JIS B0601, B0651, and B0652.

The shape of the belt member is not particularly limited, but the belt member is preferably an endless belt which can be used in the cooling releasing belt-type smoothing device. The cooling releasing belt-type smoothing device is not particularly limited and may be selected suitably depending on the applications, but is preferably a cooling releasing device shown in FIG. 1, equipped at least with an rotatable endless belt 2, heat-pressing device having a pair of press rollers for heating and pressing 9 that rotates together therewith, cooling unit 7 placed downstream in a belt-rotating direction of the pair of press rollers, and release roller (tension roller) 5 for cooling releasing the medium from the endless belt 2, which allows cooling of the medium when it is released from the endless belt after heating and pressurization. Especially if the medium contains a thermoplastic resin, the cooling temperature in this cooling unit is preferably in the range of temperature at which the thermoplastic resin can be solidified sufficiently, i.e., 80° C. or less, and more preferably from 20 to 80° C.

In particular, the device preferably has an endless belt, from the viewpoint of more efficient image recording, heat-pressing treatment, and cooling releasing while conveying the ink jet recording medium 10 continuously.

Various fillers commonly used for general silicone rubber compositions may be used as the filler (C). Examples thereof include fumed silica, precipitated silica, carbon powder, titanium dioxide, aluminum oxide, quartz powder, talc, reinforcing fillers such as sericite and bentonite, and fiber fillers such as asbestos, glass fiber, and organic fibers.

Examples of the catalysts (D) include catalysts for addition reactions known in the art such as chloroplatininic acid, alcohol-modified chloroplatininic acid, complexes of chloroplatininic acid with olefins, platinum black or palladium supported on a carrier such as alumina, silica or carbon, complexes of rhodium and olefins, and group VIII elements in the periodic table or the compounds thereof, elements such as chlorotris(triphenylphosphine)rhodium (Wilkinson's catalyst) and rhodium (III) acetylacetonate. These complexes are preferably used as dissolved in a solvent such as an alcohol, ether, hydrocarbon, or the like.

Various compounding agents may be added to the fluorocarbon siloxane rubber composition in an amount in the range that does not impair the advantageous effects of the invention. Examples thereof include diphenylsilanediol; low-molecular weight molecular terminal hydroxyl group-blocked dimethylpolysiloxane; dispersants such as hexamethyldisilazane; heat resistance-improving agents such as ferrous oxide, ferric oxide, cerium oxide, and iron octanoate; coloring agents such as pigments; and the like.

By means of the ink jet recording method according to the invention described above, it is possible to obtain ink jet images according to the invention recorded on an ink jet recording medium. The ink jet images are significantly superior in terms of light fastness and ozone resistance and have photographic glossiness with less visible roughness.

EXAMPLES

Hereinafter, the present invention will be described in detail with reference to Examples, but it should be understood that the invention is not particularly limited to these Examples. In addition, an ink jet recording sheet was prepared in the course of these Examples, as an example of the ink jet recording medium. In these Examples, "parts" and "%" represent "parts by mass" and "% by mass", unless described otherwise.

[Preparation of an Ink Set]

The components shown below were mixed in 1 L (liter, hereinafter expressed in the same manner) of water, and the mixture was stirred while heated to from 30 to 40° C. for 1 hour. Then, the mixture was adjusted with 10 mol/L KOH to pH 9, and filtered through a microfilter having an average opening of 0.25 μm under reduced pressure, thus producing a light magenta ink.

(Components)
  Magenta dye represented by the following formula (T-1) . . . 7.5 g/L
  Diethylene glycol . . . 50 g/L
  Urea . . . 10 g/L
  Glycerin . . . 200 g/L
  Triethylene glycol monobutylether . . . 120 g/L
  2-Pyrrolidone . . . 20 g/L
  Triethanolamine . . . 6.9 g/L
  Benzotriazole . . . 0.08 g/L
  Surfynol 465 . . . 10.5 g/L
(Surfactant, Manufactured by Air Products Japan)
  PROXEL "XL-2" . . . 3.5 g/L
(Bactericide, Manufactured by ICI Japan)

Subsequently, magenta ink, light cyan ink, cyan ink, yellow ink, and black ink having the compositions shown in Table 1 below were prepared in a similar manner to the preparation of the light magenta ink by changing the kinds of dyes and additives, thus producing an ink set (101).

TABLE 1

(Composition of ink set 101)

|  | Light magenta | Magenta | Light cyan | Cyan | Yellow | Black |
|---|---|---|---|---|---|---|
| Dye (g/L) | T-1(7.5) | T-1(30.0) | T-2(8.75) | T-2(35.0) | T-3(29.0) | T-4(20.0) |
|  |  |  |  |  |  | T-5(20.0) |
|  |  |  |  |  |  | T-6(20.0) |
|  |  |  |  |  |  | T-3(21.0) |
| Diethylene glycol (g/L) | 50 | 80 | 170 | 110 | 90 | 10 |
| Urea (g/L) | 10 | 70 | — | — | — | — |
| Glycerin (g/L) | 200 | 150 | 170 | 150 | 150 | 160 |
| Triethylene glycol monobutylether (g/L) | 120 | 120 | 130 | 130 | 130 | — |
| Diethylene glycol monobutylether (g/L) | — | — | — | — | — | 110 |
| 2-Pyrrolidone (g/L) | 20 | — | — | — | — | 50 |
| Surfynol 465 (g/L) | 10.5 | 10 | 9.8 | 10.5 | — | — |
| Surfynol STG (g/L) | — | — | — | — | 8.5 | 9.8 |
| Trimethanolamine (g/L) | 6.9 | 7 | 6 | 6 | 0.9 | 15 |
| Benzotriazole (g/L) | 0.08 | 0.07 | 0.08 | 0.08 | — | 0.06 |
| Proxel XL2 (g/L) | 3.5 | 1.5 | 1.1 | 1.2 | 1.5 | 1.1 |

(T-1)

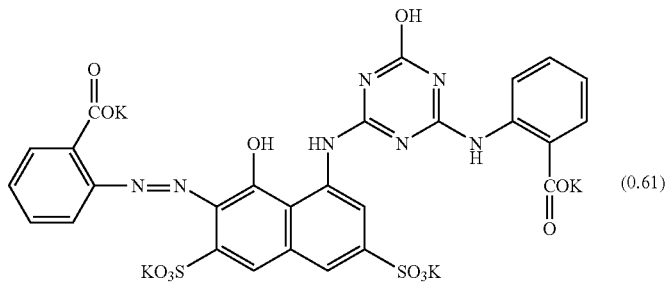

(0.61)

TABLE 1-continued
(Composition of ink set 101)
| Light magenta | Magenta | Light cyan | Cyan | Yellow | Black |
|---|---|---|---|---|---|
(T-2) 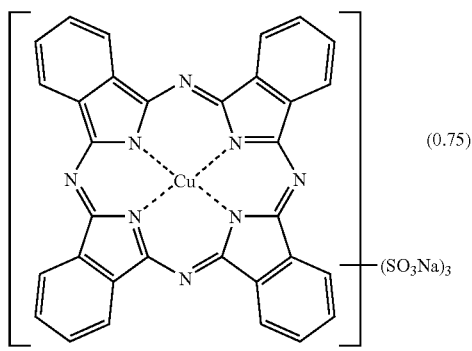 (0.75)
(T-3) 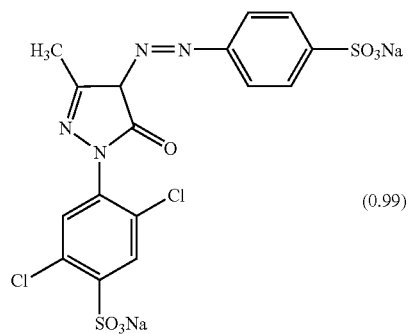 (0.99)
(T-4) 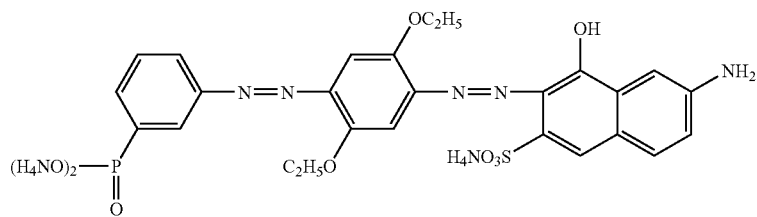
(T-5) 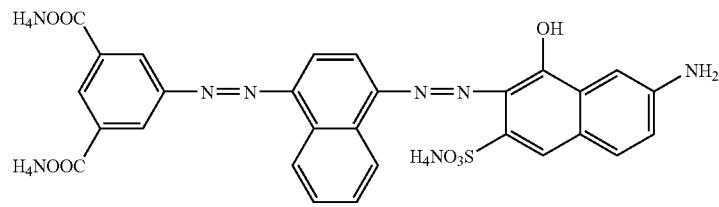
(T-6) 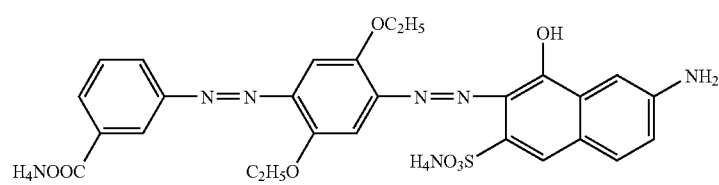

Then, ink sets (102) to (106) were prepared in a similar manner to the ink set (101), by changing the kinds of dyes used to light magenta, magenta, light cyan, cyan, and yellow inks according to the compositions shown Table 2 below. When a dye was changed, an equimolar amount of the dye was in principle used as a replacement, and the dye concentration was adjusted so that the transmissive density of each ink solution approximated that of ink set (101). When two dyes were used as a combination, an equimolar amount of each dye was used.

TABLE 2

| Ink set | Light magenta | Magenta | Light cyan | Cyan | Yellow |
|---|---|---|---|---|---|
| 101 | T-1 | T-1 | T-2 | T-2 | T-3 |
| 102 | T-1 | T-1 | C-10 | C-10 | T-3 |
| 103 | M-11 | M-11 | T-2 | T-2 | T-3 |
| 104 | M-11 | M-11 | C-10 | C-10 | T-3 |
| 105 | M-10 | M-10 | C-40 | C-40 | Y-4 |
| 106 | M-6 | M-3 | C-42 | C-40 | Y-24 Y-25 |

[Preparation of Support]

100 parts of wood pulp (LBKP) were beaten in a double-disc refiner until the Canadian freeness thereof became 300 ml, and 0.5 part of epoxidized behenic acid amide, 1.0 part of anionic polyacrylamide, 0.1 part of polyamide polyamine epichlorohydrin, and 0.5 part of cationic polyacrylamide were added thereto respectively as absolutely dry mass. The resultant mixture was sheeted in a Fourdrinier machine into a base paper having a basic weight of 170 g/m$^2$.

In order to adjust the surface size of the base paper obtained, the base paper was impregnated with a 4% aqueous polyvinyl alcohol solution containing a fluorescent whitening agent (trade name: "Whitex BB", manufactured by Sumitomo Chemical Co., Ltd.) at a concentration of 0.04% in an amount of 0.5 g/m$^2$ as absolute dry mass. The resulting base paper was dried and calendered, to give a base material having a density of 1.05 g/ml.

The wire face (rear face) of the base material thus obtained was subjected to a corona discharge treatment and then coated with high-density polyethylene by using a melt extruder to a thickness of 19 μm, forming a resin layer having a mat surface (hereinafter, the resin layer face will be referred to as "rear face"). The resin layer on the rear face was further subjected to a corona discharge treatment, and then coated with an aqueous dispersion containing aluminum oxide (trade name: "Alumina Sol 100", manufactured by Nissan Chemical Industries, Ltd., Ltd.) and silicon dioxide (trade name: "Snowtex O", manufactured by Nissan Chemical Industries, Ltd.) at a mass ratio of 1:2 as anti-static agents to an amount of 0.2 g/m$^2$ as dry mass.

Further, the felt face (front surface) on which no resin layer has been formed was subjected to a corona discharge treatment, and then coated with a low-density polyethylene having an MFR (melt flow rate) of 3.8 containing 10% anatase titanium dioxide, a trace amount of ultramarine, and 0.01% fluorescent whitening agent (with respect to polyethylene) by means of a melt extruder to a thickness of 29 μm, forming a high-gloss thermoplastic resin layer on the surface of the base material (hereinafter, the high-gloss face will be referred to as the "front face"), and desirable support was obtained.

Examples 1 to 2 and Comparative Examples 1 to 4

[Preparation of Ink Jet Recording Sheet (1)]

—Preparation of the Coating Solution for the Ink Receiving Layer (A-1)—

Among the components listed below, (1) gas-phase silica fine particles, (2) ion exchange water, and (3) "Sharoll DC902P (trade name)" were first mixed and dispersed with the use of a dispersing machine "KD-P (trade name)" manufactured by Shinmaru Enterprises Corp. After addition of (4) an aqueous polyaluminum chloride solution, the mixture was further dispersed in the dispersing machine "KD-P (trade name)". Next, a solution containing (5) polyvinyl alcohol, (6) boric acid, (7) polyoxyethylene laurylether, and (8) ion exchange water was added thereto, to produce a coating solution for the ink receiving layer (A-1). The mass ratio of silica fine particles to water-soluble resin [PB ratio, (1)/(5)] was 4.5/1, and the pH of the mixture was 3.5 (acidic).

[Composition of the Coating Solution for the Ink Receiving Layer (A-1)]
(1) Vapor-phase-process silica fine particles (inorganic fine particles) . . . 10.0 parts
[Rheoloseal QS-30 (average primary particle diameter: 7 nm); manufactured by Tokuyama Corp.]
(2) Ion exchange water . . . 51.6 parts
(3) Sharoll DC902P (51% aqueous solution) . . . 1.0 part (dispersant; manufactured by Dai-Ichi Kogyo Seiyaku)
(4) Polyaluminum chloride (base value: 83%) 40% aqueous solution . . . 1.0 part
(5) 8% Aqueous polyvinyl alcohol (water-soluble resin) solution . . . 27.8 parts
[PVA-224 (saponification value: 88%, polymerization degree: 2400); manufactured by Kuraray Co., Ltd.]
(6) Boric acid (cross-linking agent) . . . 0.4 part
(7) Polyoxyethylene laurylether (surfactant) . . . 1.2 parts
[Emulgen 109P (10% aqueous solution), HLB value: 13.6; manufacture by Kao Corporation]
(8) Ion exchange water . . . 32.0 parts The front face of the support obtained as described above was subjected to a corona discharge treatment, and coated with the coating solution for ink receiving layer (A-1) in a coating amount of 200 ml/m$^2$ on the front face of the support by using an extrusion die coater. The support was dried in a heated air dryer at 80° C. (flow rate: 3 to 8 m/sec) until the solid matter concentration in the coated layer reaches 20%. The coated layer was dried at a constant rate during the period. Immediately after drying, the support was immersed in a mordant coating solution (B) having the following composition for 30 seconds, enabling the solution to be attached on the coated layer in an amount of 20 g/m$^2$, and then dried at 80° C. for 10 minutes. In this manner, an ink jet recording sheet (1) according to the invention having an ink receiving layer of 32 μm in thickness was obtained.

[Composition of Mordant Coating Solution (B)]
(1) Boric acid (cross-linking agent) . . . 0.65 part
(2) 20% Aqueous solution of PAA-03 (polyallylamine) . . . 15 parts (mordant; manufactured by Nittobo Co.)
(3) Ion exchange water . . . 75 parts
(4) Megaface F1405 (10% aqueous solution) . . . 3 parts (fluorochemical surfactant; manufactured by Dainippon Ink and Chemicals, Inc.)

[Ink Jet Recording]

By using an ink jet printer PM900C (trade name, manufactured by Seiko Epson Corporation) as the ink jet recording device, gray images were printed on the ink jet recording sheet (1), by placing the ink sets (101) to (106) obtained as above into the cartridge and feeding the ink jet recording sheet (1) therein. The ink set used in each of the Examples and Comparative Examples is shown in Table 4 below.

Then, the ink jet recording sheet (1) on which gray images were recorded was further heat-pressed in a cooling releasing belt-type smoothing device (endless press) shown in FIG. 1 within 1 minute after image recording and then cooled and released. The processing conditions in respective Examples and Comparative Examples are summarized in Table 3 below, and the temperature of release was 80° C. or less in every case. Subsequently, the ink jet recording sheets obtained were evaluated as described below. The evaluation results are summarized in Table 4 below.

TABLE 3

<Processing conditions>

|  | Condition 1 | Condition 2 |
|---|---|---|
| Traveling speed [mm/sec] | 15 | 10 |
| Roller temperature [° C.] | 120 | 120 |
| Nip pressure [kgf/cm$^2$] | 5 | 5 |

Hereinafter, the cooling releasing belt-type smoothing device will be described more specifically.

The ink jet recording sheets were heat-pressed, cooled and released in the processing unit 1 shown in FIG. 1. The processing unit 1 has a pair of heating rollers 3 for heat-pressing and a press roller 4 that are in contact with each other, a rotatable endless belt 2, tension rollers (release rollers) 5, a cleaning roller 6, a cooling unit 7, and conveying rollers 8.

The belt 2 is an endless belt, and a heating roller 3 and two tension rollers 5 are placed on the inside of the ring-shaped belt 2. The belt 2 is pulled and held by the heating roller 3 and the two tension rollers 5 placed at positions separated from the heating roller 3, and travels circularly by the driving force of the heating roller 3. The press roller 4 is in contact with the belt 2 and forms a pair with heating roller 3 via the belt 2, and the press roller 4 and the heating roller 3 together form a nip portion between the press roller 4 and the belt 2 by pressing each other. The cooling unit 7 is located within the belt 2 and between the heating roller 3 and the tension roller 5 which is positioned downstream of the heating roller 3 on the belt-traveling path. Two conveying rollers 8 are positioned on the other side of the cooling unit 7 via the belt 2, and the distances between the upstream roller of the two conveying rollers 8 in the belt-rotating direction and the nip portion, and between the other conveying roller and the upstream tension roller 5 are practically the same. The cleaning roller 6 is placed on the other side of the heating roller 3 from the press roller 4 via the belt 2, and the portion between the cleaning roller 6 and the belt 2 is pressed by the cleaning roller 6 and the heating roller 3. The press roller 4, cleaning roller 6, and conveying roller 8 rotate along with rotate belt 2 which is driven by the heating roller 3.

The surface roughness (arithmetical mean roughness Ra) of the belt 2 on the face in contact with the ink jet recording medium 10 is 0.8 μm, and the pressure between the heating roller 3 and the press roller 4 (nip pressure) was 5 kgf/cm$^2$.

The belt 2 is a belt prepared by applying a silicone rubber primer (trade name: DY39-115, manufactured by Toray Dow Corning Silicone Co., Ltd.) onto a polyimide base, immersing it after air drying for 30 minutes into a mixed solution of 100 parts by mass of a silicone rubber precursor (trade name: DY35-796AB, manufactured by Toray Dow Corning Silicone Co., Ltd.) and 30 parts by mass of n-hexane to form a film thereon, vulcanizing the resulting belt at 120° C. for 10 minutes, and thus forming a silicone rubber layer (first layer) having a thickness of 40 μm; and immersing the polyimide base on which the silicone rubber layer is formed into a mixed solution of 100 parts by mass of a fluorocarbon siloxane rubber precursor (trade name: SIFEL610, manufactured by Shin-Etsu Chemical) and 20 parts by mass of a fluorochemical solvent (mixed solvent of m-xylene hexafluoride, perfluoroalkane, and perfluoro(2-butyltetrahydrofuran)) to form a film, vulcanizing first at 120° C. for 10 minutes and secondly at 180° C. for 4 hours, and thus forming a fluorocarbon siloxane rubber layer (second layer) having a thickness of 20 μm.

[Evaluation]

In Examples 1 to 2 and Comparative Examples 1 to 4, gray images (hereinafter, referred to as samples) formed by ink jet recording were evaluated as follows:

<Image Fastness>

1. Light Fastness

The chromaticity (a*1, b*1) and the brightness (L1) of each sample were determined immediately after recording by using s SPM100-II (manufactured by Gretag), and after each sample was irradiated with a xenon light (85,000 lux) by means of a weather meter (manufactured by Atlas) for 7 days, chromaticity [a*2, b*2] and brightness (L2) were determined once again, and the difference in color (ΔE) before and after photoirradiation was calculated according to the equation below and used as an indicator of this evaluation.

$$\Delta E = \{(a*1-a*2)^2 + (b*1-b*2)^2 + (L1-L2)^2\}^{1/2} \qquad \text{Equation (I)}$$

The color difference measurements were made at three reflection densities of 1.0, 1.3, and 1.6, and the results were rated A when the color differences were less than 5 at all densities, B when some of the differences were less than 5 and others were 5 or more, and C when color differences were 5 or more at all densities.

2. Ozone Resistance

The difference in color before and after a sample was kept in a box containing ozone gas at a concentration of 0.5 ppm for 7 days was evaluated in a similar manner to that of the light fastness. Residual dye rates were evaluated at three reflection densities of 1.0, 1.3, and 1.6, and the results were rated AA when color differences were less than 5 at all densities. A when color differences were less than 10 at all densities, B when color differences varied from less than 10 to 10 or more depending on the density, and C when color differences were 10 or more at all densities. The ozone gas concentration in the box was adjusted by using an ozone gas monitor (OZG-EM-01, manufactured by APPLICS).

3. Image Roughness

A region of a sample of 30 mm×50 mm in size was analyzed by using a three-dimensional roughness meter (trade name: Nanomet 0110F, manufactured by KURODA PRECISION INDUSTRIES. LTD.) under conditions of a measuring speed of 30 mm/sec, cutoff values of 1 mm or more and 2 mm or less, and a measuring pitch of 0.1 mm. A smaller value indicates that the image is smoother and that there is less roughness.

TABLE 4

| | Ink set | Sheet | Heat-press/cooling release (Note) | Light fastness | Ozone resistance | Image roughening |
|---|---|---|---|---|---|---|
| Example 1 | 105 | (1) | Yes (condition 1) | A | A | 0.18 |
| Example 2 | 106 | (1) | Yes (condition 2) | A | A | 0.18 |
| Comparative Example 1 | 101 | (1) | No | C | C | 0.22 |
| Comparative Example 2 | 102 | (1) | No | C | C | 0.22 |
| Comparative Example 3 | 103 | (1) | Yes (condition 1) | B | B | 0.18 |
| Comparative Example 4 | 104 | (1) | No | A | A | 0.22 |

Note:
The processing conditions are shown in Table 3 above.

As shown in Table 4 above, in examples in which an ink set containing magenta and cyan dyes having an oxidation potential of higher than 0.8 V were used, and the images subjected to the heat-pressing treatment, it was possible to obtain smoother-surface images which were superior in terms of light fastness and ozone resistance (image fastness) and which also reduced the level of image roughness. On the other hand, in the Comparative Example in which an ink set containing magenta and cyan dyes having an oxidation potential of lower than 0.8 V was used, and the heat-pressing treatment was not conducted, it was not possible to obtain images superior in fastness (light fastness or ozone resistance), nor at the same time was it possible minimize image roughness.

Examples 3 to 5 and Comparative Examples 5 to 13

Each sample obtained was evaluated in a similar manner to Example 1, except insofar that the ink jet recording sheet (1) and the processing condition of the belt-type smoothing device used in Example 1 were changed to those shown in Table 5 below. The ink jet recording sheets (2) to (4) were prepared as described below. Evaluation results are summarized in Table 5 below.

[Preparation of Ink Jet Recording Sheet (2)]

An ink jet recording sheet (2) was prepared in a similar manner to the ink jet recording sheet (1) of Example 1, except insofar that (1) 10.0 parts of gas-phase silica fine particles used in the "preparation of coating solution for ink receiving layer (A-1)" of Example 1 was changed to 5.0 parts and (2) 51.6 parts of ion exchange water was changed to 41.6 parts. Further, 15 parts of a thermoplastic resin latex [Aquabrit 4635 (acrylic resin), soap-free, solid matter: 35%, glass transition temperature Tg: 60° C., minimum filming temperature (MFT): 30° C.] were added; and drying after application (at 80° C.) was carried out at 50° C.

[Preparation of Ink Jet Recording Sheet (3)]

A thermoplastic resin coating solution having the following composition was prepared, and with the use of a barcoare, the coating solution was applied onto the ink receiving layer of the ink jet recording sheet (1) obtained in Example 1 in an amount of 1 g/m² as polyester resin, and the coated sheet was dried, to give an ink jet recording sheet (3).

—Thermoplastic Resin Coating Solution—

Aqueous polyester resin dispersion . . . 50 parts

[KZA-1734 (Solid Matter: 30%), Manufactured by Unitika Ltd.]

10% Aqueous Emulgen 109P solution . . . 1 part (Polyoxyethylene Laurylether; Surfactant)

Ion exchange water . . . 50 parts

[Preparation of Ink Jet Recording Sheet (4)]

An ink jet recording sheet (4) was prepared in a similar manner to the ink jet recording sheet (3), except insofar that the coating amount of the thermoplastic resin coating solution prepared for the ink jet recording sheet (3) was changed from 1 g/m² to 2 g/m² (as polyester resin).

TABLE 5

| | Ink set | Sheet | Heat-press/cooling release (Note) | Light fastness | Ozone resistance | Image roughening |
|---|---|---|---|---|---|---|
| Example 3 | 104 | (3) | Yes (condition 1) | A | AA | 0.17 |
| Example 4 | 105 | (4) | Yes (condition 1) | A | AA | 0.16 |
| Example 5 | 106 | (2) | Yes (condition 1) | A | AA | 0.18 |
| Comparative Example 5 | 101 | (2) | No | C | C | 0.22 |
| Comparative Example 6 | 102 | (3) | No | C | C | 0.22 |
| Comparative Example 7 | 103 | (2) | No | B | B | 0.22 |
| Comparative Example 8 | 104 | (3) | No | A | A | 0.23 |
| Comparative Example 9 | 105 | (4) | No | A | A | 0.22 |
| Comparative Example 10 | 106 | (2) | No | A | A | 0.22 |
| Comparative Example 11 | 101 | (2) | Yes (condition 1) | C | A | 0.18 |
| Comparative Example 12 | 102 | (3) | Yes (condition 1) | C | AA | 0.17 |
| Comparative Example 13 | 103 | (2) | Yes (condition 1) | B | AA | 0.18 |

Note:
Processing conditions shown in Table 3 above.

As is apparent from Table 5, in Examples in which ink jet recording sheets (2) to (4) containing a thermoplastic resin were used in combination with ink sets containing magenta and cyan dyes with an oxidation potential of higher than 0.8 V, and heat-pressing treatment was carried out, it was possible to obtain smoother-surface images, superior both in terms of ozone resistance and light fastness, and with less image roughness. In contrast, in the Comparative Examples, it was difficult to obtain images superior in fastness (light fastness and ozone resistance) or at the same time to prevent image roughness effectively.

As has been described above, the invention provides an ink jet recording method that allows recording of images having a high glossiness appropriate for production of photographic images and an excellent light fastness and ozone resistance, and also provides ink jet images obtained by means of the ink jet recording method.

What is claimed is:

1. An ink jet recording method, comprising:
   forming an image on an ink jet recording medium having an ink receiving layer on a support by using an ink set having as minimum constituting unit a yellow ink containing at least one yellow dye, a magenta ink containing at least one magenta dye, and a cyan ink containing at least one cyan dye, the magenta dye and cyan dye having an oxidation potential of higher than 0.8 V (vs. SCE);
   heat pressing the ink jet recording medium by using a cooling releasing belt-type smoothing device provided with a belt member, a heat-pressing device capable of heating and pressing, a cooling device for cooling at least a face which has been pressurized by using the belt member, and a cooling releasing device for releasing the face from the belt member while the face is being cooled; and cooling releasing the ink jet recording medium from the belt member after the heat-pressing treatment.

2. An ink jet recording method according to claim 1, wherein the ink receiving layer comprises a thermoplastic resin.

3. An ink jet recording method according to claim 1, wherein an outermost layer on the face of the ink jet recording medium having the ink receiving layer contains a thermoplastic resin.

4. An ink jet recording method according to claim 2, wherein a protective layer is formed by subjecting the thermoplastic resin to the heat-pressing treatment.

5. An ink jet recording method according to claim 3, wherein a protective layer is formed by subjecting the thermoplastic resin to the heat-pressing treatment.

6. An ink jet recording method according to claim 1, wherein the support comprises a substrate and a polyolefin resin layer formed on at least one face of the substrate.

7. An ink jet recording method according to claim 1, wherein the heat-pressing treatment is carried out by using a member having a fluorocarbon siloxane rubber-containing layer formed thereon and bringing a surface of the fluorocarbon siloxane rubber-containing layer into contact with a recording surface of the ink jet recording medium.

8. The ink jet recording method according to claim 1, wherein the heat-pressing treatment is carried out by using a member having a silicone rubber-containing first layer and a fluorocarbon siloxane rubber-containing second layer formed thereon in that order, and bringing a surface of the second layer into contact with a recording surface of the ink jet recording medium.

9. An ink jet recording method according to claim 7, wherein the fluorocarbon siloxane rubber has on the main chain at least one group of a perfluoroalkylether group and a perfluoroalkyl group.

10. A recorded ink jet image formed on the recording material according to the method of claim 1.

11. An ink jet recording device for forming an image on an ink jet recording medium having a support and an ink receiving layer formed thereon, the ink jet recording device comprising:

an ink set comprising as minimum constituting unit, a yellow ink containing at least one yellow dye, a magenta ink containing at least one magenta dye, and a cyan ink containing at least one cyan dye, the magenta dye and cyan dye having an oxidation potential of higher than 0.8 V (vs. SCE); and a cooling releasing belt-type smoothing device provided with a belt member, a heat-pressing device capable of heating and pressing, a cooling device for cooling at least a pressurized face which has been pressurized by using the belt member, and a cooling releasing device for releasing the pressurized face from the belt member while the face is being cooled, wherein the ink jet recording medium, in which an image is formed on the ink receiving layer by using the ink set, is heated and pressurized by the belt-type smoothing device, cooled after the heat-pressing treatment, and cooling released from the belt member.

12. An ink jet recording device according to claim 11, wherein an image is formed on the ink jet recording medium, of which the ink receiving layer contains a thermoplastic resin.

13. An ink jet recording device according to claim 11, wherein an image is formed on the ink jet recording medium, of which an outermost layer on a face of the ink receiving layer contains a thermoplastic resin.

14. An ink jet recording device according to claim 12, wherein a protective layer is formed by subjecting the thermoplastic resin to the heat-pressing treatment.

15. An ink jet recording device according to claim 13, wherein a protective layer is formed by subjecting the thermoplastic resin to the heat-pressing treatment.

16. An ink jet recording device according to claim 11, wherein an image is formed on the ink jet recording medium of which the support contains a substrate and a polyolefin resin layer formed on at least one face of the substrate.

17. An ink jet recording device according to claim 11, further comprising a member having a fluorocarbon siloxane rubber-containing layer formed thereon, wherein the heat-pressing treatment is carried out by bringing a surface of the fluorocarbon siloxane rubber containing layer into contact with a recording surface of the ink jet recording medium.

18. An ink jet recording device according to claim 11, further comprising a member whereon a silicone rubber-containing first layer and a fluorocarbon siloxane rubber-containing second layer are formed in that order, wherein the heat-pressing treatment is carried out by bringing a surface of the second layer into contact with a recording surface of the ink jet recording medium.

19. An ink jet recording device according to claim 17, wherein the fluorocarbon siloxane rubber has on the main chain at least one group of a perfluoroalkylether group and a perfluoroalkyl group.

* * * * *